(12) United States Patent
Cui et al.

(10) Patent No.: US 8,072,686 B2
(45) Date of Patent: Dec. 6, 2011

(54) UV LASER BEAMLETT ON FULL-WINDSHIELD HEAD-UP DISPLAY

(75) Inventors: Dehua Cui, Northville, MI (US); Thomas A. Seder, Northville, MI (US); Joseph F. Szczerba, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/726,566

(22) Filed: Mar. 18, 2010

(65) Prior Publication Data

US 2010/0254019 A1 Oct. 7, 2010

Related U.S. Application Data

(63) Continuation-in-part of application No. 12/417,077, filed on Apr. 2, 2009.

(51) Int. Cl.
G02B 27/14 (2006.01)
(52) U.S. Cl. .......................... 359/630; 359/633
(58) Field of Classification Search .................. 359/630, 359/633
See application file for complete search history.

(56) References Cited

U.S. PATENT DOCUMENTS

| | | | |
|---|---|---|---|
| 6,986,581 B2 | 1/2006 | Sun et al. | |
| 7,090,355 B2 | 8/2006 | Liu et al. | |
| 7,182,467 B2 | 2/2007 | Liu et al. | |
| 7,213,923 B2 * | 5/2007 | Liu et al. | 353/31 |
| 7,460,951 B2 | 12/2008 | Altan et al. | |
| 2007/0103747 A1 * | 5/2007 | Powell et al. | 359/13 |
| 2008/0158510 A1 | 7/2008 | Tant et al. | |
| 2009/0268946 A1 | 10/2009 | Zhang et al. | |
| 2010/0020291 A1 * | 1/2010 | Kasazumi et al. | 353/38 |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |
| 2010/0253542 A1 | 10/2010 | Seder et al. | |
| 2010/0253543 A1 | 10/2010 | Szczerba et al. | |
| 2010/0253593 A1 | 10/2010 | Seder et al. | |
| 2010/0253594 A1 | 10/2010 | Szczerba et al. | |
| 2010/0253595 A1 | 10/2010 | Szczerba et al. | |

(Continued)

FOREIGN PATENT DOCUMENTS

CN 101131531 A 2/2008

(Continued)

OTHER PUBLICATIONS

U.S. Appl. No. 12/467,340, Szczerba et al.

(Continued)

*Primary Examiner* — Scott J Sugarman
*Assistant Examiner* — James Jones

(57) ABSTRACT

An apparatus to project graphical images upon a substantially transparent windscreen head-up display of a vehicle includes an excitation light source projecting a laser beam based upon a graphical image command and a telescope for expanding the laser beam. The apparatus further includes a multi-mirror device including a plurality of mirrors sequentially irradiated by the expanded laser beam to simultaneously scan a plurality of laser beamlettes and the windscreen including a surface receiving the plurality of laser beamlettes, each of the received plurality of laser beamlettes emitting visible light upon the surface.

19 Claims, 20 Drawing Sheets

U.S. PATENT DOCUMENTS

| | | |
|---|---|---|
| 2010/0253596 A1 | 10/2010 | Szczerba et al. |
| 2010/0253597 A1 | 10/2010 | Seder et al. |
| 2010/0253598 A1 | 10/2010 | Szczerba et al. |
| 2010/0253599 A1 | 10/2010 | Szczerba et al. |
| 2010/0253600 A1 | 10/2010 | Seder et al. |
| 2010/0253601 A1 | 10/2010 | Seder et al. |
| 2010/0253602 A1 | 10/2010 | Szczerba et al. |
| 2010/0253688 A1 | 10/2010 | Cui et al. |
| 2010/0253918 A1 | 10/2010 | Seder et al. |

FOREIGN PATENT DOCUMENTS

| | | |
|---|---|---|
| CN | 101236301 A | 8/2008 |

OTHER PUBLICATIONS

U.S. Appl. No. 12/467,350, Seder et al.
U.S. Appl. No. 12/900,566, Szczerba et al.
U.S. Appl. No. 12/903,267, Seder et al.
U.S. Appl. No. 12/900,539, Seder et al.
U.S. Appl. No. 12/980,503, Szczerba et al.
U.S. Appl. No. 12/979,432, Szczerba et al.
U.S. Appl. No. 12/980,522, Seder et al.
U.S. Appl. No. 12/980,612, Szczerba et al.
U.S. Appl. No. 12/981,206, Tsimhoni et al.
U.S. Appl. No. 12/981,602, Szczerba et al.
U.S. Appl. No. 12/982,478, Seder et al.

* cited by examiner

UV LASER BEAMLETT ON FULL-WINDSHIELD HEAD-UP DISPLAY

CROSS REFERENCE TO RELATED APPLICATIONS

This application is a continuation-in-part of U.S. application Ser. No. 12/417,077, filed on Apr. 2, 2009, which is incorporated herein by reference.

TECHNICAL FIELD

This disclosure is related to graphical imaging upon a windscreen in a motor vehicle.

BACKGROUND

The statements in this section merely provide background information related to the present disclosure and may not constitute prior art.

Presentation of information to the operator of a vehicle in an effective manner is desirable and reduces strain upon the operator. Display techniques are known wherein light is projected upon a screen, and the light is converted into a viewable display upon the screen. Applied to transportation applications, such displays are known as head-up displays, wherein information is projected upon a visor, a screen between the operator and a windscreen, or directly upon the windscreen. However, known systems projecting light directly upon a windscreen frequently require a coating or material that significantly decreases the transparency of the windscreen. As a result, head-up displays are frequently restricted to limited region upon the windscreen.

Vehicle systems monitor a great deal of information. In particular, vehicle systems utilizing driving aids such as adaptive cruise control (ACC), automatic lateral control, collision avoidance or preparation systems, and lane keeping aids monitor and process information regarding the operating environment surrounding the vehicle. Additionally, information is available from a variety of sources to locate the vehicle in relation to a 3D map database, plan a travel route for the vehicle to a destination, and correlate this travel route to available information regarding the route. Additionally, on-board vehicle systems provide a wide variety of information that can be used to improve control of the vehicle. Additionally, vehicle to vehicle communications are known to utilize data collected in one vehicle in communicating with vehicles elsewhere on the road.

Existing methods to project light upon a display screen include either a single stroke, single beam vector (vector stroke graphics or stroke-raster) or a bitmapped architecture (a matrix-addressed display). Either method limits efficiency and the amount of information that can be presented upon a display.

SUMMARY

An apparatus to project graphical images upon a substantially transparent windscreen head-up display of a vehicle includes an excitation light source projecting a laser beam based upon a graphical image command and a telescope for expanding the laser beam. The apparatus further includes a multi-mirror device including a plurality of mirrors sequentially irradiated by the expanded laser beam to simultaneously scan a plurality of laser beamlettes and the windscreen including a surface receiving the plurality of laser beamlettes, each of the received plurality of laser beamlettes emitting visible light upon the surface.

BRIEF DESCRIPTION OF THE DRAWINGS

One or more embodiments will now be described, by way of example, with reference to the accompanying drawings, in which:

FIG. 27 depicts a vehicle including three sequential data points describing a target object in front of the vehicle;

FIG. 28 depicts an exemplary situation in which corresponding data points would correctly indicate critical information to an operator; and FIG. 29 depicts an exemplary situation in which corresponding data points could incorrectly indicate critical information to an operator;

FIG. 30 depicts an exemplary emitter, capable of emitting light to a limited field of view; and FIG. 31 describes an exemplary process to create the necessary structure of emitters aligned to a polymer substrate in order to enable limited field of view viewing;

FIG. 32 depicts an exemplary un-enhanced external view including features that are desirably visibly accessible to an operator of a vehicle;

FIG. 33 depicts an exemplary view obstructed by heavy fog and exemplary enhanced vision displays that may be used to compensate for the effect of the fog;

FIG. 34 depicts an exemplary display of graphics improving safety through a lane change;

FIG. 35 depicts an exemplary situation wherein a peripheral salient feature enhancement feature is utilized in combination with an estimated operator's gaze location to alert an operator to critical information;

FIG. 36 depicts an exemplary view describing display of navigational directions upon a HUD;

FIG. 37 depicts an additional exemplary view, describing critical information that can be displayed upon a HUD;

DETAILED DESCRIPTION

Figure 1:
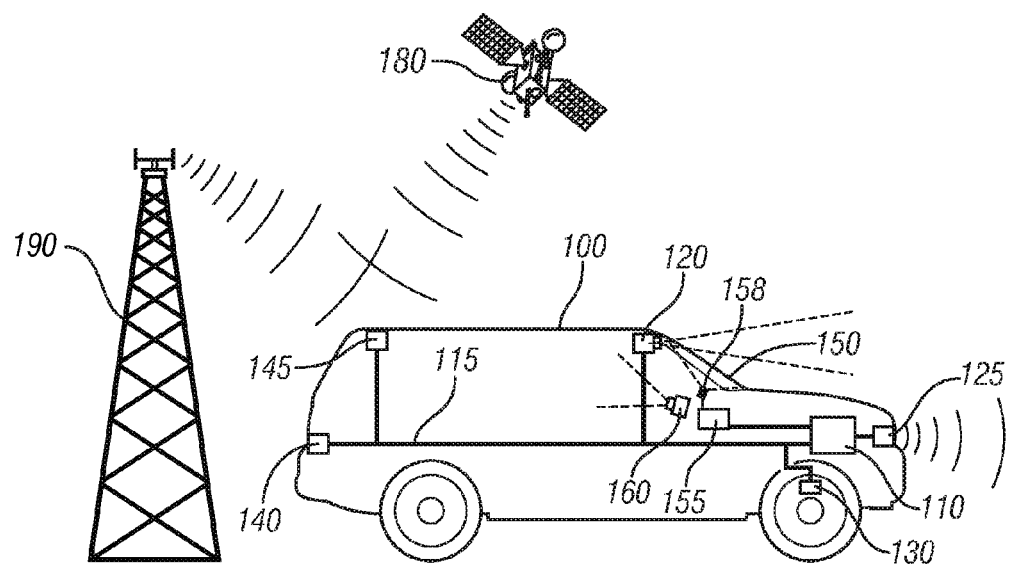
FIG. 1 depicts an exemplary vehicle equipped with an EVS system, in accordance with the present disclosure.

Referring now to the drawings, wherein the showings are for the purpose of illustrating certain exemplary embodiments only and not for the purpose of limiting the same, a method utilizing an enhanced vision system (EVS) to represent graphical images upon a windscreen of a vehicle describing an operational environment for the vehicle is disclosed. The graphical images originate from sensor and/or data inputs describing the operational environment and include processing of the inputs in order to convey critical information to the operator or occupants of the vehicle. Graphical images to be displayed upon the windscreen are additionally registered to the visible relevant features observable through the windscreen, such that an intended occupant may view the relevant feature and the registered graphical image as a single discernable input.

FIG. 1 depicts an exemplary vehicle equipped with an EVS system, in accordance with the present disclosure. Vehicle 100 includes an EVS system manager 110; vehicle sensor systems, including camera system 120 and radar system 125; vehicle operation sensors, including vehicle speed sensor 130; information systems, including GPS device 140 and wireless communication system 145; head-up display (HUD) 150; EVS graphics system 155; graphics projection system 158; and occupant eye location sensing system 160. The EVS system manager 110 includes a programmable processor including programming to monitor various inputs and determine what information is appropriate to display upon the HUD. The EVS system manager can communication directly with various systems and components, or the EVS system manager can alternatively or additionally communicate over a LAN/CAN system 115. The EVS system manager utilizes information regarding the operational environment of the vehicle derived from a number of inputs. Camera system 120 includes a camera or image capturing device taking periodic or sequential images representing a view from the vehicle. Radar system 125 includes a device known in the art utilizing electromagnetic radiation to detect other vehicles or objects located near the vehicle. A number of known in-vehicle sensors are widely used within a vehicle to monitor vehicle speed, engine speed, wheel slip, and other parameters descriptive of the operation of the vehicle. Exemplary vehicle speed sensor 130 is depicted to represent such an in-vehicle sensor describing vehicle operation, but the disclosure intends to include any such sensors for use by the EVS. GPS device 140 and wireless communication system 145 are devices known in the art for communicating with resources outside of the vehicle, for example, satellite system 180 and cellular communications tower 190. GPS device 140 may be utilized in conjunction with a 3D map database including detailed information relating to a global coordinate received by the GPS device 140 regarding the current location of the vehicle. HUD 150 includes a windscreen equipped with features capable of displaying an image projected thereupon while remaining transparent or substantially transparent such that occupants of the vehicle can clearly observe outside of the vehicle through the windscreen. One will appreciate that while HUD 150 includes the windscreen in the front of the vehicle, other surfaces within the vehicle could be used for projection, including side windows and a rear window. Additionally, the view on the front windscreen could be continued upon the front vehicle "A-pillars" and onto the side windows as a continuous image. EVS graphics engine 155 includes display software or programming translating requests to display information from the EVS system manager 110 in graphical representations describing the information. The EVS graphics engine 155 includes programming to compensate for the curved and tilted surface of the windscreen and any other surfaces onto which graphics are to be projected. EVS graphics engine 155 controls graphics projection system 158 including a laser or projector device producing an excitation light to project the graphical representations. Occupant eye location sensing system 160 includes sensors known in the art to approximate a location of the head of an occupant and further the orientation or gaze location of the eyes of the occupant. Based upon the output of the occupant eye location sensing system 160 and input data tracking location information regarding the environment around the vehicle, EVS system manager 110 can accurately register the graphical representations to the HUD such the occupant sees the images overlaid with visual images through the windscreen.

The EVS described above includes eye sensing and head sensing devices allowing estimation of eye location, allowing registration of images upon the HUD such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate registration of graphics upon the HUD are contemplated, and the disclosure is not intended to be limited to the particular embodiments described herein.

An exemplary EVS includes a wide field of view, full windscreen (HUD), a substantially transparent screen including functionality to display graphical images projected thereupon; a HUD image engine including a laser or lasers capable of projecting images upon the windscreen; input sources deriving data concerning the operating environment of the vehicle; and an EVS system manager including programming to monitor inputs from the input devices, process the inputs and determine critical information relative to the operating environment, and create requests for graphical images to be created by the HUD image engine. However, it will be appreciated that this exemplary EVS is only one of a wide number of configurations that an EVS can take. For example, a vision or camera system is useful to various EVS applications that will be discussed. However, it will be appreciated that an exemplary EVS system can operate without a vision system, for example, providing information available from only a GPS device, 3D map database, and in-vehicle sensors. In the alternative, it will be appreciated that an exemplary EVS system can operate without access to a GPS device or wireless network, instead utilizing inputs only from a vision system and radar system. Many various configurations are possible with the disclosed systems and methods, and the disclosure is not intended to limited to the exemplary embodiments described herein.

Figure 2:
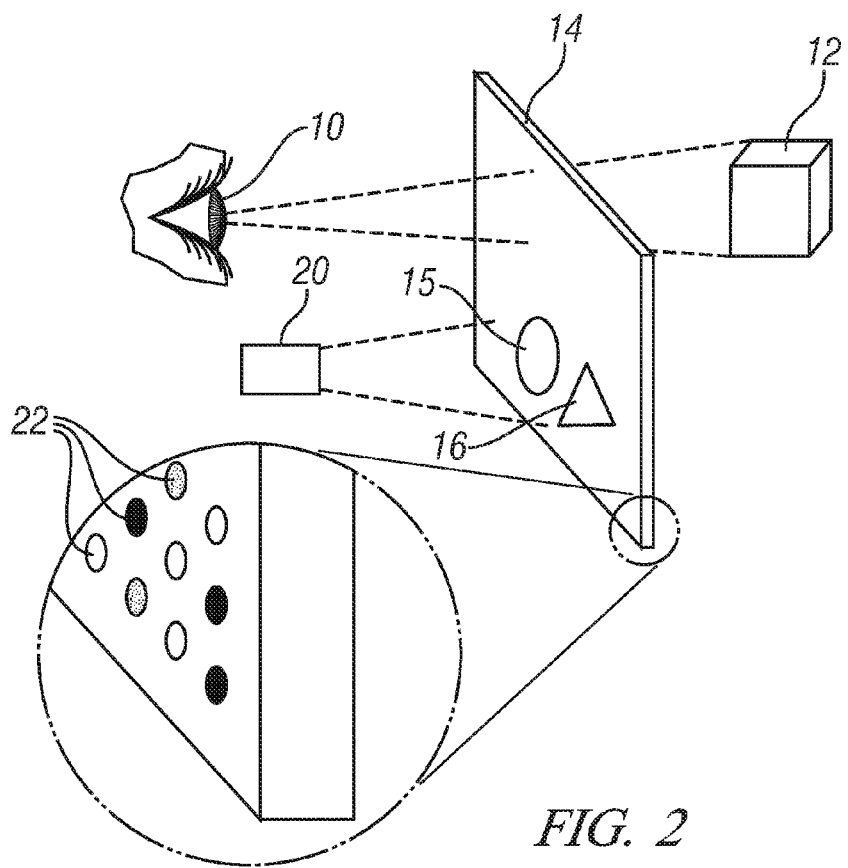
FIG. 2 is an example diagram of a substantially transparent display, in accordance with the present disclosure.

The windscreen including HUD is important to operation of the EVS. In order to function as a medium through which relevant features are observable while serving as a display device upon which the graphical images may be displayed, the windscreen of the vehicle must be both transparent and capable of displaying images projected by an excitation light source. FIG. 2 is an example diagram of a substantially transparent display, in accordance with the present disclosure. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a building window, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

FIG. 2 depicts illumination of transparent displays illuminated with excitation light (e.g. ultraviolet light or infrared light) from light sources (e.g. a projector or laser, depicted by device 20, in accordance with embodiments. Substrate 14 may receive excitation light from a light source (e.g. projector or laser 20). The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

The excitation light may be ultraviolet light, in accordance with embodiments of the present disclosure. If the excitation light is ultraviolet light, then when the light emitting material emits visible light in response to the ultraviolet light, a down-conversion physical phenomenon occurs. Specifically, ultraviolet light has a shorter wavelength and higher energy than visible light. Accordingly, when the light emitting material absorbs the ultraviolet light and emits lower energy visible light, the ultraviolet light is down-converted to visible light because the ultraviolet light's energy level goes down when it is converted into visible light. In embodiments, the light emitting material is fluorescent material.

The excitation light may be infrared light, in accordance with embodiments of the present disclosure. If the excitation light is infrared light, then when the light emitting material emits visible light in response to the infrared light, an up-conversion physical phenomenon occurs. Specifically, infrared light has a longer wavelength and lower energy than visible light. Accordingly, when the light emitting material absorbs the infrared light and emits higher energy visible light, the infrared light is up-converted to visible light because the infrared light's energy level goes up when it is converted into visible light. In embodiments, the light emitting material is fluorescent material. In the up-conversion physical phenomenon, absorption of more than one infrared light photon may be necessary for the emission of every visible light photon. One having ordinary skill in the art will appreciate that such a requirement, requiring absorption of multiple photons can make infrared light a less desirable option than ultraviolet light as an excitation light.

In embodiments illustrated in FIG. 1, the excitation light is output by device 20 including a projector. The projector may be a digital projector. In embodiments, the projector is a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. In other embodiments, the projector is a liquid crystal display (LCD) projector. In embodiments, the projector may be a liquid crystal on silicon (LCOS) projector. In embodiments, the projector may be an analog projector (e.g. a slide film projector or a movie film projector). One of ordinary skill in the art would appreciate other types of projectors which may be used to project ultraviolet light on substrate 14.

Figure 3:
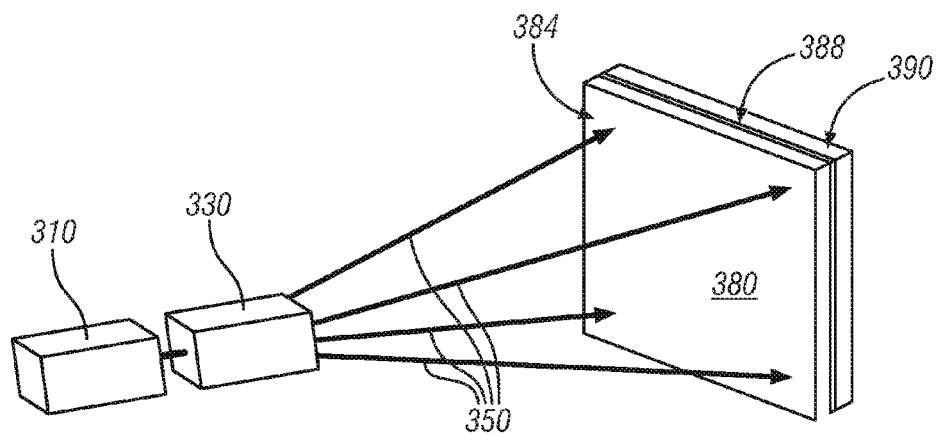
FIG. 3 depicts an exemplary graphic projection upon a surface, in accordance with the present disclosure.

FIG. 3 depicts an exemplary graphic projection upon a surface, in accordance with the present disclosure. A radiation source 310 delivers an intense, collimated beam of invisible (or less visible) radiation. The radiation beam passes an optical image processor 330 and the modified radiation beam 350 is projected on to a fluorescence conversion (FC) displaying screen 380. A number of methods of image display are disclosed. In a first exemplary method, expanded static radiation beams are applied through an image processor 330 containing a matrix of on-off switches (e.g., a matrix of tiny reflective mirrors) creating a dark image, and a fluorescent visible image is created on the displaying screen 380 through fluorescent conversion of the dark image. Static images are typically generated from a lookup table. In a second exemplary method, a radiation beam is coupled with an image processor 330 contains a two-dimensional beam scanner (e.g., galvanometer, acousto-optic light deflector (AOLD), and electro-optic light deflector (EOLD)). Electrical signals are applied to steer the radiation beam to illuminate a particular spot of the screen at a given time. One exemplary FC screen typically has the following structure: a layer 384 contains fluorescent nano-particles or molecules attached to or dispersed in a uniform medium; a coating 388 reflects the visible emission while transmitting the invisible radiation; and a substrate layer 390 that absorbs the remaining invisible radiation. Alternatively, it includes of a layer 384 containing fluorescent nano-particles or molecules attached to or dispersed in a uniform medium; a coating 388 absorbing the invisible radiation; and a visibly transparent substrate layer 390. Self-adhesive layer and protective layers such as a scratch resistance layer can also be added to the screen structure.

Figure 4:
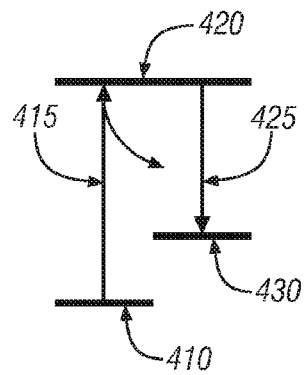
FIG. 4 illustrates a scheme for utilizing excitation light to emit visible light from the HUD, in accordance with the present disclosure.

Two alternate schemes of FC are disclosed. FIG. 4 illustrates a scheme for utilizing excitation light to emit visible light from the HUD, in accordance with the present disclosure. The first scheme, displayed in FIG. 4 is termed down-conversion, where the wavelength of the excitation light is shorter than fluorescence wavelength. An energy level diagram illustrates the down-conversion molecule or nano-particle. The photon of the shorter wavelength excitation light has more energy and induces a transition 415 from a lower energy level 410 to a higher energy level 420. The emission involves transition 425 associated with two energy levels with a smaller energy gap. The second scheme (not depicted) is called up-conversion, where excitation wavelengths are longer than fluorescence wavelength. In the second case, two or more photons from a laser are necessary to excite the fluorescence particle in order to yield a visible fluorescence photon. The longer wavelength excitation laser induces two transitions from a lower state to a higher energy state through an intermediate state. The emission involves transition associated with two energy levels with an energy gap that is smaller than energy associated with two laser photons. A common approach for the first scheme is to apply a UV (or blue) light source with wavelength shorter than 500 nm to excite the fluorescence molecules or nano-particles on the image screen. The UV sources include solid state lasers, semiconductor laser diodes, gas lasers, dye lasers, excimer lasers, and other UV light sources familiar to those skilled in the art. A common approach for the second scheme is to apply infrared lasers with wavelength longer than 700 nm to excite the fluorescence molecules or particles on the Screen. The IR lasers include solid-state lasers, semiconductor laser diodes and other IR sources familiar to those skilled in the art. In both cases, excitation beam intensities are modulated to yield visible fluorescence of varying intensity or gray scales.

A plurality of fluorescence materials is also disclosed. A common property of these materials is that the size of the fluorescent particles is very small. Typically, nano-particles or molecules with size between 0.5 nm to 500 nm are preferred to have minimum scattering effect that reduces the visible transparency of the screen. These materials fall into four categories: inorganic nano-meter sized phosphors; organic molecules and dyes; semiconductor based nano particles; and organometallic molecules.

For down-conversions the following materials can be utilized to form FC displaying screen: 1. Inorganic or ceramic phosphors or nano-particles, including but not limited to metal oxides, metal halides, metal chalcoginides (e.g. metal sulfides), or their hybrids, such as metal oxo-halides, metal oxo-chalcoginides. These inorganic phosphors have found wide applications in fluorescent lamps and electronic monitors. These materials can covert shorter wavelength photon (e.g. UV and blue) into longer wavelength visible light and can be readily deposited on displaying screens or dispersed in the screen. 2. Laser dyes and small organic molecules, and fluorescent organic polymers. These can also be used to convert shorter wavelength laser photon (e.g. UV and blue) into longer wavelength visible light and can be readily deposited on a displaying screen. Since they are in the molecular state in the solid, the screen transparency is maintained due to lack of particle scattering. 3. Semiconductor nano-particles, such as II-VI or III-V compound semiconductors, e.g. fluorescent quantum dots. Again, their addition in the screen does not affect the optical transparency 4. Organometallic molecules. The molecules include at least a metal center such as rare earth elements (e.g. Eu, Tb, Ce, Er, Tm, Pr, Ho) and transitional metal elements such as Cr, Mn, Zn, Ir, Ru, V, and main group elements such as B, Al, Ga, etc. The metal elements are chemically bonded to organic groups to prevent the quenching of the fluorescence from the hosts or solvents. Such organometallic compounds filled screen does not scatter light or affect the screen transparency either, unlike the micro-sized particles.

Of the down-conversion FC materials or molecules mentioned above, those that can be excited by lasers of long wave UV (e.g. >300 nm) to blue (<500 nm), and yield visible light emission can be utilized by embodiments of the current disclosure. For example, the phosphors can be Garnet series of phosphors: (YmA1-m)3(AlnB1-n)5O12, doped with Ce; where 0<=m, n<=1; A include other rare earth elements, B include B, Ga. In addition, phosphors containing metal silicates, metal borates, metal phosphates, and metal aluminates hosts are preferred in their applications to FC displays; In addition, nano-particulates phosphors containing common rare earth elements (e.g. Eu, Tb, Ce, Dy, Er, Pr, Tm) and transitional or main group elements (e.g. Mn, Cr, Ti, Ag, Cu, Zn, Bi, Pb, Sn, Tl) as the fluorescent activators, are also preferred in their applications to FC displays. Finally, some undoped materials (e.g. Metal (e.g. Ca, Zn, Cd) tungstates, metal vanadates, ZnO, etc) are also preferred FC display materials.

The commercial laser dyes are another class of exemplary FC display materials. A list of commercial laser dyes can be obtained from several laser dye vendors, including Lambda Physik, and Exciton, etc. A partial list of the preferred laser dye classes includes: Pyrromethene, Coumarin, Rhodamine, Fluorescein, other aromatic hydrocarbons and their derivatives, etc. In addition, there are many polymers containing unsaturated carbon-carbon bonds, which also serve as fluorescent materials and find many optical and fluorescent applications. For example, MEH-PPV, PPV, etc have been used in opto-electronic devices, such as polymer light emitting diodes (PLED). Such fluorescent polymers can be used directly as the fluorescent layer of the transparent 2-D display screen. In addition, the recently developed semiconductor nanoparticles (e.g., quantum dots) are also a preferred LIF display materials. The terms "semiconductor nanoparticles," refers to an inorganic crystallite between 1 nm and 1000 nm in diameter, preferably between 2 nm to 50 nm. A semiconductor nano-particle is capable of emitting electromagnetic radiation upon excitation (i.e., the semiconductor nano-particle is luminescent). The nanoparticle can be either a homogeneous nano-crystal, or includes of multiple shells. For example, it includes a "core" of one or more first semiconductor materials, and may be surrounded by a "shell" of a second semiconductor material. The core and/or the shell can be a semiconductor material including, but not limited to, those of the group II-VI (ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, and the like) and III-V (GaN, GaP, GaAs, GaSb, InN, InP, InAs, InSb, and the like) and IV (Ge, Si, and the like) materials, and an alloy or a mixture thereof.

Finally, fluorescent organometallic molecules containing rare earth or transitional element cations are also utilized in the down-conversion fluorescent screens. Such molecules include a metal center of rare earth elements including Eu, Tb, Er, Tm, Ce protected with organic chelating groups. The metal center may also include transitional elements such as Zn, Mn, Cr, Ir, etc and main group elements such as B, Al, Ga. Such organometallic molecules can readily be dissolved in liquid or transparent solid host media and form a transparent fluorescent screen for the disclosed 2-D transparent display with minimum light scattering. Some examples of such fluorescent organometallic molecules include: 1. Tris(dibenzoylmethane) mono(phenanthroline)europium (III); 2. Tris(8-hydroxyquinoline) erbium; 3. Tris(1-phenyl-3-methyl-4-(2,2-dimethylpropan-1-oyl)pyrazolin-5-one) terbium (III); 4. Bis (2-methyl-8-hydroxyquinolato)zinc; 5. Diphenylborane-8-hydroxyquinolate.

Up-conversion phosphors are similar in chemical compositions as the down-conversion fluorescent materials discussed. The up-conversion phosphors for the fluorescent conversion display also include the following choice of materials or molecules: 1. Laser dyes, the organic small molecules that can be excited by the absorption of at least two infrared photons with emission of visible light. 2. Fluorescent polymers, the class of polymers that can be excited by the absorption of at least two infrared photons with emission of visible light 3. Inorganic or ceramic particles or nano-particles, including the conventional up-conversion phosphors (e.g. metal fluorides, metal oxides) that can be excited by the absorption of at least two infrared photons with emission of visible light 4. Semiconductor particles, including nano-particles such as II-VI or III-V compound semiconductors, e.g. quantum dots, described in details in the "down-conversion" semiconductors above.

The fluorescent up-conversion inorganic phosphors include but are not limited to metal oxides, metal halides, metal chalcoginides (e.g. sulfides), or their hybrids, such as metal oxo-halides, metal oxo-chalcoginides. They are usually doped with rare earth elements (e.g. $Yb^{3+}$, $Er^{3+}$, $Tm^{3+}$. Some host examples include, but are not limited to: $NaYF_4$, $YF_3$, $BaYF_5$, $LaF_3$, $La_2MoO_8$, $LaNbO_4$, $LnO_2S$; where Ln is the rare earth elements, such as Y, La, Gd). These FC displaying materials may be used to form a variety of FC displaying objects. These objects include: screens, plates, windows, walls, billboards, and other displaying surfaces. There are several means to incorporate these fluorescent molecules or materials onto a displaying surface: 1. They can be dissolved (organic dyes) or dispersed (inorganic particles) into solvents (water or organic solvents). The liquid fluorescent formula can be either coated onto a surface and form a solid film or coating after drying, or they can be sandwiched between two surfaces in liquid form. 2. They can be dissolved (organic dyes) or dispersed (inorganic particles) into solid hosts, such as glasses, polymers, gels, inorganic-organic hybrid hosts, cloths, papers, films, tapes, etc. and turn the solid into a fluorescent object for laser display. 3. Some objects (e.g. cloths, paper, tapes, fluorescent polymers) may already contain fluorescent molecules or luminescent functional groups. In that circumstance, they can be directly used as laser display objects.

Returning to the exemplary embodiment illustrated in FIG. 2, an excitation light is output from device 20, in this example, a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 2 is an example diagram of light emitting material (e.g. light emitting particles 22) dispersed in a substantially transparent substrate, according to embodiments. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

In some exemplary embodiments, more than one projector or laser may be utilized for illumination. For example, a first projector may be used for excitation of light emitting material which emits a first color and a second projector may be used for excitation of light emitting material which emits a second color. Use of more than one projector may increase the amount of excitation light which is absorbed by the light emitting material. By increasing the amount of excitation light absorbed, the amount of visible light emitted from the light emitting material may be increased. The greater the amount of visible light emitted, the brighter the display. In embodiments, a first projector may be designated for causing emission of red light, a second projector may be designated for causing emission of green light, and a third projector may be designated for causing emission of blue light. However, other configurations can be appreciated. For example, use of two projectors, four projectors, projectors which cause emission of primary colors, projectors which cause the emission of non-primary colors, and substituting lasers for projectors in similar configurations are appreciated.

FIG. 2 illustrates light emitting material, including light emitting particles 22, dispersed in a substantially transparent substrate, according to embodiments of the disclosure. These light emitting particles 22 can be substantially similar particles throughout, or, as depicted in FIG. 2, the particles can vary in composition. When excitation light is absorbed by the light emitting particles 22, the particles emit visible light. Accordingly, in down-conversion embodiments, when ultraviolet light is absorbed by light emitting materials, visible light is emitted from the light emitting materials. Likewise, in up-conversion embodiments, when infrared light is absorbed by light emitting materials, visible light is emitted from the light emitting materials. In embodiments, each of light emitting materials may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as depicted in FIG. 2, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. According to embodiments, each of the light emitting particles has a diameter that is less than about 400 nanometers. According to embodiments, each of the light emitting particles has a diameter that is less than about 300 nanometers. According to embodiments, each of the light emitting particles has a diameter that is less than about 200 nanometers. According to embodiments, each of the light emitting particles has a diameter that is less than about 100 nanometers. According to other embodiments, each of the light emitting particles has a diameter that is less than about 50 nanometers. The light emitting particles may be individual molecules.

Other methods can be appreciated for integrating light emitting materials on a surface of substrate 14. Similar to embodiments illustrated in example FIG. 2, each of the light emitting materials may be a different type of light emitting material, which emit a different range of wavelengths of visible light in response to a different range of wavelengths of excitation light (e.g. ultraviolet or infrared light). Light emitting material may be fluorescent material, which emits visible light in response to absorption of electromagnetic radiation (e.g. visible light, ultraviolet light, or infrared light) that is a different wavelength than the emitted visible light. Light emitting material may include light emitting particles.

In DLP or MMA projector embodiments, the wavelength of ultraviolet light emitted from a DLP projector can be modulated using a color wheel with specific ultraviolet pass filters. Similar modulation techniques may be utilized in other projector embodiments and laser embodiments. In embodiments, multiple projectors and multiple lasers may be utilized, each being associated with a specific ultraviolet wavelength range to excite a specific type of light emitting particle, to output a specific color of light.

Figure 5:
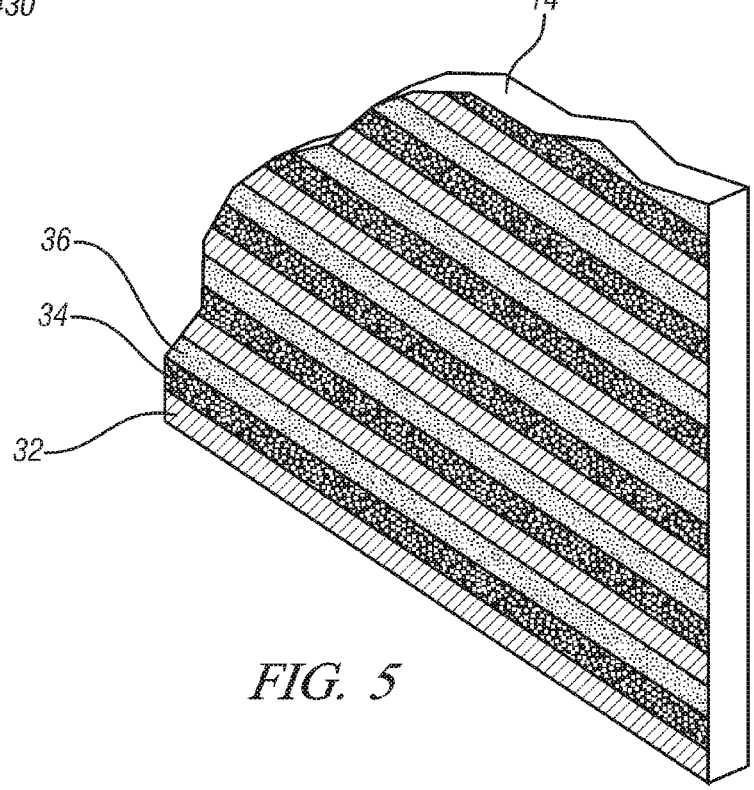
FIG. 5 depicts an exemplary arrangement of light emitting particles upon a substrate, in accordance with the present disclosure.

FIG. 5 depicts an exemplary arrangement of light emitting particles upon a substrate, in accordance with the present disclosure. FIG. 5 is an example diagram of different types of light emitting particles, associated with different visible colors, which may be coated on regions of substrate 14 (e.g. stripe region 32, stripe region 34, and stripe region 36) in a substantially transparent substrate. In embodiments, substrate 14 may include different regions in which different types of light emitting particle are dispersed. For example, a first type of light emitting particle (e.g. a light emitting particle associated with red light) may be dispersed in stripe region 32, a second type of light emitting particle (e.g. a light emitting particle associated with green light) may be dispersed in stripe region 34, and a third type of light emitting particle (e.g. a light emitting particle associated with blue light) may be dispersed in stripe region 36. Stripe regions may be formed in stripes (i.e. rows). In the alternative, stripe section could be subdivided into a block matrix pattern with alternating colors in each of the blocks. In the alternative to the stripe regions being coated on the surface of substrate 14, the stripe regions can be dispersed through the substrate.

A projector or laser (e.g. projector or laser 20) may use an excitation light wavelength range that excites all of the different types of light emitting particles and selectively illuminates different colors by spatial modulation of the excitation light. For example, in example FIG. 5, to emit green visible light in a given region of substrate 14, a projector or laser may illuminate a portion of stripe region 34 (e.g. which includes light emitting particles associated with green light). In embodiments that spatially separate the different types of light emitting particles, it is not necessary for the excitation light source to modulate the wavelength of the excitation light to create different colors, because color may be selected by the spatial modulation of the excitation light.

In embodiments, excitation light projected on substrate 14 of FIG. 5 can be wavelength modulated to cause emission of different colors. Accordingly, it may not be necessary to spatially modulate the excitation light. When the excitation light projected on substrate 14 is wavelength modulated, only the regions (e.g. stripes or pixels) which are sensitive to a particular wavelength will be illuminated. In embodiments, excitation light can be both spatially modulated and wavelength modulated.

Figure 6:
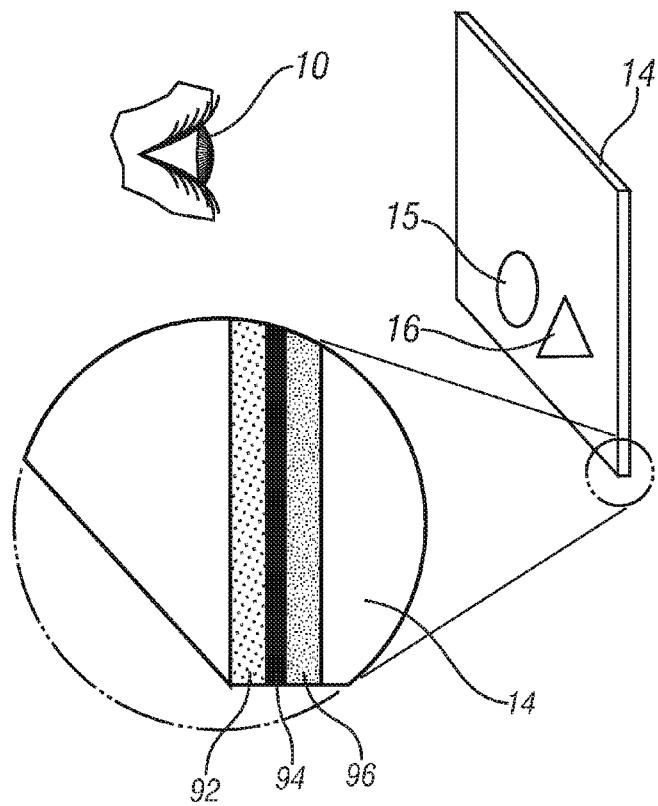
FIG. 6 illustrates different types of light emitting materials layered on a substrate, in accordance with the present disclosure.

FIG. 6 illustrates different types of light emitting materials layered on a substrate, in accordance with the present disclosure. In embodiments, the light emitting materials 92, 94, 96, are substantially transparent to light, except light with specific wavelength ranges which are absorbed and are different for each of the different light emitting materials 92, 94, and 96. Accordingly, in embodiments, the excitation light projected on substrate 14 does not need to be spatially modulated. Further, the layers may be coated on the substrate with different thicknesses. By coating the different light emitting materials 92, 94, and 96 with different thicknesses, the responsiveness to excitation light of a particular type of material can be controlled. For example, it may be desirable to balance the emission of different primary colors, since different light emitting materials may illuminate the different colors at different intensities from the same amount of absorbed light.

In embodiments, a screen is pixelated using RGB elements. Each pixel includes 3 portions for RGB respectively. A single projective UV beam can be illuminated onto the pixelated screen. To get various mixtures of RGB for different colors, the same UV projective beam on a pixel may be shifted to cover a certain amount of areas of the RGB elements within a pixel. Accordingly, only one projective beam is necessary to generate the full color projective image. The color balance of the RGB for a pixel can be calculated and converted into the right area of RGB elements on the screen, the beam can then be shifted to cover the right relative area percentage of each RGB elements to display the right color on the pixel.

Figure 7:
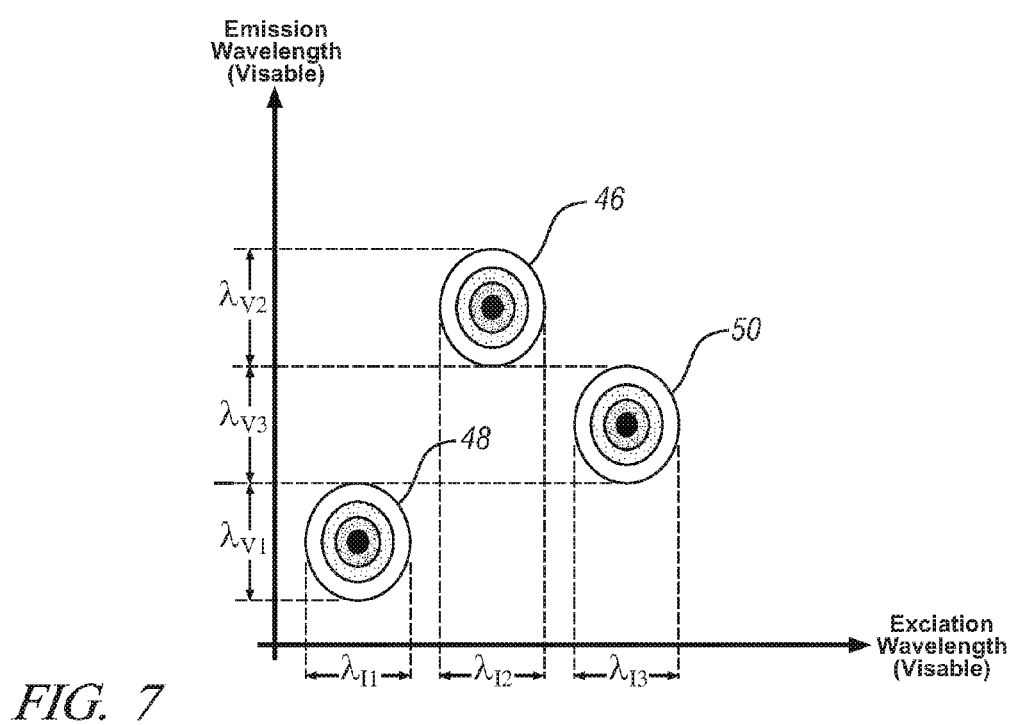
FIG. 7 is an exemplary diagram of the excitation and emission relationships of different light emitting materials, in accordance with the present disclosure.

FIG. 7 is an exemplary diagram of the excitation and emission relationships of different light emitting materials, in accordance with the present disclosure. Example region 48 illustrates the excitation/emission cross-section of a first type of light emitting material. Example region 46 illustrates the excitation/emission cross-section of a second type of light emitting material. Example region 50 illustrates the excitation/emission cross-section of a third type of light emitting material. However, it will be appreciated that many exemplary excitation/emission cross-sections are envisioned, including embodiments wherein a single excitation frequency range is capable of creating a plurality of emission ranges, or in the converse, wherein a plurality of excitation frequency ranges can alternatively create the same or overlapping emission ranges.

Each of the plurality of light emitting particles may have a diameter less than about 500 nanometers. Each of the plurality of light emitting particles may have a diameter less than about 400 nanometers. Each of the plurality of light emitting particles may have a diameter less than about 300 nanometers. Each of the plurality of light emitting particles may have a diameter less than about 200 nanometers. Each of the plurality of light emitting particles may have a diameter less than about 100 nanometers. Each of the plurality of light emitting particles may have a diameter less than about 50 nanometers. Each of the plurality of light emitting particles may be an individual molecule. Each of the plurality of light emitting particles may be an individual atom.

Figure 8:
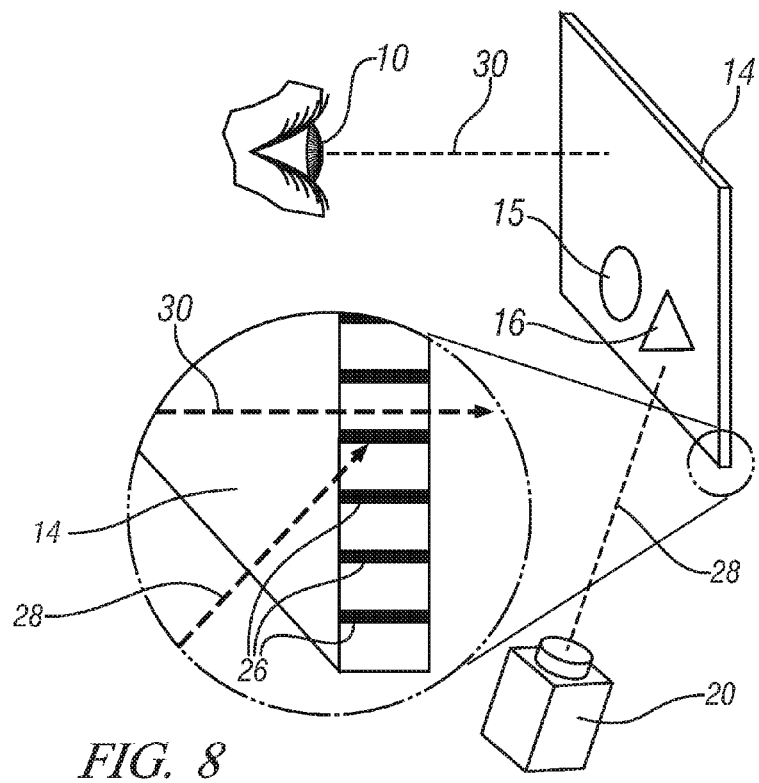
FIG. 8 is an exemplary diagram of a pattern of microstructures dispersed in a substantially transparent or translucent substrate, in accordance with the present disclosure.

The above embodiments describe fluorescent particles as a method to display graphical images upon an otherwise substantially transparent windscreen of a vehicle. However, those having skill in the art will appreciate that other methods are known to project graphical images upon a display that can be otherwise substantially transparent. FIG. 8 is an exemplary diagram of a pattern of microstructures dispersed in a substantially transparent or translucent substrate, in accordance with the present disclosure. Microstructures 26 are selectively dispersed in substrate 14 in regions. The width of the regions of microstructures 26 may be in a range of about 1 nanometer to about 10 millimeters. The regions of microstructures 26 form a pattern (e.g. a blind or a grid), such that there is limited cross-section of viewer's 10 light paths 30 with the microstructures 26. In embodiments, the pattern is repetitive. The fill-factor of the pattern may be in a range of about 0.01% to about 99%. However, the light path 28 from device 20 may be at an angle with the regions of microstructures 26 to maximize the cross-section with the microstructures 26, increasing the scattering of a visible image from device 20 to increase illumination of the visible image on substrate 14. The pitch of the regions of microstructures 26 may be in a range of about 1 nanometer to about 10 millimeters. The thickness of the regions of microstructures 26 may be in a range of about 1 micrometer to about 10 millimeters. The thickness of the regions of microstructures 26 may be smaller than the width and/or pitch of the regions of microstructures 26.

Figure 9:
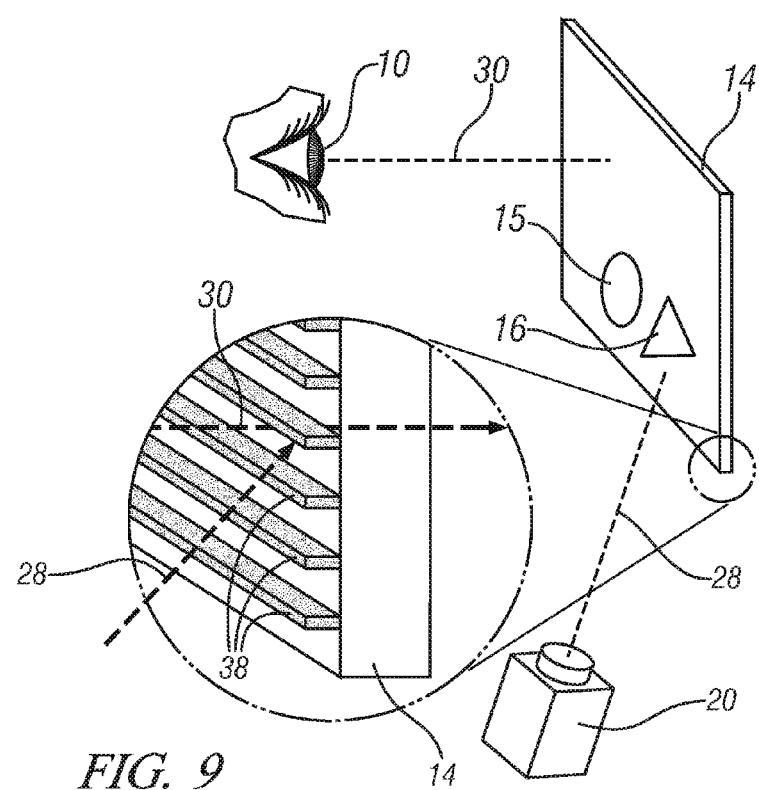
FIG. 9 is an example diagram of a pattern of microstructures disposed on a surface of a substantially transparent or translucent substrate, similar to FIG. 8, in accordance with the present disclosure.

FIG. 9 is an example diagram of a pattern of microstructures disposed on a surface of a substantially transparent or translucent substrate, similar to FIG. 8, in accordance with the present disclosure. Microstructures 38 may be coated in regions on substrate 14. The regions of microstructures 38 form a blind, such that there is limited (e.g. minimized) cross-section of viewer's 10 light paths 30 with microstructures 38. However, the light path 28 from device 20 may be at an angle with the regions of microstructures 38 to maximize the cross-section with the microstructures, increasing the scattering of a visible image from device 20 to increase illumination of the visible image on substrate 14. In embodiments, the cross-section with the surface of substrate 14 of each element of pattern of microstructures 38 is less than the depth of the pattern substantially perpendicular to substrate 14, which may increase the transparency of substrate 14.

Figure 10:
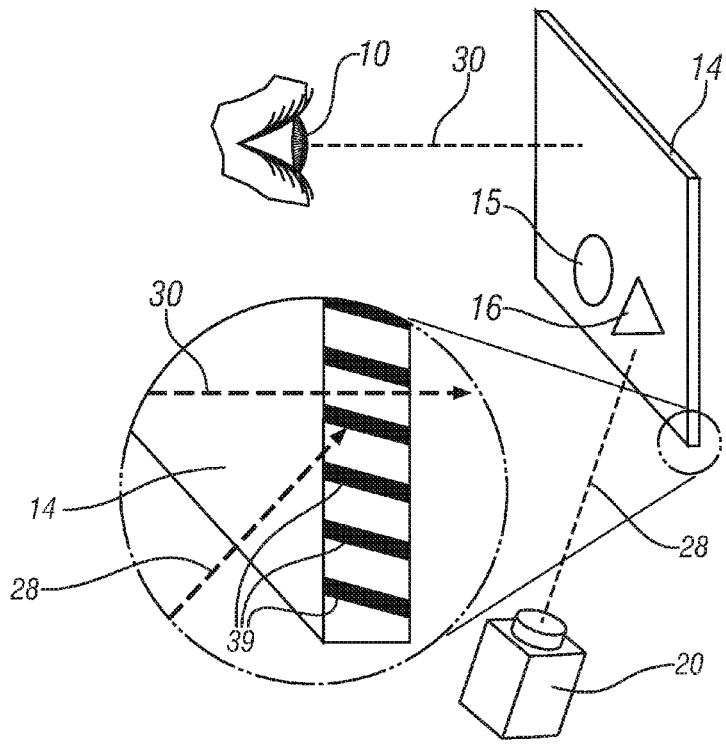
FIG. 10 is an example diagram of an angled pattern of microstructures dispersed in a substantially transparent or translucent substrate, similar to FIG. 8, in accordance with the present disclosure.

FIG. 10 is an example diagram of an angled pattern of microstructures dispersed in a substantially transparent or translucent substrate, similar to FIG. 8, in accordance with the present disclosure. Slanted regions of microstructures 39 are formed in substrate 14. The angle of the slanted regions of microstructures 39 affects the cross-sectional area of both the viewer's 10 light path 30 and light path 28 of projector 18. By increasing the cross-section of light path 28, increased scattering of viewable images may be accomplished, thereby increasing the illumination at substrate 14 of the viewable image. In embodiments, slanted regions of microstructures can also be accomplished by coating the regions of microstructures on substrate 14.

Embodiments relate to transparent projective displays with partially or directional transparent screens. In this display, a regular full color optical projector (or monochromatic scanner) may be applied to a partially or directional transparent screen to display an optical image. A partially or directional transparent screen may have dual characteristics. First, a partially or directional transparent screen may be sufficiently transparent to allow visual penetration of ambient light. Second, a partially or directional transparent screen may be filled or coated with reflective small particles or micro-structures that will deflect or scatter the projected optical images as a display screen. Such particles and micro-structures will not completely block the visible view through windows.

There are several approaches to prepare a partially or directional transparent screen, in accordance with embodiments. A transparent or translucent glass or plastic plate may be filled by fine particles from 1 nanometer to 10 micrometers. A transparent or translucent glass or plastic plate may be coated by fine particles from 1 nanometer to 10 micrometers. A transparent or translucent thin glass sheet or plastic film may be filled by fine particles from 1 nanometer to 10 micrometers. A transparent or translucent thin glass sheet or plastic film may be coated by fine particles from 1 nanometer to 10 micrometers. A diffusive grid may be embedded in or patterned on the surfaces of transparent or translucent glass or plastics sheets.

Both organic and inorganic particles or pigments may be applied in or on a partially or directional transparent screen. Some examples include titanium oxides, silica, alumna, latex, polystyrene particles. In embodiments, the size of the particles may range from about 1 nanometer to about 10 micrometers. In embodiments, the size of the particles ranges from about 10 nanometers to about 1 micrometers. These light scattering materials can be evenly dispersed into the glass or plastic hosts at appropriate concentrations, or they can be coated on the glass or plastic surfaces with an appropriate thickness. A protective overcoat or another layer of host can be applied on the particle coat to prevent the damage to the surface on physical touch.

The glass for a partially or directional transparent screen may include inorganic solids which are transparent or translucent to the visible light. Examples of such inorganic solids are oxides and halides. The glass may include silicates, borosilicate, lead crystal, alumina, silica, fused silica, quartz, glass ceramics, metal fluorides, and other similar materials. These types of glass may be used as the window in rooms, buildings, and/or moving vehicles. Plastics for a partially or directional transparent screen may include organic and polymeric solids, which are transparent or translucent to the visible light. Thermoplastics for fluorescent screens may include special thermoset solids, such as transparent gels. Some examples of the plastics include polyacrylic, polycarbonate, polyethylene, polypropylene, polystyrene, PVC, silicone, and other similar materials. Micro-structures may be integrated into the screen plate or on the surface, to deflect the projected image from an angle, while allowing the substantial visible transparency at normal viewing angles. An opaque diffusive grid may be embedded in the thin glass or plastic sheet. The area of the light scattering grid from a viewer who stands in front of the screen is substantially smaller than that from the image projector.

Directional transparent screen structures, in accordance with embodiments, may offer many advantages. Directional transparent screen structures may be substantially transparent to the viewer normal or slightly off the normal angle to the screen. Directional transparent screen structures may have a high reflectance or deflection to the projection image at a tilting angle to the screen. A columnar transparent region may be solid opaque to the projection image at the tilting angle. Such strong image scattering may enhance the contrast of the projection images on the display window, while not blocking the direct view normal to the screen. Directional transparent screen structures may be useful in automobiles, where the driver's view is typically normal to the windshield glass. In embodiments, opaque columns trespass the depth of a transparent host glass or plastics. In embodiments, the sizes and the density of the microstructures on the screen may be varied to adjust to transparency of normal view and reflectance image contrast. The depth of the screen and the projection angle may also be varied to tune the contrast and transparency.

In embodiments, the surfaces of the screen may be patterned to various unisotropic structures to function as an "unisotropic" screen. For example, a pattern of overcoat with certain thickness (e.g. 10 nanometer to 1 millimeter) can be applied to the screen surfaces, by various printing, stamping, photolithographic methods, micro-contact printing, and other similar methods. Such printing may form a pattern of very fine scattering features and structures on the surface of the screen, which may allow for angular scattering and displaying of projected images, while allowing a substantially direct view through the screen at a substantially normal angle to the screen.

Figure 11:
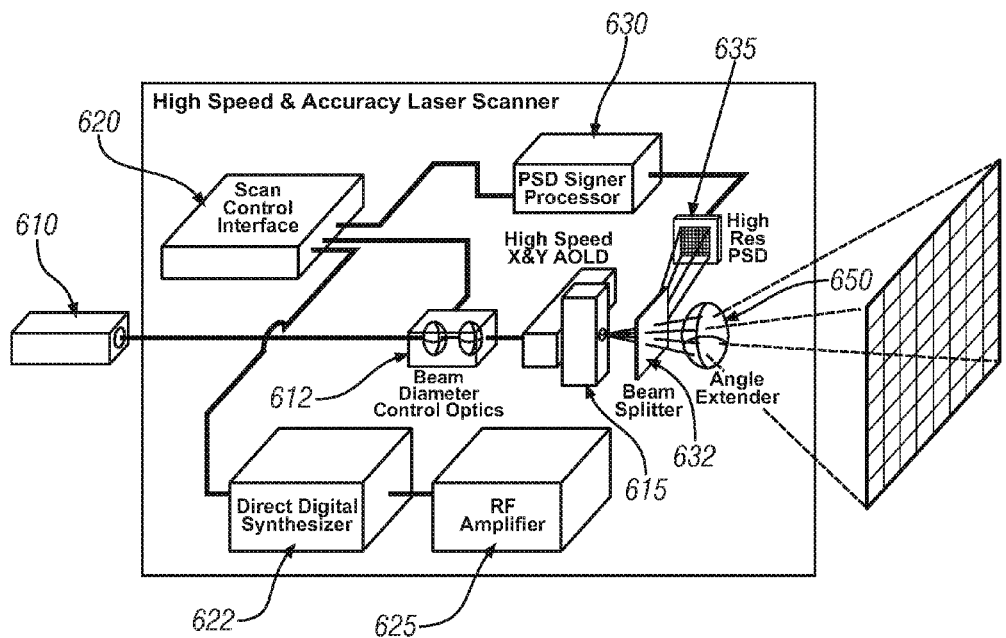
FIG. 11 illustrates an exemplary embodiment of a two-dimensional light beam based FC display subsystem, in accordance with the present disclosure.

FIG. 11 illustrates an exemplary embodiment of a two-dimensional light beam based FC display subsystem, in accordance with the present disclosure. The excitation source 610 preferably passes through a set of beam-diameter control optics 612 and a 2-D acousto-optical scanner 615. A scan control interface unit 620 coordinates the functions of a Direct Digital Synthesizer 622, an RF amplifier 625 and Beam-Diameter Control Optics 612. The processes image beam is projected on to a FC screen through an angle extender 650. In order to deliver consistent and stable image on the FC screen, a beam splitter deflects the image into a position sensitive detector (PSD) 635 and processed through position sensitive detector processor 630, feedback to scan control interface unit 620. The close-loop image feedback formed by 632, 635, 630 and 620 is incorporated to maintain position accuracy and pointing stability of the laser beam.

It will be apparent to those having ordinary skill of the art that many variations and modifications can be made to the system, method, material and apparatus of FC based display disclosed herein without departing from the spirit and scope of the present disclosure. It is therefore intended that the present disclosure cover the modifications and variations of this disclosure provided that they come within the scope of the appended claims and their equivalents.

In embodiments, a UV lamp or lower wavelength visible lamp is used in the projector, which may be a liquid crystal display (LCD) or DLP. The projector may interface to a computer, PDA, DVD, VCR, TV, or other information input devices. In embodiments, a fluorescent screen may be a transparent or translucent glass or plastic plate filled by fluorescent organic dyes or inorganic phosphors.

Transparent or substantially transparent displays may have many applications. For example, transparent or substantially transparent displays may display an image on a transparent or translucent window of moving vehicles, such as automobiles, motorcycles, aircrafts, and boats; the image may be information on the conditions of the vehicles. Directions (e.g. GPS map), that are currently displayed on the dashboard electronic display, may be projected onto the windows (e.g. front glass, wind shields) of the vehicle. Drivers do not have to turn their eyes away from the road to view the vehicle conditions and/or directions.

In embodiments, a fluorescent screen may be a transparent or translucent glass or plastic plate filled by fluorescent organic dyes or inorganic phosphors. In embodiments, a fluorescent screen may be a transparent or translucent glass or plastic plate coated by fluorescent organic dyes or inorganic phosphors. In embodiments, a fluorescent screen may be a transparent or translucent thin glass sheet or plastic film filled by fluorescent organic dyes or inorganic phosphors. In embodiments, a fluorescent screen may be a transparent or translucent thin glass sheet or plastic film coated by fluorescent organic dyes or inorganic phosphors. The glass for the fluorescent screen may include inorganic solids which are transparent or translucent to the visible light. Examples of such inorganic solids are oxides and halides. The glass may include silicates, borosilicate, lead crystal, alumina, silica, fused silica, quartz, glass ceramics, metal fluorides, and other similar materials. These types of glass may be used as the window in rooms, buildings, and/or moving vehicles. Plastics for fluorescent screens may include organic and polymeric solids, which are transparent or translucent to the visible light. Thermoplastics for fluorescent screens may include special thermoset solids, such as transparent gels. Some examples of the plastics include polyacrylic, polycarbonate, polyethylene, polypropylene, polystyrene, PVC, silicone, and other similar materials.

Glass and plastic may be turned into fluorescent projective displays, by combining them with fluorescent dyes. Fluorescent dyes are organic molecules or materials that can absorb a higher energy photon and emit lower energy photon. To emit visible light, such molecules may absorb UV light or lower wavelength visible (e.g. violet or blue) light, in the typical wavelength range of 190 nm to 590 nm or in the wavelength range of 300 nm to 450 nm. Some examples of the fluorescent dyes include (but are not limited to) commercial dye molecules from various dye vendors, including Lambda Physik and Exciton. Fluorescent dyes that may be used in a transparent display include Pyrromethene, Coumarin, Rhodamine, Fluorescein, and other aromatic hydrocarbons and their derivatives. In addition, there are many polymers containing unsaturated bonds, which can be fluorescent materials that may be used in a transparent display. For example, some of them (MEH-PPV, PPV, etc) have been used in optoelectronic devices, such as polymer light emitting diodes (PLED).

Glass or plastics may be turned into a fluorescent projective display, by combining them with phosphor materials. The down-conversion phosphors include inorganic or ceramic particles or nano-particles, including but not limited to metal oxides, metal halides, metal chalcoginides (e.g. metal sulfides), or their hybrids, such as metal oxo-halides and metal oxo-chalcoginides. These inorganic phosphors have found wide applications in fluorescent lamps and electronic monitors. They may be applied in converting shorter wavelength projective light (e.g. UV and blue) into higher wavelength visible light. They may be dispersed or coated to the transparent screen or window and excited by corresponding shorter wavelength projective light to display a visible image.

Fluorescent phosphors or dye molecules that can be excited into visible light by projective light ranging from ultraviolet light (e.g. wavelength greater than 240 nanometer) to blue (e.g. less than 500 nanometer). Lamps for projectors may emit light in this range of wavelengths. Such lamps are commercially available (e.g. those used for skin-tanning purposes). They can also be halogen lamps, special incandescent lamps, and arc vapor lamps (e.g. mercury, xenon, deuteron, etc). Such lamps may contain phosphors to convert shorter wavelength UV to longer wavelength UV.

Phosphors containing metal oxide hosts (e.g. metal silicates, metal borates, metal phosphates, metal aluminates); metal oxohalides, oxosulfides, metal halides, metal sulfides, and chalcoginides may be applied to the projective fluorescence displays. One example of phosphors that may be used in fluorescent displays includes the Garnet series of phosphors: $(Y_mAl-m)3(AlnB1-n)5O12$, doped with Ce; where $0<=m, n<=1$; A includes other rare earth elements, B include B and/or Ga. In addition, phosphors containing common rare earth elements (e.g. Eu, Tb, Ce, Dy, Er, Pr, and/or Tm) and transitional or main group elements (e.g. Mn, Cr, Ti, Ag, Cu, Zn, Bi, Pb, Sn, and/or Tl) as the fluorescent activators may be applied to projective fluorescence displays. Some undoped materials (e.g. metal, Ca, Zn, Cd, tungstates, metal vanadates, and ZnO) are also luminescent materials and may be applied in projective fluorescent displays.

The organic dyes and inorganic phosphors may be filled in or coated on the hosts of glass or plastics to prepare a fluorescent transparent screen. The dye molecules, if dissolved in the hosts, will not scatter the visible light, although it may absorb some visible light and add some color tint to the hosts. In contrast, larger phosphor particles will scatter visible light, which will affect the optical transparency of the hosts. Embodiments relate to different approaches to reduce the scattering of the phosphor particles to visible light. In embodiments, the size of the phosphor particles is reduced. In embodiments, the concentration of phosphor particles is reduced and evenly dispersed in the host. In embodiments, hosts are chosen with refractive indexes close to those of the phosphors to reduce the scattering or phosphors are chosen with refractive indexes close to those of the hosts.

Known vehicle systems utilize sensors, inputs from various devices, and on-board or remote processing to establish information regarding the environment surrounding the vehicle. For instance, adaptive cruise control systems utilize sensors such as radar devices to track objects such as a target vehicle in front of the host vehicle and adjust vehicle speed in accordance with a range and a change in range sensed with respect to the target vehicle. Collision avoidance or preparation systems analyze objects sensed in the path of the vehicle and take actions based upon a perceived probability of collision between the sensed object and the vehicle. Lane keeping systems utilize available sensor and data to maintain a vehicle within lane markings.

Figure 12:
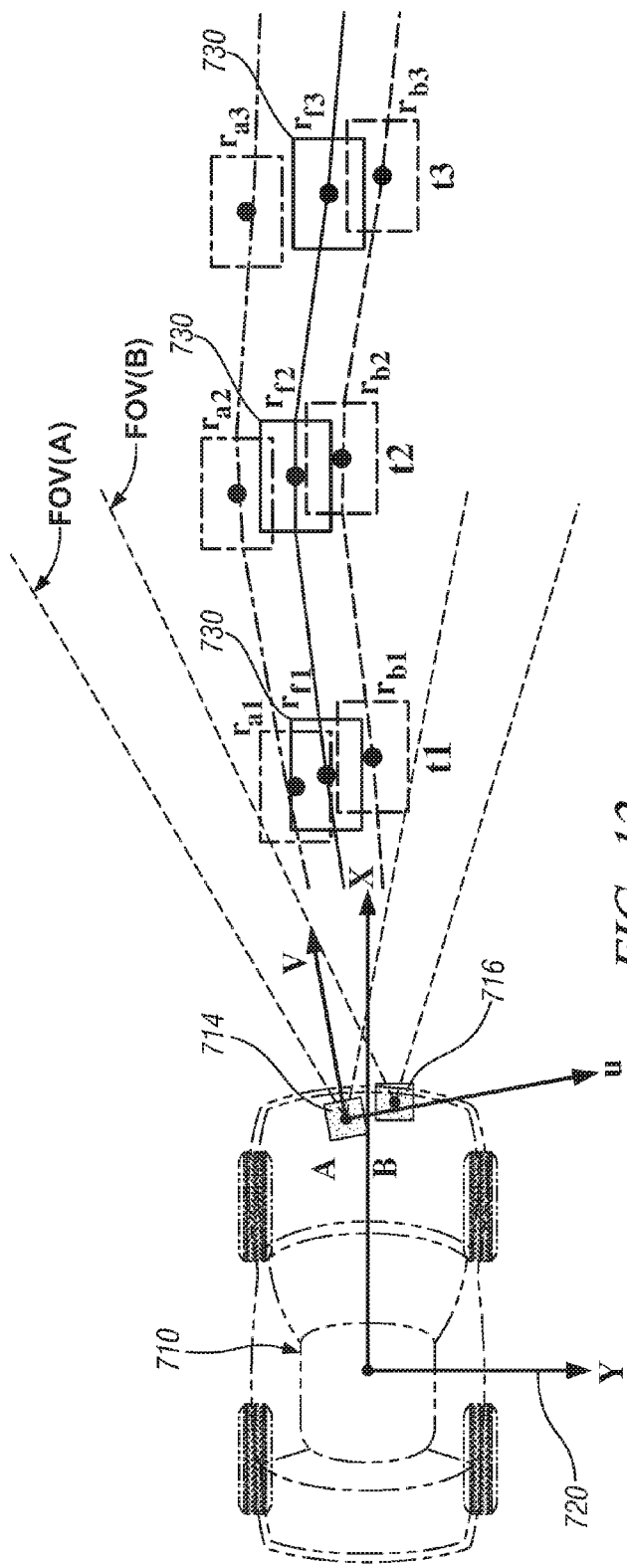
FIG. 12 shows a schematic diagram of the vehicle 10 system which has been constructed with a target tracking system, in accordance with the present disclosure.

FIG. 12 shows a schematic diagram of the vehicle 710 system which has been constructed with a target tracking system, in accordance with the present disclosure. The exemplary vehicle includes a passenger vehicle intended for use on highways, although it is understood that the disclosure described herein is applicable on any vehicle or other system seeking to monitor position and trajectory of remote vehicles and other objects. The vehicle includes a control system containing various algorithms and calibrations executed at various times. The control system is preferably a subset of an overall vehicle control architecture which is operable to provide coordinated vehicle system control. The control system is operable to monitor inputs from various sensors, synthesize pertinent information and inputs, and execute algorithms to control various actuators to achieve control targets, including such parameters as collision avoidance and adaptive cruise control. The vehicle control architecture includes a plurality of distributed processors and devices, including a system controller providing functionality such as antilock brakes, traction control, and vehicle stability.

Figure 13:
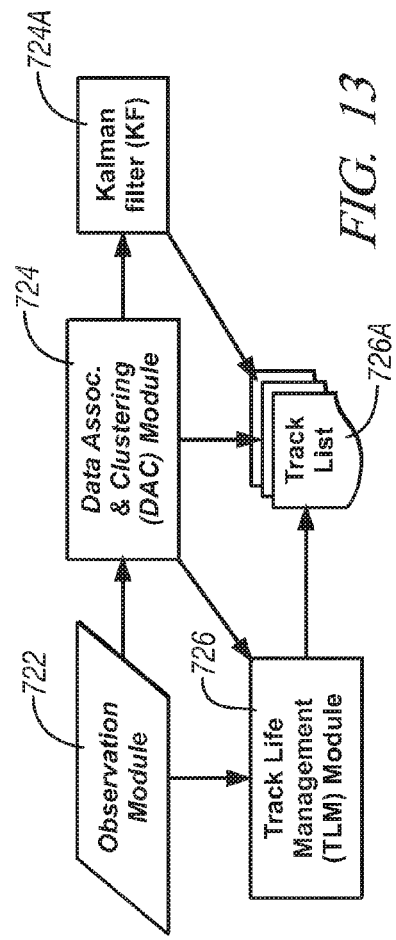
FIG. 13 depicts an information flow utilized in creating a track list, in accordance with the present disclosure.
Figure 14:
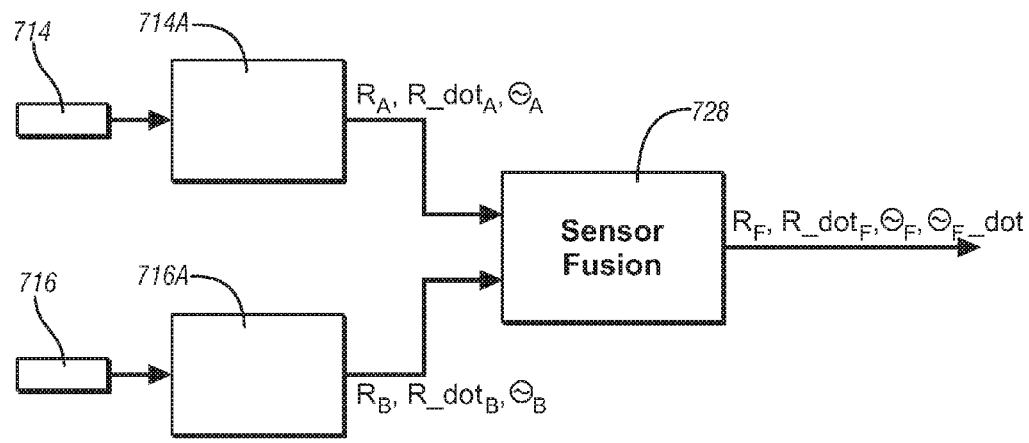
FIG. 14 depicts an exemplary data fusion process, in accordance with the present disclosure.

Referring to FIGS. 12-14, the exemplary vehicle 710 includes a control system having an observation module 722, a data association and clustering (DAC) module 724 that further includes a Kalman filter 724A, and a track life management (TLM) module 726 that keeps track of a track list 726A including of a plurality of object tracks. More particularly, the observation module includes sensors 714 and 716, their respective sensor processors, and the interconnection between the sensors, sensor processors, and the DAC module.

The exemplary sensing system preferably includes object-locating sensors including at least two forward-looking range sensing devices 714 and 716 and accompanying subsystems or processors 714A and 716A. The object-locating sensors may include a short-range radar subsystem, a long-range radar subsystem, and a forward vision subsystem. The object-locating sensing devices may include any range sensors, such as FM-CW radars, (Frequency Modulated Continuous Wave), pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other known camera/video image processors which utilize digital photographic methods to 'view' forward objects. Such sensing systems are employed for detecting and locating objects in automotive applications, useable with systems including, e.g., adaptive cruise control, collision avoidance, collision preparation, and side-object detection. The exemplary vehicle system may also include a global position sensing (GPS) system.

These sensors are preferably positioned within the vehicle 710 in relatively unobstructed positions relative to a view in front of the vehicle. It is also appreciated that each of these sensors provides an estimate of actual location or condition of a targeted object, wherein the estimate includes an estimated position and standard deviation. As such, sensory detection and measurement of object locations and conditions are typically referred to as "estimates." It is further appreciated that the characteristics of these sensors are complementary, in that some are more reliable in estimating certain parameters than others. Conventional sensors have different operating ranges and angular coverages, and are capable of estimating different parameters within their operating range. For example, radar sensors can usually estimate range, range rate and azimuth location of an object, but is not normally robust in estimating the extent of a detected object. A camera with vision processor is more robust in estimating a shape and azimuth position of the object, but is less efficient at estimating the range and range rate of the object. Scanning type Lidars perform efficiently and accurately with respect to estimating range, and azimuth position, but typically cannot estimate range rate, and is therefore not accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, conventional sensors present parametric variances, but more importantly, the operative overlap of these sensors creates opportunities for sensory fusion.

Each object-locating sensor and subsystem provides an output including range, R, time-based change in range, R_dot, and angle, Θ, preferably with respect to a longitudinal axis of the vehicle, which can be written as a measurement vector (o), i.e., sensor data. An exemplary short-range radar subsystem has a field-of-view (FOV) of 160 degrees and a maximum range of thirty meters. An exemplary long-range radar subsystem has a field-of-view of 17 degrees and a maximum range of 220 meters. An exemplary forward vision subsystem has a field-of-view of 45 degrees and a maximum range of fifty (50) meters. For each subsystem the field-of-view is preferably oriented around the longitudinal axis of the vehicle 710. The vehicle is preferably oriented to a coordinate system, referred to as an XY-coordinate system 720, wherein the longitudinal axis of the vehicle 710 establishes the X-axis, with a locus at a point convenient to the vehicle and to signal processing, and the y-axis is established by an axis orthogonal to the longitudinal axis of the vehicle 710 and in a horizontal plane, which is thus parallel to ground surface.

FIG. 14 depicts an exemplary data fusion process, in accordance with the present disclosure. As shown in FIG. 14, the illustrated observation module includes first sensor 714 located and oriented at a discrete point A on the vehicle, first signal processor 714A, second sensor 716 located and oriented at a discrete point B on the vehicle, and second signal processor 716A. The first processor 714A converts signals (denoted as measurement $o_A$) received from the first sensor 714 to determine range (RA), a time-rate of change of range (R_dotA), and azimuth angle (ΘA) estimated for each measurement in time of target object 730. Similarly, the second processor 716A converts signals (denoted as measurement $o_B$) received from the second sensor 716 to determine a second set of range (RB), range rate (R_dotB), and azimuth angle (ΘB) estimates for the object 730.

The exemplary DAC module 724 includes a controller 728, wherein an algorithm and associated calibration (not shown) is stored and configured to receive the estimate data from each of the sensors A, B, to cluster data into like observation tracks (i.e. time-coincident observations of the object 730 by sensors 714 and 716 over a series of discrete time events), and to fuse the clustered observations to determine a true track status. It is understood that fusing data using different sensing systems and technologies yields robust results. Again, it is appreciated that any number of sensors can be used in this technique. However, it is also appreciated that an increased number of sensors results in increased algorithm complexity, and the requirement of more computing power to produce results within the same time frame. The controller 728 is housed within the host vehicle 710, but may also be located at a remote location. In this regard, the controller 728 is electrically coupled to the sensor processors 714A, 716A, but may also be wirelessly coupled through RF, LAN, infrared or other conventional wireless technology. The TLM module 726 is configured to receive and store fused observations in a list of tracks 726A.

Sensor registration, or "alignment" of sensors, in multi-target tracking ('MTT') fusion, involves determining the location, orientation and system bias of sensors along with target state variables. In a general MTT system with sensor registration, a target track is generated during vehicle operation. A track represents a physical object and includes a number of system state variables, including, e.g., position and velocity. Measurements from each individual sensor are usually associated with a certain target track. A number of sensor registration techniques are known in the art and will not be discussed in detail herein.

The schematic illustration of FIG. 12 includes the aforementioned object-locating sensors 714 and 716 mounted on the exemplary vehicle at positions A and B, preferably mounted at the front of the vehicle 710. The target object 730 moves away from the vehicle, wherein t1, t2, and t3 denote three consecutive time frames. Lines ra1-ra2-ra3, rf1-rf2-rf3, and rb1-rb2-rb3 represent, respectively, the locations of the target measured by first sensor 714, fusion processor, and second sensor 716 at times t1, t2, and t3, measured in terms of $o_A=(R_A, R\_dot_A, \Theta_A)$ and $o_B=(R_B, R\_dot_B, \Theta_B, \Theta_B)$, using sensors 714 and 716, located at points A, B.

A known exemplary trajectory fusing process, for example as disclosed in U.S. Pat. No. 7,460,951, entitled SYSTEM AND METHOD OF TARGET TRACKING USING SENSOR FUSION, and incorporated herein by reference, permits determining position of a device in the XY-coordinate system relative to the vehicle. The fusion process includes measuring the target object 730 in terms of $o_A=(R_A, R\_dot_A, \Theta^A)$ and $o_B=(R_B, R\_dot_B, \Theta_B)$, using sensors 714 and 716, located at points A, B. A fused location for the target object 730 is determined, represented as x=(RF, R_dotF, ΘF, Θ_dotf), described in terms of range, R, and angle, Θ, as previously described. The position of forward object 730 is then converted to parametric coordinates relative to the vehicle's XY-coordinate system. The control system preferably uses fused track trajectories (Line rf1, rf2, rf3), including a plurality of fused objects, as a benchmark, i.e., ground truth, to estimate true sensor positions for sensors 714 and 716. As shown in FIG. 12, the fused track's trajectory is given by the target object 730 at time series t1, t2, and t3. Using a large number of associated object correspondences, such as {(ra1, rf1, rb1), (ra2, rf2, rb2), (ra3, rf3, rb3)} true positions of sensors 714 and 716 at points A and B, respectively, can be computed to minimize residues, preferably employing a known least-squares calculation method. In FIG. 12, the items designated as ra1, ra2, and ra3 denote an object map measured by the first sensor 714. The items designated as rb1, rb2, and rb3 denote an object map observed by the second sensor 716.

FIG. 13 depicts an information flow utilized in creating a track list, in accordance with the present disclosure. In FIG. 13, referenced tracks are preferably calculated and determined in the sensor fusion block 728 of FIG. 14, described above. The process of sensor registration includes determining relative locations of the sensors 714 and 716 and the relationship between their coordinate systems and the frame of the vehicle, identified by the XY-coordinate system. Registration for single object sensor 716 is now described. All object sensors are preferably handled similarly. For object map compensation, the sensor coordinate system or frame, i.e. the UV-coordinate system, and the vehicle coordinate frame, i.e. the XY-coordinate system, are preferably used. The sensor coordinate system (u, v) is preferably defined by: (1) an origin at the center of the sensor; (2) the v-axis is along longitudinal direction (bore-sight); and (3) a u-axis is normal to v-axis and points to the right. The vehicle coordinate system, as previously described, is denoted as (x, y) wherein x-axis denotes a vehicle longitudinal axis and y-axis denotes the vehicle lateral axis.

The locations of track (x) can be expressed in XY-coordinate system as (r). Sensor measurement (o) can be expressed in UV-coordinate as (q). The sensor registration parameters (a) include of rotation (R) and translation (r0) of the UV-coordinate system.

Figure 15:
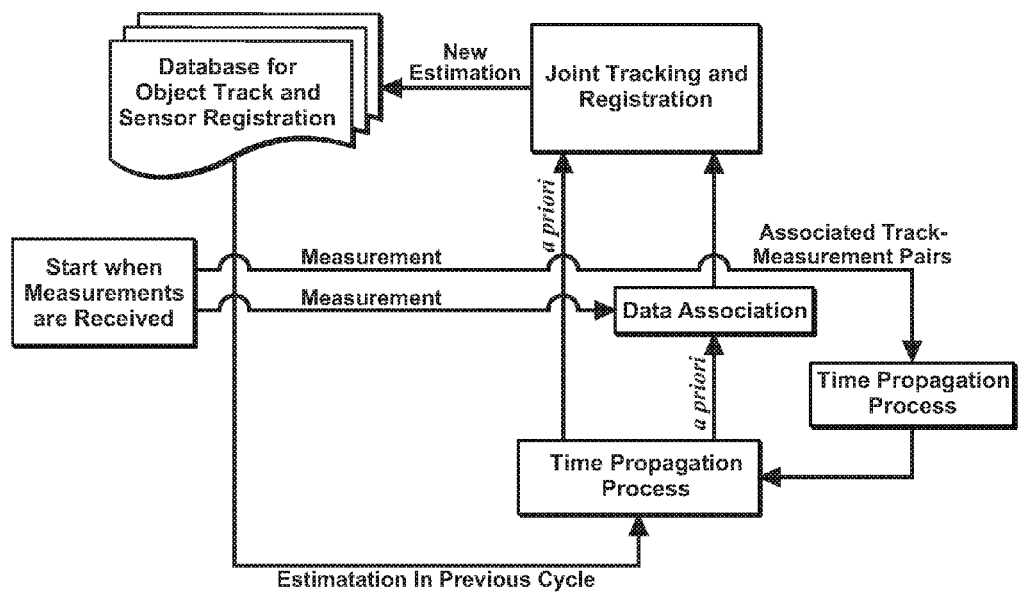
FIG. 15 depicts an exemplary dataflow enabling joint tracking and sensor registration, in accordance with the present disclosure.

FIG. 15 depicts an exemplary dataflow enabling joint tracking and sensor registration, in accordance with the present disclosure. The method is initiated upon reception of sensor data. A data association module will match the sensor data with the predicted location of a target. The joint tracking and registration module combines the previous estimation (i.e., a priori) and new data (i.e., matched measurement-track pairs), and updates the target tracks estimation and sensor registration data in the database. The time propagation process module predicts the target tracks or sensor registration parameters in the next time cycle based on the historical sensor registration, tracks and current vehicle kinematics via a dynamics model. The sensor registration parameters are usually assumed to be substantially constant over time. Confidence of the registration parameters accumulates over time. However, a priori information about registration will be reset to zero when a significant sensor registration change is detected (e.g., vehicle collision).

Object tracks can be utilized for a variety of purposes including adaptive cruise control, wherein the vehicle adjusts speed to maintain a minimum distance from vehicles in the current path, as described above. Another similar system wherein object tracks can be utilized is a collision preparation system (CPS), wherein identified object tracks are analyzed in order to identify a likely impending or imminent collision based upon the track motion relative to the vehicle. A CPS warns the driver of an impending collision and reduces collision severity by automatic braking if a collision is considered to be unavoidable. A method is disclosed for utilizing a multi-object fusion module with a CPS, providing countermeasures, such as seat belt tightening, throttle idling, automatic braking, air bag preparation, adjustment to head restraints, horn and headlight activation, adjustment to pedals or the steering column, adjustments based upon an estimated relative speed of impact, adjustments to suspension control, and adjustments to stability control systems, when a collision is determined to be imminent.

Figure 16:
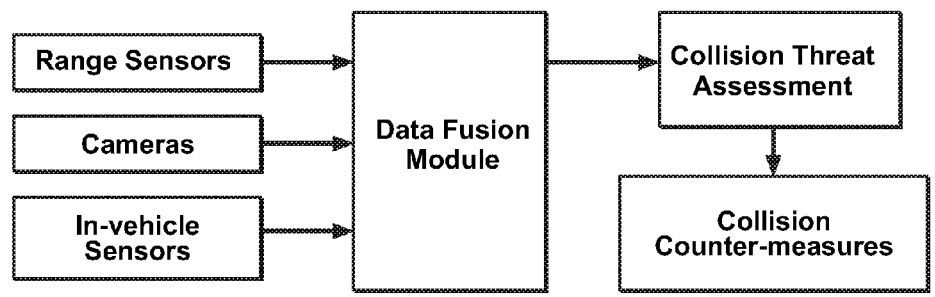
FIG. 16 schematically illustrates an exemplary system whereby sensor inputs are fused into object tracks useful in a collision preparation system, in accordance with the present disclosure.

FIG. 16 schematically illustrates an exemplary system whereby sensor inputs are fused into object tracks useful in a collision preparation system, in accordance with the present disclosure. Inputs related to objects in an environment around the vehicle are monitored by a data fusion module. The data fusion module analyzes, filters, or prioritizes the inputs relative to the reliability of the various inputs, and the prioritized or weighted inputs are summed to create track estimates for objects in front of the vehicle. These object tracks are then input to the collision threat assessment module, wherein each track is assessed for a likelihood for collision. This likelihood for collision can be evaluated, for example, against a threshold likelihood for collision, and if a collision is determined to be likely, collision counter-measures can be initiated.

As shown in FIG. 16, a CPS continuously monitors the surrounding environment using its range sensors (e.g., radars and lidars) and cameras and takes appropriate counter-measurements in order to avoid incidents or situations to develop into a collision. A collision threat assessment generates output for the system actuator to respond.

As described in FIG. 16, a fusion module is useful to integrate input from various sensing devices and generate a fused track of an object in front of the vehicle. The fused track created in FIG. 16 includes a data estimate of relative location and trajectory of an object relative to the vehicle. This data estimate, based upon radar and other range finding sensor inputs is useful, but includes the inaccuracies and imprecision of the sensor devices utilized to create the track. As described above, different sensor inputs can be utilized in unison to improve accuracy of the estimates involved in the generated track. In particular, an application with invasive consequences such as automatic braking and potential airbag deployment require high accuracy in predicting an imminent collision, as false positives can have a high impact of vehicle drivability, and missed indications can result in inoperative safety systems.

Vision systems provide an alternate source of sensor input for use in vehicle control systems. Methods for analyzing visual information are known in the art to include pattern recognition, corner detection, vertical edge detection, vertical object recognition, and other methods. However, it will be appreciated that high-resolution visual representations of the field in front a vehicle refreshing at a high rate necessary to appreciate motion in real-time include a very large amount of information to be analyzed. Real-time analysis of visual information can be prohibitive. A method is disclosed to fuse input from a vision system with a fused track created by methods such as the exemplary track fusion method described above to focus vision analysis upon a portion of the visual information most likely to pose a collision threat and utilized the focused analysis to alert to a likely imminent collision event.

Figure 17:
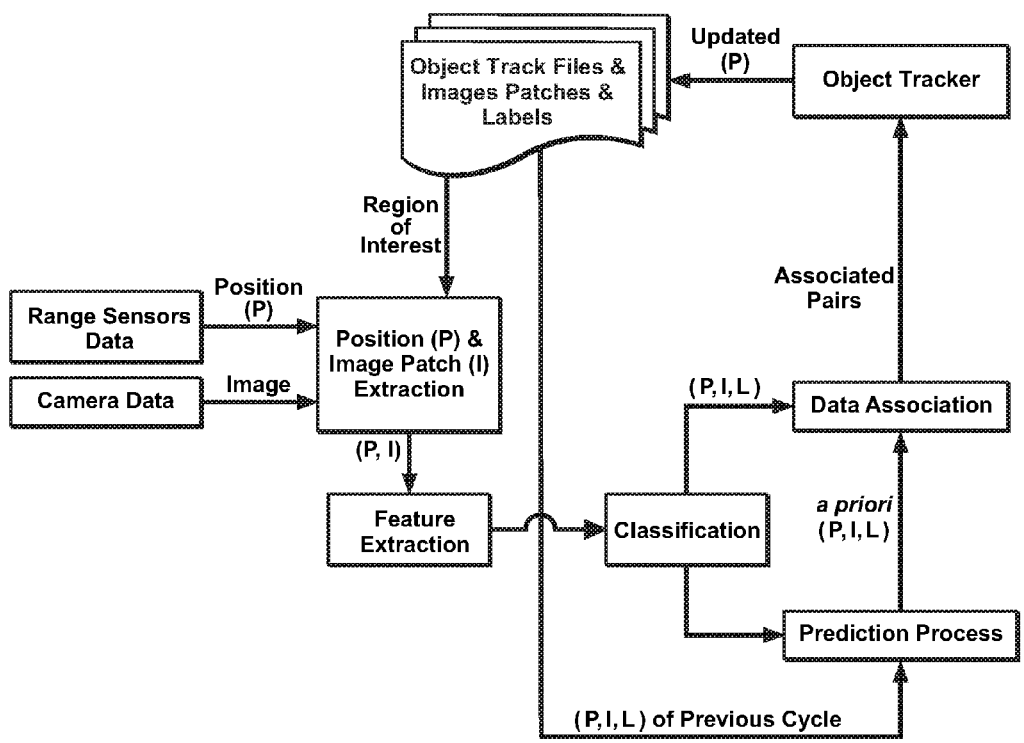
FIG. 17 schematically illustrates an exemplary image fusion module, in accordance with the present disclosure.

FIG. 17 schematically illustrates an exemplary image fusion module, in accordance with the present disclosure. The fusion module of FIG. 17 monitors as inputs range sensor data including object tracks and camera data. The object track information is used to extract an image patch or a defined area of interest in the visual data corresponding to object track information. Next, areas in the image patch are analyzed and features or patterns in the data indicative of an object in the patch are extracted. The extracted features are then classified according to any number of classifiers. An exemplary classification can include classification as a fast moving object, such a vehicle in motion, a slow moving object, such as a pedestrian, and a stationary object, such as a street sign. Data including the classification is then analyzed according to data association in order to form a vision fused based track. These tracks and associated data regarding the patch are then stored for iterative comparison to new data and for prediction of relative motion to the vehicle suggesting a likely or imminent collision event. Additionally, a region or regions of interest, reflecting previously selected image patches, can be forwarded to the module performing image patch extraction, in order to provide continuity in the analysis of iterative vision data. In this way, range data or range track information is overlaid onto the image plane to improve collision event prediction or likelihood analysis.

Figure 19:
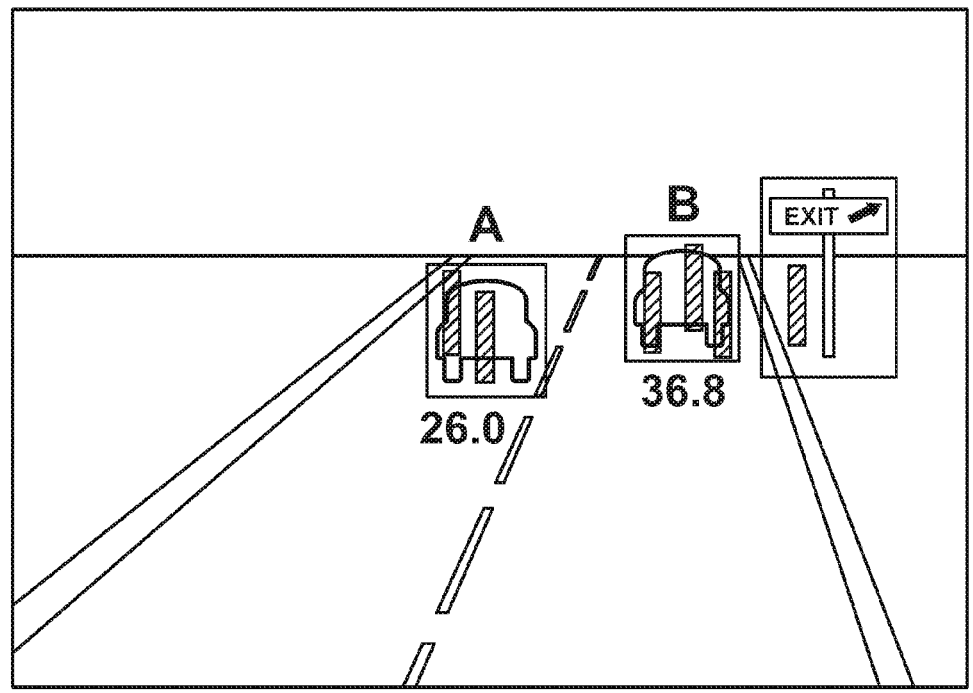
FIG. 19 illustrates exemplary range data overlaid onto a corresponding image plane, useful in system-internal analyses of various target objects, in accordance with the present disclosure.

FIG. 19 illustrates exemplary range data overlaid onto a corresponding image plane, useful in system-internal analyses of various target objects, in accordance with the present disclosure. The shaded bars are the radar tracks overlaid in the image of a forward-looking camera. The position and image extraction module extracts the image patches enclosing the range sensor tracks. The feature extraction module computes the features of the image patches using following transforms: edge, histogram of gradient orientation (HOG), scale-invariant feature transform (SIFT), Harris corner detectors, or the patches projected onto a linear subspace. The classification module takes the extracted features as input and feed to a classifier to determine whether an image patch encloses an object. The classification determines the label of each image patch. For example, in FIG. 19, the boxes A and B are identified as vehicles while the unlabelled box is identified as a road-side object. The prediction process module utilizes an object's historical information (i.e., position, image patch, and label of previous cycle) and predicts the current values. The data association links the current measurements with the predicted objects, or determines the source of a measurement (i.e., position, image patch, and label) is from a specific object. In the end, the object tracker is activated to generate updated position and save back to the object track files.

Figure 18:
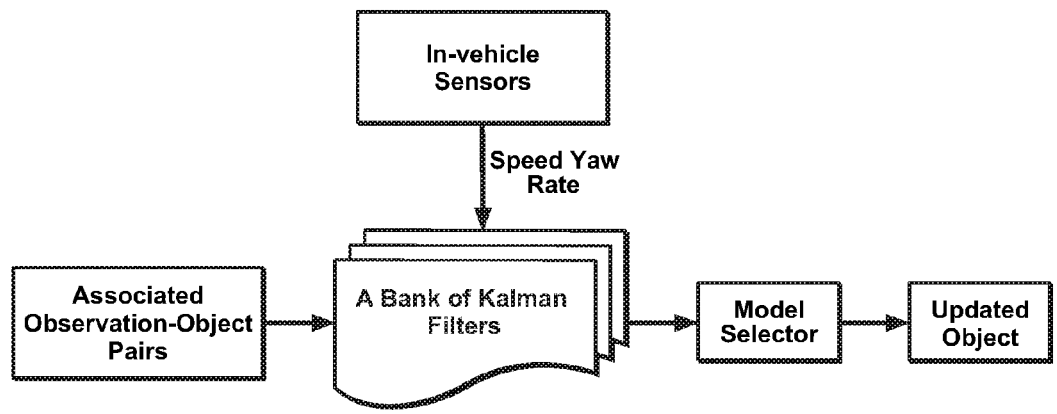
FIG. 18 schematically depicts an exemplary bank of Kalman filters operating to estimate position and velocity of a group objects, in accordance with the present disclosure.

FIG. 18 schematically depicts an exemplary bank of Kalman filters operating to estimate position and velocity of a group objects, accordance with the present disclosure. Different filters are used for different constant coasting targets, high longitudinal maneuver targets, and stationary targets. A Markov decision process (MDP) model is used to select the filter with the most likelihood measurement based on the observation and target's previous speed profile. This Multi-model filtering scheme reduces the tracking latency, which is important for CPS function.

Reaction to likely collision events can be scaled based upon increased likelihood. For example, gentle automatic braking can be used in the event of a low threshold likelihood being determined, and more drastic measures can be taken in response to a high threshold likelihood being determined.

Additionally, it will be noted that improved accuracy of judging likelihood can be achieved through iterative training of the alert models. For example, if an alert is issued, a review option can be given to the driver, through a voice prompt, and on-screen inquiry, or any other input method, requesting that the driver confirm whether the imminent collision alert was appropriate. A number of methods are known in the art to adapt to correct alerts, false alerts, or missed alerts. For example, machine learning algorithms are known in the art and can be used to adaptively utilize programming, assigning weights and emphasis to alternative calculations depending upon the nature of feedback. Additionally, fuzzy logic can be utilized to condition inputs to a system according to scalable factors based upon feedback. In this way, accuracy of the system can be improved over time and based upon the particular driving habits of an operator.

It will be appreciated that similar methods employed by the CPS can be used in a collision avoidance system. Frequently such systems include warnings to the operator, automatic brake activation, automatic lateral vehicle control, changes to a suspension control system, or other actions meant to assist the vehicle in avoiding a perceived potential collision.

Additionally, numerous methods are known to achieve lane keeping or place a vehicle within a lane by sensor inputs. For example, a method can analyze visual information including paint lines on a road surface, and utilize those markings to place the vehicle within a lane. Some methods utilize tracks of other vehicles to synthesize or assist in establishing lane geometry in relation to the vehicle. GPS devices, utilized in conjunction with 3D map databases, make possible estimating a location of a vehicle according to global GPS coordinates and overlaying that position with known road geometries.

An exemplary method for generating estimates of geometry of a lane of travel for a vehicle on a road is disclosed. The method includes monitoring data from a global positioning device, monitoring map waypoint data describing a projected route of travel based upon a starting point and a destination, monitoring camera data from a vision subsystem, monitoring vehicle kinematics data including: a vehicle speed, and a vehicle yaw rate, determining a lane geometry in an area of the vehicle based upon the map waypoint data and a map database, determining a vehicle position in relation to the lane geometry based upon the lane geometry, the data from the global positioning device, and the camera data, determining a road curvature at the vehicle position based upon the vehicle position, the camera data, and the vehicle kinematics data, determining the vehicle orientation and vehicle lateral offset from a center of the lane of travel based upon the road curvature, the camera data and the vehicle kinematics, and utilizing the vehicle position, the road curvature, the vehicle orientation, and the vehicle lateral offset in a control scheme of the vehicle.

Figure 20:
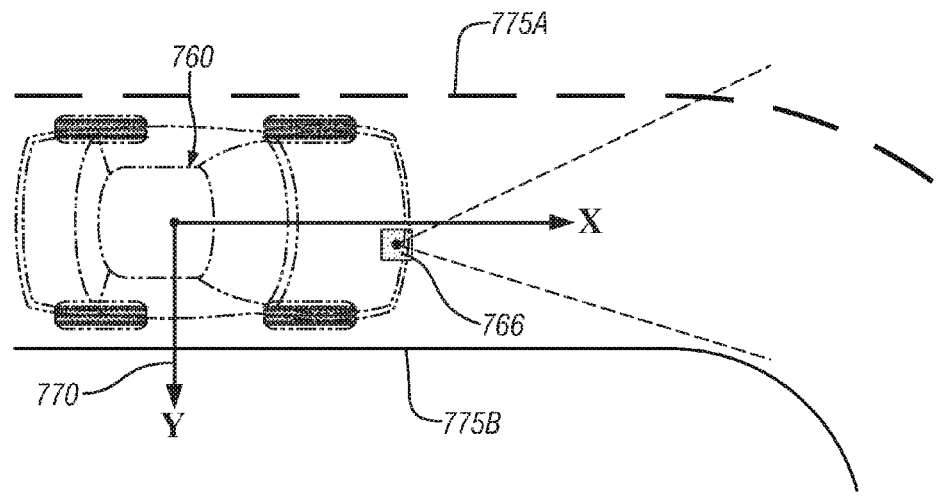
FIG. 20 depicts an exemplary vehicle utilizing a sensor to acquire road geometry data in front of a vehicle, in accordance with the present disclosure.

FIG. 20 depicts an exemplary vehicle utilizing a sensor to acquire road geometry data in front of the vehicle, in accordance with the present disclosure. The exemplary vehicle includes a passenger vehicle intended for use on highways, although it is understood that the disclosure described herein is applicable on any vehicle or other system seeking to monitor position and trajectory of remote vehicles or other objects. The vehicle includes a control system containing various algorithms and calibrations executed at various times. The control system is preferably a subset of an overall vehicle control architecture which provides coordinated vehicle system control. The control system monitors inputs from various sensors, synthesize pertinent information and inputs, and execute algorithms to control various actuators to achieve control targets, to effect for example collision avoidance and adaptive cruise control. The vehicle control architecture includes a plurality of distributed processors and devices, including a system controller providing functionality such as antilock braking, traction control, and vehicle stability.

In the exemplary embodiment of FIG. 20, vehicle 760 includes a vision subsystem 766. Vision subsystem 766 utilizes a camera or an imaging device capable of creating a digital image representation of the area in front of the vehicle. The data from vision subsystem 766 is utilized to describe conditions in front of the vehicle and is translated into an XY-coordinate system 770 in reference to the central axis of vehicle 760. An exemplary field of view for the vision subsystem is illustrated by the dotted lines. A lane of travel on the road is depicted according to lane markers 775A and 775B and describe common features that can be detected visually and utilized to describe lane geometry relative to vehicle 760. In this way, by methods known to one having ordinary skill in the art, information gained from the analysis of image or camera data can be utilized as conditions relative to the forward travel of vehicle 760.

Each processor within the system is preferably a general-purpose digital computer generally including a microprocessor or central processing unit, read only memory (ROM), random access memory (RAM), electrically programmable read only memory (EPROM), high speed clock, analog-to-digital (A/D) and digital-to-analog (D/A) circuitry, and input/output circuitry and devices (I/O) and appropriate signal conditioning and buffer circuitry. Each processor has a set of control algorithms, including resident program instructions and calibrations stored in ROM and executed to provide respective functions.

Algorithms described herein are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of a respective device, using preset calibrations. Loop cycles are typically executed at regular intervals, for example each 3, 6.25, 15, 25 and 100 milliseconds during ongoing vehicle operation. Alternatively, algorithms may be executed in response to occurrence of an event.

Sensors utilized by vehicle 760, such as a vision subsystem 766 or other radar or ranging device, are preferably positioned within the vehicle 760 in relatively unobstructed positions relative to a view in front of the vehicle. It is also appreciated that each of these sensors provides an estimate of actual details of the road or objects on the road in front of the vehicle. It will be appreciated that these estimates are not exact locations, and standards of deviation for each estimate are possible. It is further appreciated that the characteristics of these sensors are complementary, in that some are more reliable in estimating certain parameters than others. Conventional sensors have different operating ranges and angular coverages, and are capable of estimating different parameters within their operating range. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of the object. Scanning type Lidars perform efficiently and accurately with respect to estimating range, and azimuth position, but typically cannot estimate range rate, and are therefore not accurate with respect to new object acquisition/recognition. Ultrasonic sensors are capable of estimating range but are generally incapable of estimating or computing range rate and azimuth position. Sensors describing kinematics of the vehicle such as velocity and yaw rate are not exact, and in particular, may not be robust when tracking small changes in vehicle motion. Further, it is appreciated that the performance of each sensor technology is affected by differing environmental conditions. Thus, conventional sensors present parametric variances, whose operative overlap creates opportunities for sensory fusion.

A preferred control module includes a controller, wherein an algorithm and associated calibration are stored and configured to receive the estimate data from available sensors to cluster data into usable estimations of conditions in front of the vehicle, and to fuse the clustered observations to determine required lane geometry and relative vehicle position estimates. It is understood that fusing data using different sensing systems and technologies yields robust results. Again, it is appreciated that any number of sensors can be used in this technique.

One method to create and maintain estimates of road and lane geometry within a system is given wherein historical measurements are utilized to evaluate or predict subsequent track data. Exemplary systems make estimates based upon functions at time T to describe a system state at time T+1. Frequently, in order to support real-time estimation, an information array to present a Gaussian distribution is used to estimate effects of unknown error. Such systems enable collection and fusion of estimations of road conditions in front of the vehicle. However, it will be appreciated that such systems utilizing historical data and Gaussian distribution include inherent error based upon averaging and normal distribution assumptions. For example, in a lane geometry estimation operation, establishing an estimated safe lane of travel for the vehicle to traverse, a straight lane behind a vehicle has no actual lessening impact on a sharp turn in the road in front of the vehicle. Divergence of data regarding the lane in front of the vehicle is not necessarily improved by application of a random vector with Gaussian distribution to resolve the divergence. Methods utilizing historical averaging and normalized or Gaussian distributions, such as methods relying upon Kalman filters, frequently include an error factor resulting in time lag to changes or transitions in road geometry.

An alternate method is disclosed to generate estimates of lane geometry and vehicle position and orientation in relation to the lane without incurring errors based upon historical data or normalized distributions by fusing current measurements from GPS data, a vision camera subsystem, and vehicle kinematics.

General road geometry is information that has been made readily available through the use of GPS devices and 3D maps. Given an approximate location from the GPS device, localized road geometries can be rendered into a list of road shape points. Similarly, GPS coordinates including a global latitude measurement and a global longitude measurement are available through the GPS device. Vehicle kinematics including at least vehicle speed and yaw rate are available through sensors monitoring vehicle operation and/or monitoring accelerometer readings. Camera data is available for localizing the vehicle to an actual lane of travel. Lane sensing coefficients are defined through camera data (i.e., $y=a+bx+cx^2+d^3$, where x is the lane longitudinal offset, and y is the lateral offset from the lane center). Through this data, the forward lane estimation module may estimate the curvature of the lane, lateral offset from the lane center, and vehicle orientation with respect to the tangent of the lane.

Figure 21:
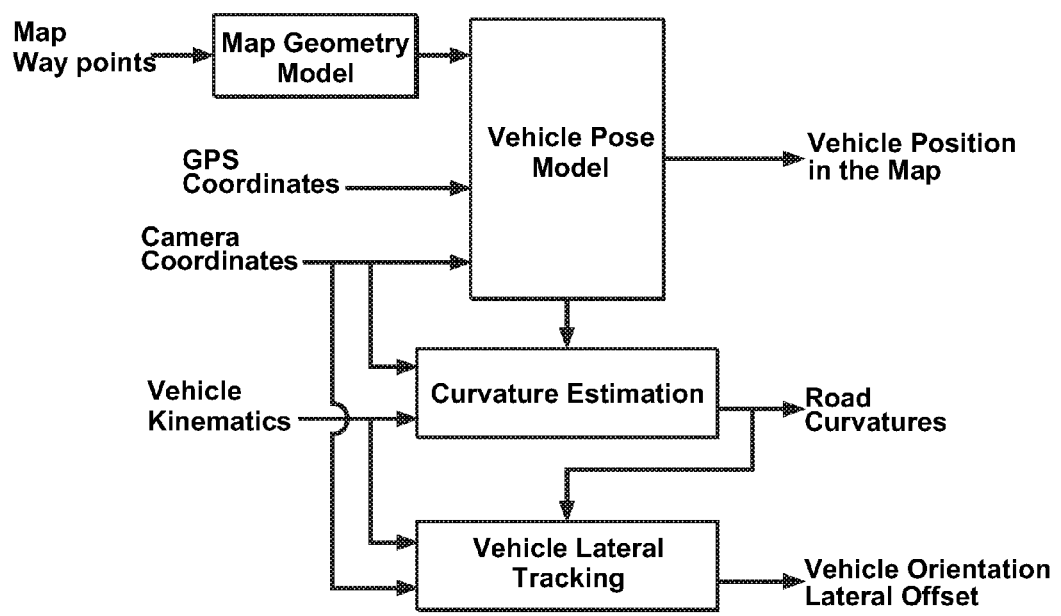
FIG. 21 illustrates an exemplary forward lane estimation process, in accordance with the present disclosure.

FIG. 21 illustrates an exemplary forward lane estimation process, in accordance with the present disclosure. The exemplary process includes a map geometry model module, a vehicle pose localization module, a curvature estimation module, and a vehicle lateral tracking module. The map geometry model module inputs map waypoints, determined by methods known in the art including determining generalized paths from a starting or present point to a destination or through point in a map database, and outputs a lane geometry in the area of the vehicle. This lane geometry can be described as an arc including a geometric representation of the roads in the area. The vehicle pose localization module inputs the lane geometry from the map geometry model module, GPS coordinates from a GPS device, and camera data from a vision subsystem and outputs an estimated vehicle position in relation to the lane geometry in the area of the vehicle. This vehicle position in relation to the lane geometry or the arc can be described as an arc length parameter ($s_m$). The curvature estimation module inputs camera data, vehicle kinematics data, such as vehicle speed and yaw rate, from vehicle sensors, and $s_m$ and outputs a curvature (K) or a measure of a curve in the road at the location of the vehicle. Finally, the vehicle lateral tracking module inputs camera data, vehicle kinematics data, and K and outputs data regarding the position of the vehicle with respect to the center of the current lane and the angular orientation of the vehicle with respect to the present forward direction of the lane. In this way, present inputs relating to the current position and travel of the vehicle can be utilized to generate data related to the lane geometry in the area of the vehicle and the position and orientation of the vehicle in relation to the lane.

Figure 22:
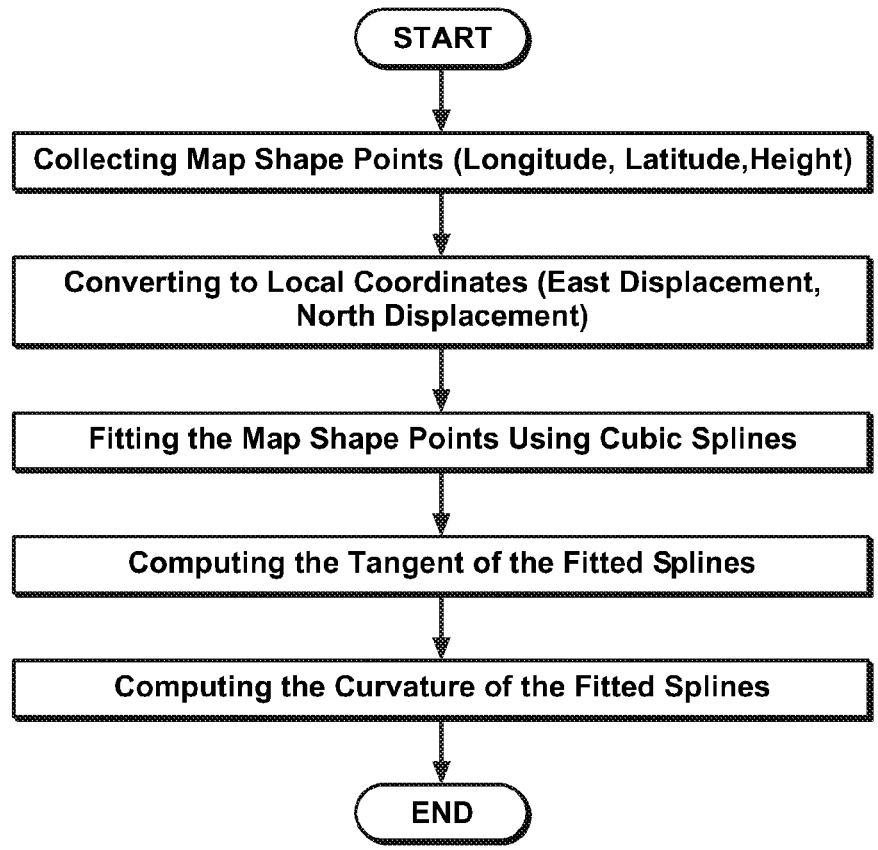
FIG. 22 depicts an exemplary process wherein information from a map database can be utilized to construct a geometric model of a road in an area of a vehicle, in accordance with the present disclosure.

As described above, the map geometry model module inputs map waypoints and outputs a lane geometry in the area of the vehicle. In particular, the map geometry model monitors the input of map shape points as described within a map database and constructs a geometric model representing the shape points. FIG. 22 depicts an exemplary process wherein information from a map database can be utilized to construct a geometric model of a road in an area of a vehicle, in accordance with the present disclosure. The exemplary process includes collecting map shape points describing road geometries from a map database. A map database supplies map shape points in global coordinates, frequently describing positions in terms of a latitudinal position, a longitudinal position, and a height or elevation. The global coordinates are then converted to a local coordinate system, usually identifying a point proximate to the vehicle location as a static reference point and describing any other locations as a north displacement from the reference point and an east displacement from the reference point. Next the map shape points are fitted with a spline in order to generate a geometric shape or arc approximating the geometry of the roads being represented. Finally, a tangent and a curvature of the fitted splines are determined at an estimated position of the vehicle.

An exemplary determination within a map geometry model is described. Let $\{(lat_i, lon_i)|i=1, \ldots, N\}$ be the shape points. Picking a point as the reference point, one can convert the shape points to local coordinates $\{(e_i, n_i)|i=1, \ldots, N\}$, representing the east and north displacements from the reference point. Defining the series $\{(s_i, e_i, n_i)|i=1, \ldots, N\}$ with $$s_1 = 0, s_i = \sum_{k=2}^{i} \sqrt{e_k^2 + n_k^2}, i \geq 2,$$

we obtain a two-dimensional cubic spline function to fit the shape points as follows:

$$\begin{bmatrix} e \\ n \end{bmatrix} = f(s) \quad [1]$$

where s is the arc length parameter, e and n are the east and north components of the displacements, respectively. Then the gradient vector at s is computed as follows.

$$\begin{bmatrix} e' \\ n' \end{bmatrix} = f'(s) \quad [2]$$

And the orientation angle is computed as follows.

$$\xi = a\tan 2(n', e') \quad [3]$$

In the end, the curvature K at s can be computed as follows:

$$\kappa = \frac{e'n'' - n'e''}{(e'^2 + n'^2)^{3/2}} \quad [4]$$

where $$\begin{bmatrix} e'' \\ n'' \end{bmatrix} = f''(s).$$

As described above, the vehicle pose localization module inputs the lane geometry from the map geometry model module, GPS coordinates from a GPS device, and camera and outputs an estimated vehicle position in relation to the lane geometry in the area of the vehicle. One having ordinary skill in the art will appreciate that a problem can be described of localization in a map to monitored GPS data. Map geometry is represented by a spline function, such as the function described in Equation 1. This spline describes discreet locations wherein a lane of a road is the to exist. A point measured by GPS data is returned in an exemplary form $$P = \begin{bmatrix} x \\ y \end{bmatrix}.$$

Inaccuracy and imprecision of some deviation is normal in GPS devices. Error is also inherent in the spline function. P is rarely precisely coincident with the map geometry spline. The spline function describes a point in the lane, for example the center of the lane, and the actual vehicle position will frequently deviate from the center of the lane by a measurable amount. An approximate location of the vehicle on a map must be determined based upon P and the estimated road geometry in the area. One exemplary solution to correct deviation between P and the geometric representation of the road is to find the closest point $[e_m, n_m]^T = f(s_m)$ such that $$s_m = \operatorname*{argmin}_{s} \lVert P - f(s) \rVert.$$

This exemplary process is useful to approximate $s_m$ and may be applied iteratively to find the vehicle location in a road curve and improve the estimated location as monitored data changes.

Figure 23:
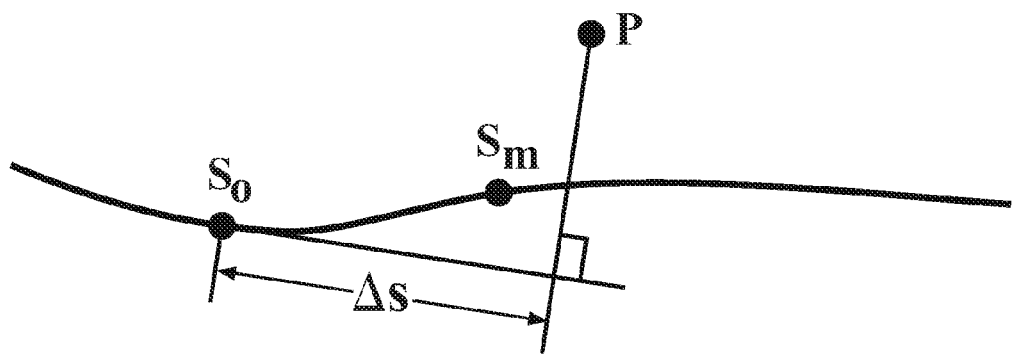
FIG. 23 graphically illustrates an exemplary iterative method to find an approximate location of a vehicle with respect to an estimated road geometry, in accordance with the present disclosure.

FIG. 23 graphically illustrates an exemplary iterative method to find an approximate location of a vehicle with respect to an estimated road geometry, in accordance with the present disclosure. Let $s_0$ be the initial guess of $s_m$. The correction of arc length parameter can be written as follows:

$$\Delta s = \frac{(P - P_m)^T P'_m}{\lVert P'_m \rVert} \quad [5]$$

where $P_m = f(s_0)$ and $P_m' = f'(s_0)$. In other words, the correction $\Delta s$ is the projection on unit vector of the gradient at the guess location $s_0$.

As will be appreciated by one having ordinary skill in the art, GPS measurements are not updated frequently as compared to typical in vehicle sensor readings. An exemplary refresh rate of 1 Hz for most on-vehicle GPS receivers is common. Additionally, updates are not always received and may be noisy in urban regions or other areas wherein view of satellite signals is obscured. Filtering techniques can be utilized to compensate for the slow rate of GPS signal updates.

An exemplary vehicle pose localization module utilizes a Kalman filter. The vehicle pose is modeled as a vector and consists of east displacement (e), north displacement (n), orientation with respect to lane ($\phi$), and the arc length (s). Due to inertia, the vehicle pose does not change abruptly. Therefore the following constant-turning model is assumed:

$$e' = e + v\cos(\phi + \xi)\Delta T + w_1$$

$$n' = n + v\sin(\phi + \xi)\Delta T + w_2$$

$$\phi' = \phi + \Omega \Delta T - \kappa \Delta T + w_3$$

$$s' = s + v\Delta T \quad [6]$$

where v is the vehicle speed; $\Omega$ is the vehicle yaw rate; $\Delta T$ is the delta time from the previous cycle; $\xi$ is the current orientation of the road (c.f., (2)); $\kappa$ is the current curvature of the road based on map curve; $w_1$, $w_2$, and $w_3$ are process noise term representing un-modeled disturbance.

Figure 24:
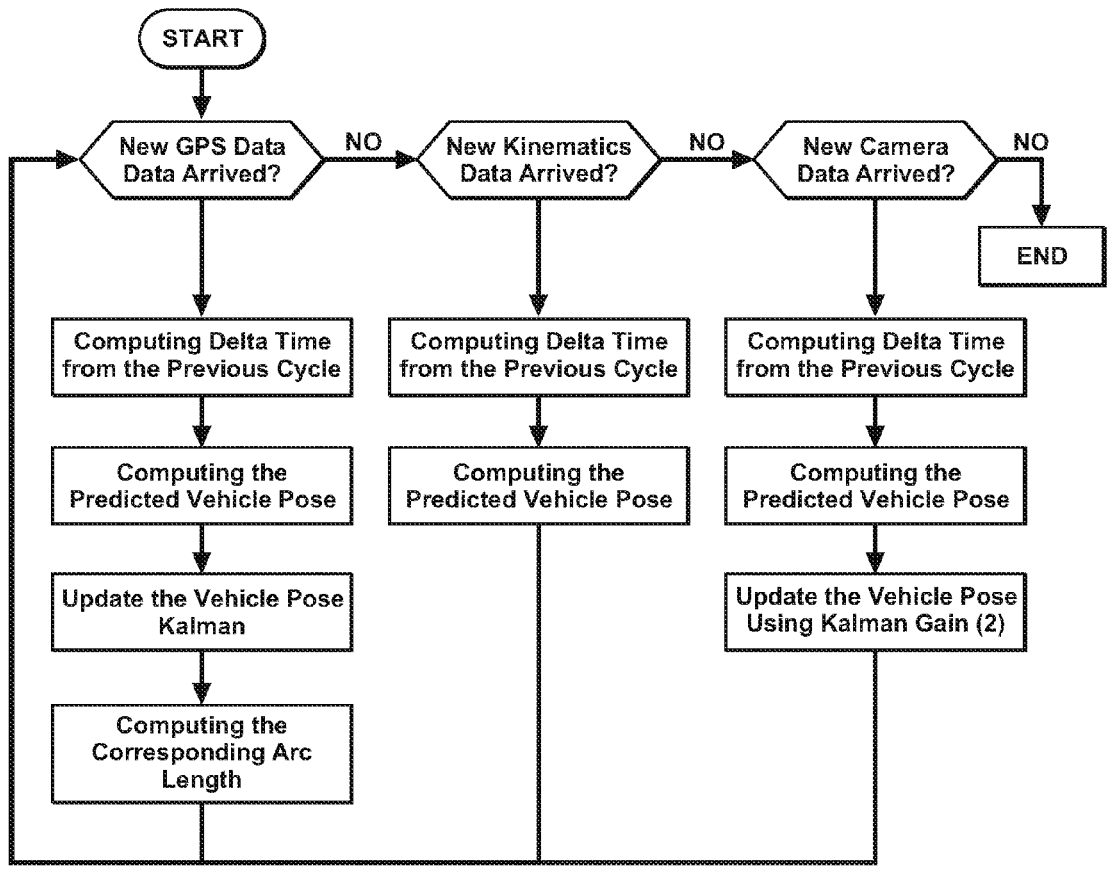
FIG. 24 depicts an exemplary vehicle pose localization process, in accordance with the present disclosure.

FIG. 24 depicts an exemplary vehicle pose localization process, in accordance with the present disclosure. The process is triggered iteratively whenever new data from GPS, vehicle kinematic sensors, or camera devices is monitored. Exemplary cycle times for the different data sources include 1 second for the GPS data, 20 ms for kinematics data, and 50 ms for camera data. The delta time $\Delta T$ is computed from the difference of timestamps between the current and previous cycles. Then the predicted vehicle pose is computed using Equation 5. When GPS data is available, the measurement updates for vehicle pose is straightforward using the following GPS measurement equations:

$$e_{gps} = e + k_1 \quad [7]$$

$$n_{gps} = n + k_2 \quad [8]$$

where $(e_{gps}, n_{gps})$ is the GPS measured location of the vehicle; $k_1$ and $k_2$ are the measurement noise. After update of vehicle pose using GPS measurement, we compute the correct arc length parameter (s) using Equation 5. This step is important to obtain correct K and values by removing the accumulated error caused by dead reckoning processing in Equation 6.

When camera data is available, the following measurement equations can be used by the Kalman filter:

$$a = e + k_3 \quad [9]$$

$$b = \phi + k_4 \quad [10]$$

where a and b are camera lane sensing parameters; d is the perpendicular distance of the current vehicle position to the center of lane represented the map curve; and $k_3$ and $k_4$ are the un-modeled measurement noise. Let $P_m$ be the point on the map curve with the closest distance to the current vehicle position expressed by P=(e, n). Let vector m denote the normal of the map curve at $P_m$. Then the perpendicular distance d can be expressed as $d = (P - P_m)^T m$, where the normal m is computed as $$m = \begin{bmatrix} 0 & -1 \\ 1 & 0 \end{bmatrix} \begin{bmatrix} e' \\ n' \end{bmatrix}.$$

As described above, the curvature estimation module inputs camera data, vehicle kinematics data, such as vehicle speed and yaw rate, from vehicle sensors, and $s_m$ and outputs a curvature (K) or a measure of a curve in the road at the location of the vehicle. Once the vehicle is localized in the map curve represented by s, one can find the corresponding map curvature $\kappa_{map}$ by Equation 4.

One notices that there are three sources of information to estimate the road curvature: map curvature ($\kappa_{map}$), camera curvature ($\kappa_{cam} = 2c$), yaw rate based curvature $$\left( \kappa_{yaw} = \frac{\omega}{v} \right).$$

The following describes an exemplary process that can be used to fuse these three curvatures together. Let $\kappa_{fus}$ denote the fused curvature with the variance $\sigma_{fus}^2$. Let $\sigma_{map}^2$, $\sigma_{yaw}^2$, and $\sigma_{cam}^2$ denote the variance of the map curvature, yaw rate base curvature, and camera curvature, respectively. We have the following update equations. When map curvature estimate is available, then $$k_{fus} = \frac{\sigma_{map}^2 \kappa_{fus} + \sigma_{fus}^2 \kappa_{map}}{\sigma_{map}^2 + \sigma_{fus}^2}, \quad [11]$$

And $$\kappa_{fus} = \frac{\sigma_{map}^2 \sigma_{fus}^2}{\sigma_{map}^2 + \sigma_{fus}^2}. \quad [12]$$

When yaw rate curvature estimate is available, then $$\kappa_{fus} = \frac{\sigma_{yaw}^2 \kappa_{fus} + \sigma_{fus}^2 \kappa_{yaw}}{\sigma_{yaw}^2 + \sigma_{fus}^2}, \quad [13]$$

and $$\kappa_{fus} = \frac{\sigma_{yaw}^2 \sigma_{fus}^2}{\sigma_{yaw}^2 + \sigma_{fus}^2}. \quad [14]$$

When map curvature estimate is available, then $$\kappa_{fus} = \frac{\sigma_{cam}^2 \kappa_{fus} + \sigma_{fus}^2 \kappa_{cam}}{\sigma_{cam}^2 + \sigma_{fus}^2}, \quad [15]$$

and $$\kappa_{fus} = \frac{\sigma_{cam}^2 \sigma_{fus}^2}{\sigma_{cam}^2 + \sigma_{fus}^2}. \quad [16]$$

In the above equations, $\rho_{map}^2$, $\sigma_{yaw}^2$, and $\sigma_{cam}^2$ represent the confidence of the curvature information from different sources: map, in-vehicle sensor, and camera, respectively. The higher the variance of a information source, the less contribution of this source to the fused curvature. Some heuristic rules are employed to choose different weights for the three sources. For example, when yaw rate is high, we will choose small $\sigma_{yaw}^2$ to derive the fused curvature.

Figure 25:
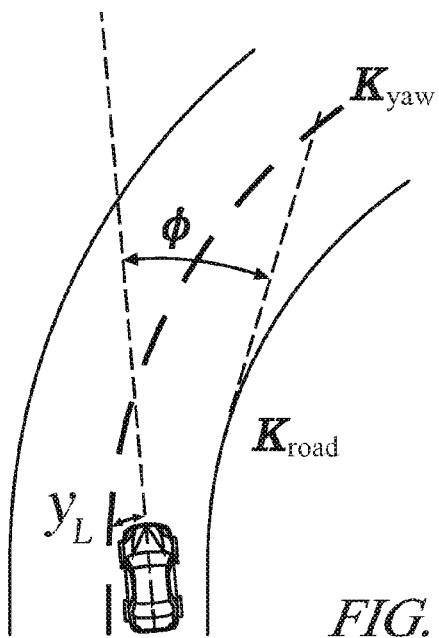
FIG. 25 illustrates an exemplary determination made within the lateral model of the vehicle, in accordance with the present disclosure.

As described above, the vehicle lateral tracking module inputs camera data, vehicle kinematics data, and K and outputs data regarding the position of the vehicle with respect to the center of the current lane and the angular orientation of the vehicle with respect to the present forward direction of the lane. FIG. 25 illustrates an exemplary determination made within the lateral model of the vehicle, in accordance with the present disclosure. The vehicle lateral tracking module monitors the inputs of vehicle kinematics (wheel speed v and yaw rate Ω) and the inputs of lane sensing parameters. A Kalman filter can be utilized to integrate the data from vehicle kinematics and the lane sensing device. As shown in FIG. 25, the lateral offset $y_L$ is the displacement from the center of the lane. $\kappa_{road}$ is the estimated curvature. $\kappa_{yaw}$ is the curvature estimated by the instantaneous vehicle path, i.e., $$\kappa_{yaw} = \frac{\omega}{v}.$$

The measurement equation of the Kalman filter is expressed as b=φ and a=$y_L$. A gating logic is implemented if the innovation error is larger than a threshold. In other words, if the difference between predicted and actual measurements is larger than a threshold, we ignore the actual measurement at the current time instant.

Figure 26:
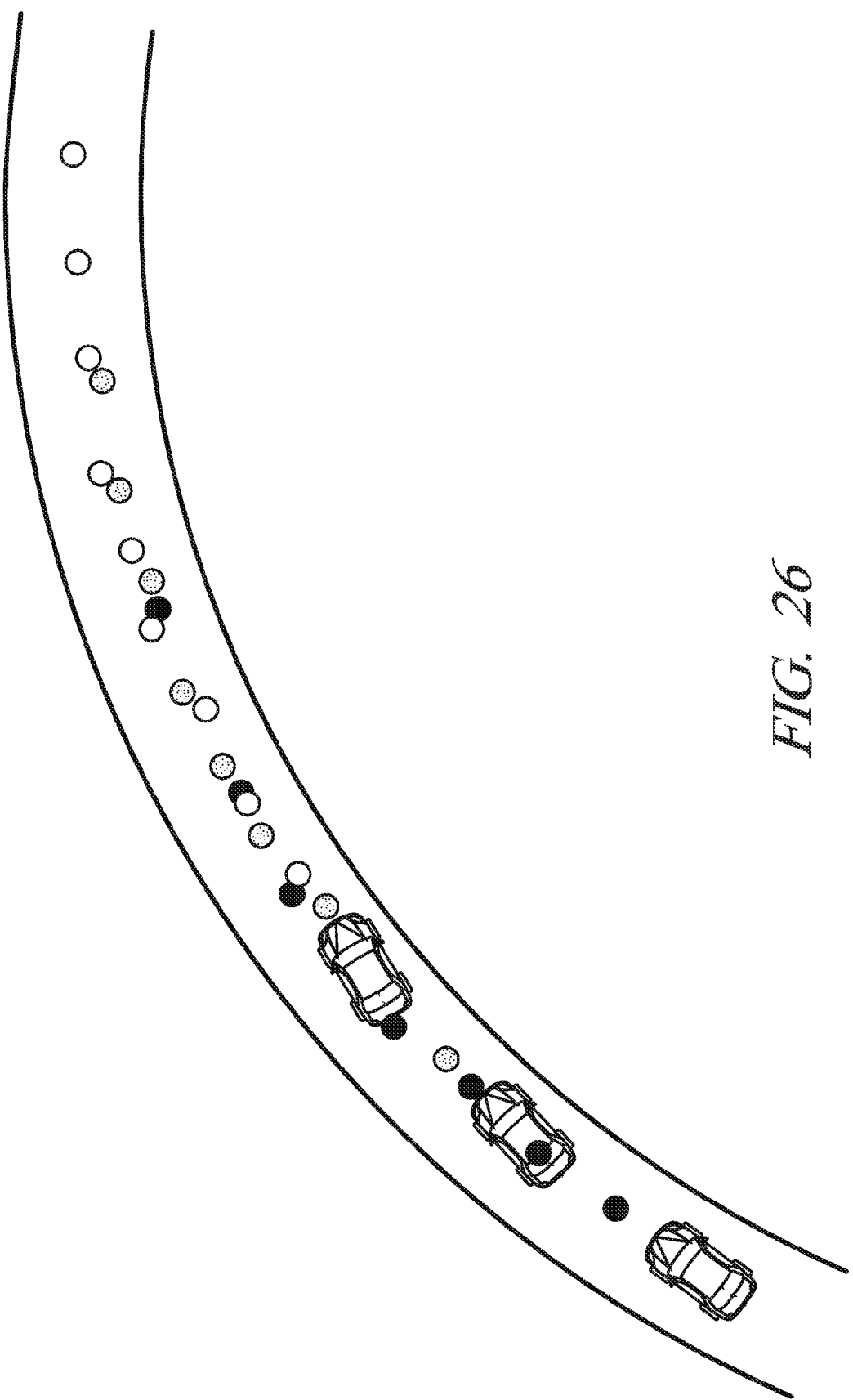
FIG. 26 illustrates an exemplary use of waypoints along a projected lane in front of the vehicle to estimate lane geometry, in accordance with the present disclosure.

FIG. 22 described a method to generate a geometric model representing the road on which the vehicle is to travel. However, it will be appreciated that other methods to achieve the same goal are possible. For example, one method disclosed includes assigning a series of waypoints in front of the vehicle forming a projected lane of travel based upon map data and information regarding the projected destination of the vehicle. FIG. 26 illustrates an exemplary use of waypoints along a projected lane in front of the vehicle to estimate lane geometry, in accordance with the present disclosure. Iterative creations of waypoints at successive time intervals, the waypoints spaced in short distance increments, can be used to reinforce the estimated lane geometry in front of the vehicle.

As the vehicle passes waypoints, the waypoints can be disregarded and only waypoints still in front of the vehicle utilized. In this way, a projection of waypoints in front of the vehicle along an estimated path can be utilized to estimate lane geometry through which the vehicle is likely to travel.

Real-time and dependable information regarding lane geometry and vehicle position and orientation in relation to the lane can be useful in a number of applications or vehicle control schemes. For example, such information can be used in applications assisting the operator in lane keeping, headlight modulation, improved navigation aids, and drowsiness alarms. However, one having ordinary skill in the art will appreciate that a great number of applications can utilize such information, and the disclosure is not intended to be limited to the particular embodiments described herein.

The aforementioned methods describe the use of vision or camera systems. Analysis of such information can be performed by methods known in the art. Image recognition frequently includes programming to look for changes in contrast or color in an image indicating vertical lines, edges, corners or other patterns indicative of an object. Additionally, numerous filtering and analysis techniques related to image recognition are known in the art and will not be described in detail herein.

An exemplary system to utilize available data, such as is made available by image recognition applied to vision images to define a clear path in front of the host vehicle for travel upon, is disclosed in co-pending U.S. patent application Ser. No. 12/108,581, entitled VEHICLE CLEAR PATH DETECTION, and is herein incorporated by reference.

As described above, an exemplary EVS system requires input sources for inputs describing an operating environment for the vehicle. As described in the exemplary methods above, a number of sensor devices are known in the art, including but not limited to radar, lidar, ultrasonic devices, and vision systems. Additionally, it will be recognized that information regarding the operating environment can be acquired from other types of devices. Infrared sensors or infrared range camera systems can be utilized to detect temperature differences. Such information can be useful to seeing objects that would normally be obscured from normal vision or camera systems or the human eye. Methods are known to render infrared camera data into the visual spectrum, such that small differences in temperature display objects in different colors to the viewer. As described above, a GPS device utilized in conjunction with a 3D map database can be utilized to not only position the vehicle with respect to a cataloged road geometry, but also to place the vehicle in the context of road details, such as road surface type and road incline or grade. Additionally, a number of sensors and monitoring methods are known to quantify operating parameters within the vehicle. Additionally, remote processing made available through a wireless network allows for coordination between the vehicle location set by GPS device and real-time details, such as construction, weather, and traffic. Additionally, non-road/non-traffic related details can be accessed similarly through the wireless network, for example, including internet-available data and infotainment services available through on-line providers. On-board systems can further be integrated with the EVS, for example, maintenance requests logged by an on-board diagnostic module, for example, monitoring accumulated age upon engine oil or monitoring tire pressures, can be utilized as inputs to the EVS. This information can be directly displayed based upon on-board processing; the information can be coordinated with on-line services, for example, diagnosing an issue with a selected service shop processor; or the information can be processed in accordance with a 3D map database, for example, identifying a need to stop at a tire shop and locating several nearby shops, including operating hours and customer reviews, based upon vehicle location. A wide variety of inputs are available for use by an EVS and the EVS system manager, and the disclosure is not intended to be limited to the exemplary inputs described herein.

All of the mentioned inputs can be utilized by an exemplary EVS system manager. Additionally, it will be appreciated that the EVS system manager has access to methods described above related to target tracking, CPS, collision avoidance, lane keeping, and clear path detection. These methods and related programming enable the EVS system manager to evaluate driving conditions, including tracks of objects around the vehicle, lane identification, and road conditions, and identify information critical to the operation of the vehicle according to a set of critical criteria.

The EVS system manager monitors inputs and determines whether discernable information related to the operating environment of the vehicle warrants displaying the information on the windscreen. A wide variety and great breadth of information can be made available to an EVS system manager. However, an operator of a vehicle has a primary duty to watch the road, and additional information is helpful insofar as the information is presented discreetly in a format that aids in focusing the driver's attention on critical information and does not distract the driver from the primary duty. An exemplary EVS system manager includes programming to monitor inputs from various sources; discern from the inputs critical information by applying critical criteria including preset thresholds, learned thresholds, and/or selectable thresholds to the inputs, wherein the thresholds are set to minimize non-critical distractions upon the operator; and requests graphics for display based upon the critical information.

Figure 27:
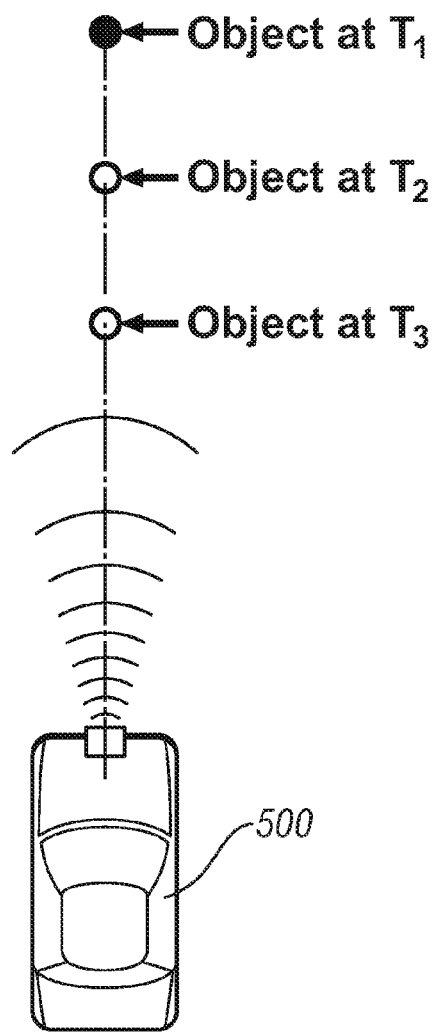
FIGS. 27-29 illustrate an exemplary application of contextual information to sensed object data in order to determine whether the sensed data is critical information, in accordance with the present disclosure.
Figure 28:
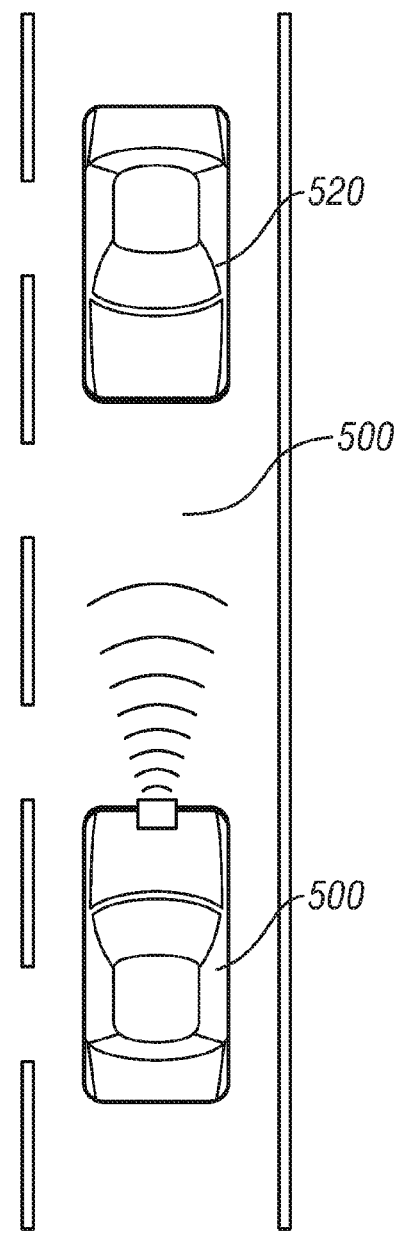
Figure 29:
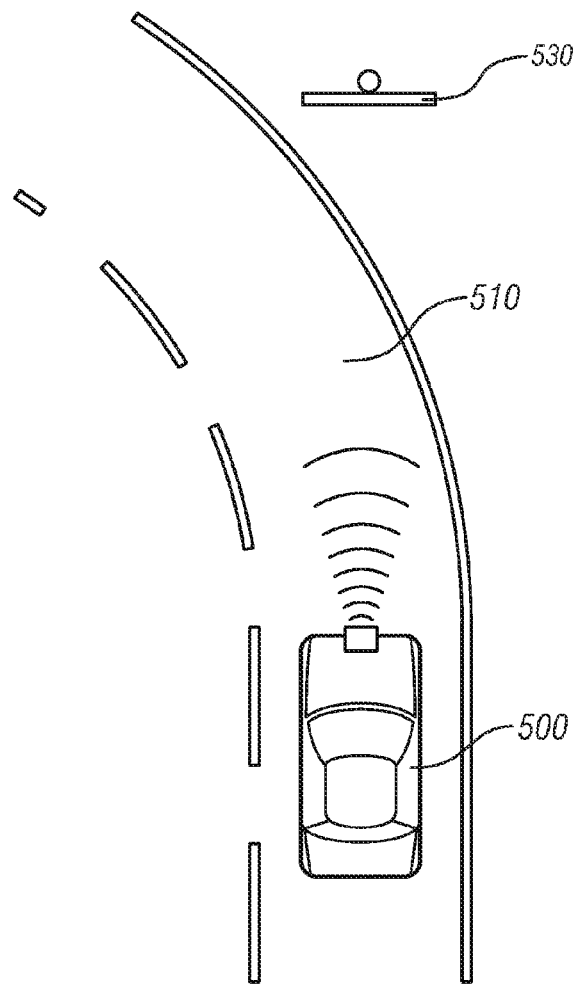

Thresholds determining critical information from the inputs can be based upon a number of bases. The HUD system manager has access to a number of input sources of information and includes various programmed applications to create a contextual operational environment model to determine whether gathered information is critical information. For instance, a collision avoidance system or collision preparation system, as described above, can be utilized to judge of a likelihood of impact based upon returns from a radar sensing system. A relative trajectory of a sensed object can be used to label the object as critical information in order to avoid collision. However, context of the input describing the sensed object can be important to defining a threshold for labeling the input as critical information. FIGS. 27-29 illustrate an exemplary application of contextual information to sensed object data in order to determine whether the sensed data is critical information, in accordance with the present disclosure. FIG. 27 depicts a vehicle including three sequential data points describing a target object in front of the vehicle, each subsequent data point being closer to the vehicle than the preceding data point. Vehicle 500 is depicted, collecting information regarding the target object as relative range from the vehicle at times $T_1$, $T_2$, and $T_3$. Without context, such data points converging upon the vehicle suggest imminent collision of the vehicle with the target object. FIG. 28 depicts an exemplary situation in which corresponding data points would correctly indicate critical information to an operator. Vehicle 500 is depicted traveling within lane 510. Vehicle 520 is also depicted, traveling in the same lane 510 but in the opposite direction of vehicle 500. In this case, the target object is on a collision path with the host vehicle, and therefore collected data points indicating the closing range to the target object would be correctly identified as critical information. Identifying the target object on the HUD, in this case, would not be an unwarranted distraction to the vehicle operator. FIG. 29 depicts an exemplary situation in which corresponding data points could incorrectly indicate critical information to an operator. Vehicle 500 is depicted traveling within lane 510. Signpost 530 is also depicted directly in front of vehicle 500. Returned object tracking data to the vehicle would indicate signpost 530 to be on a collision course with vehicle 500. However, in this case, contextual information including the speed of the signpost in relation to the speed of the vehicle, indicating a stationary signpost, and contextual information related to the curve in lane 510 can be used to disqualify object tracking data from signpost 530 as below a threshold for critical information. In the above exemplary determinations, contextual information to the target tracking data can be achieved by a number of methods, including but not limited to correlating relative motion of the target to the host vehicle's speed, GPS data including map data describing lane geometry for the vehicle's present location, lane geometry described by visual or camera data, and/or pattern recognition programming analyzing images of the tracked object sufficient to discern between an on-coming vehicle and a signpost. By creating a contextual environmental model, based upon determined spatial relationships in relation to the vehicle, for the HUD system manager to evaluate the input data points regarding a target track, a determination can be made regarding the critical nature of the information, for example, indexing a likelihood of collision. Such a model can be based upon complex programming including factors describing a large number of inputs judging, for example, likely road slip on a patch of road in front of the vehicle, road grade, a vehicle driving in opposing traffic above the speed limit, and the audio in the host vehicle being turned up to a potentially distracting volume. On the other hand, such a contextual environmental model can be as simple as a comparison of current speed of the vehicle to an identified speed limit or a comparison of a range to a target vehicle in front of the host vehicle to a threshold minimum range.

The above examples are only exemplary of a multitude of contextual determinations that a HUD system manager can make with regard to critical information. Known methods allow use of GPS data in combination with information from a 3D map database to identify a proposed route to an identified destination. Integrating such methods with use of a HUD allows projection of turn-by-turn directions upon the HUD, including an important benefit of enabling registration of the directions upon the actual road features visible through the windscreen. Use of a contextual model, placing the vehicle in a location with respect to visible features, allows directions to be customized to the operation of the vehicle and surrounding conditions. Such registration upon the visible road features enables more precise instructions for the driver as opposed to verbal and/or LCD map displays.

Known systems utilizing GPS devices can utilize an entered destination to give in-route directions to the operator. However, known GPS devices include slow sample rates and imprecise GPS measurements. As a result, GPS devices cannot provide input to the operator based upon contextual vehicle operation with regard to a planned route. The HUD system manager can project directional arrows upon the road to illustrate the planned route, but the HUD system manager can additionally construct a contextual operational environment model of the planned travel route, synthesizing available information to identify as critical information input describing deviation from the planned route. Not only can the HUD system manager utilize various sources of information to increase accuracy of information presented, for example using visual or camera information to improve accuracy of a GPS location, but the information can additionally be given contextual importance regarding the surroundings of the vehicle, for example, including object tracking information or 3D map data. In one example, if a planned route includes the vehicle exiting an expressway at an upcoming exit on the right side of the road, GPS data can be used to prompt the operator to take the exit. However, GPS data synthesized into a contextual model including visual information describing a lane of travel can be used to judge the GPS data and the corresponding planned route against a critical information threshold. For example, if visual data places the vehicle in a left hand lane of a three-lane-road and utilizing the upcoming exit will require two lane changes, the information indicating the upcoming exit can be identified as critical information warranting a graphical display or an increased urgency in a graphical display upon the HUD. In the same circumstances, upon monitoring visual information indicating the car to be in the right hand lane corresponding to the exit and vehicle information indicating that the vehicle's right turn blinker has been activated, the information indicating the upcoming exit can be determined to be non-critical information not warranting graphical display or only minimal display upon the HUD. Additionally, object tracking, weather, visibility, or other sources of information can be used to affect how and when to display navigational aids.

Additional examples of applying critical information thresholds to information are envisioned. Address information corresponding to a particular location of a vehicle upon a road can be determined by GPS data and application of a 3D map database. Visual data including image recognition programming can be used to outline a building or a range of buildings estimated to include the destination address. Historical data can be monitored, and such a destination outline can be considered critical information if the vehicle has never traveled to the destination before or if the destination is included among a particularly dense arrangement of buildings. In the alternative, a voice command from the operator can be used to define the destination outline as critical. In another alternative, operator head location and eye orientation can be monitored according to methods described below, and the destination outline can be considered critical information based upon the operator's head and eye movement indicating searching for an address.

Another example of applying a critical information threshold can include analysis of current weather conditions. Under normal driving conditions, projection of lines upon the HUD indicating lane boundaries would likely be considered unwarranted and a distraction. However, upon indication that weather conditions such as fog, snow, rain, sun glare, or other factors exist or combine to create conditions in which view of lane markers can be obstructed, lane boundaries can be determined to be critical information. Weather conditions can be discerned by a number of methods. On-line data in conjunction with GPS data can be used to estimate current weather conditions. Visual data can be analyzed to determine whether lane markers are visually discernable or whether precipitation or fog unduly hampers viewing distance sufficiently to warrant projection of lane markings. Sun rise and sun set timing and location in the sky can be determined according to a calendar and GPS location. This information regarding the position of the sun can be correlated to a directional orientation of the car to determine lane markings to be critical information based upon the car being pointed toward the sun. In the alternative, sun position can be estimated based upon visual information. In a similar example, if visual information indicates that a vehicle in opposing traffic with high beams activated is potentially causing a blinding situation, lane markers can be indicated as critical information to assist the operator of the host vehicle to stay in the current lane. In these ways, estimated operator visibility can be used to determine appropriate lane marker projection upon the HUD. In the alternative, lane markings can be determined to be critical information based upon estimated vehicle position with the lane, for example, with the lane markings becoming critical information as the lane markings are approached or crossed by the host vehicle. Position within the lane further illustrates a condition in which a degree of importance can be indicated for the critical information, with increased importance being indicated as the vehicle nears and then crosses the lane markers. Increasing intensity of the graphical images projected upon the HUD, flashing graphical images, and corresponding audio signals to the operator can be utilized based upon increasing indicated importance of the critical information. Such a position within the lane criteria could be utilized as a drowsiness indicator, for example, with a single deviation being treated as non-critical information, but with repeated deviation from the center of the lane becoming critical information or increased importance information, for example, prompting coordinated textual information or audible warnings. Under certain conditions, an overlaid thermal or infrared camera image of the road could be utilized or requested by the operator wherein visual conditions inhibit the operator from seeing the proper lane of travel, for example, caused by an inoperative headlight.

Another example of applying a critical information threshold can include analysis of pedestrian presence and pedestrian motion. For example, normal movement of a pedestrian on a sidewalk moving parallel to the direction of vehicular traffic can be determined to be non-critical information. However, movement of pedestrian traffic in another direction, for example, perpendicular to vehicular traffic, can be utilized as a threshold to identify critical information. Within this example, another example of indicating increasing importance of the critical information can be illustrated. If a pedestrian is walking perpendicularly to vehicular traffic on a designated side-walk, then a graphic indicating slight or moderate importance can be indicated. In the event that pedestrian traffic extending from the side-walk to the lane of travel or within the lane of travel is detected, a graphic indicating severe or increased importance can be indicated. In another example of identifying critical information with regard to pedestrian traffic, current traffic light patterns can be analyzed and used to identify critical information. If the host vehicle is at a stop light, pedestrian traffic corresponding to visual images indicating a "walk" light indication can be determined to be non-critical information. However, in the same circumstances, pedestrian traffic corresponding to a "do not walk" light indication can be determined to be critical information. In the alternative, visual information and range information to a target can be used to project an estimated size of the target. Such an estimated size could be used to identify, for example, all pedestrians estimated to be less than four feet tall to be critical information so as to alert the driver to children in the operating environment. In the alternative, a school zone or area with a deaf child can be identified through street sign recognition application of GPS data and a 3D map, local radio frequency transmission or tagging, etc., and all pedestrians can be labeled as critical information in such a zone. In situations wherein pedestrian traffic is detected but determined to not be visible, a graphic utilizing thermal or infrared imaging data can be selectively overlaid over the view of the pedestrian, in order to enable the vehicle operator to make a better decision regarding the situation.

Additional embodiments of critical information discernable by the EVS system manager are disclosed. In one exemplary use, recommended following distances between the host vehicle and other vehicles can be compared to measured ranges, and any range below the minimum recommended distances can be identified as critical information for display. In another example, wherein a vehicle is being utilized to train a new operator, graphics displayed to the passenger/trainer can be used to improve auditing of the new operator's actions. In another example, a vehicle operating under semi-autonomous control or ACC can display critical information communicating current ranges to other vehicles or other information describing actions by the control system to the operator such that the operator can quickly ascertain whether manual intervention by the operator is necessary. In another example, vehicle to vehicle communication can be utilized to simultaneously manage a merging maneuver between two vehicles utilizing ACC. Graphics upon the HUD can be used to communicate the intention to each of the drivers to perform a merging maneuver, in order to inform each driver of the communicated intent so as to avoid unexpected changes in vehicle motion and avoid a perception of imminent collision. In a similar application, in vehicles utilizing semi-autonomous driving, wherein automatic vehicle lateral control is utilized through a lane keeping system coupled with an automatic steering mechanism, graphics upon the HUD can be utilized to inform the operator in advance that a lane change or other action is imminent, such that the operator is not surprised by the action subsequently taken by the semi-autonomous controls.

In another embodiment, vehicle to vehicle or vehicle to remote server communication can be utilized to monitor vehicle operation and identify patterns in vehicle operation. For example, a slow-down due to an accident can be monitored through the operation of numerous vehicles, and the information can be relayed to additional vehicles approaching the area. The information can be termed critical information based upon monitoring how much of a delay the slowdown has caused in the vehicles already affected and appropriately alerting of the delay and recommending an alternate route. In another example, vehicle wheel slip can be monitored in a number of vehicles, and vehicle approaching the particular stretch of road causing the wheel slip can include a graphical patch projected upon the road surface indicating a probable slippery road condition. The information can be determined to be critical information based upon an occurrence of slip events on the particular stretch of road or can be based upon a comparison of operation of the displaying vehicle versus operation of the vehicle experiencing the slip. For example, three vehicles exceeding 50 miles per hour are determined to have slipped on this stretch of road in the last hour, but the information is determined to not be critical based upon the host vehicle traveling at 35 miles per hour. In another embodiment, wildlife can be monitored by the vision system, potentially augmented by a radar system, and indicated as critical information depending upon a projected classification of the wildlife. An identification of a horse contained in a field can be determined to be non-critical information, whereas an identification of a white-tailed deer bounding toward the road can be determined to be critical information.

Embodiments related to information regarding the surroundings of the vehicle are envisioned. For example, points of interest can be selected as critical information for display on the HUD. A family touring an unfamiliar city can receive information regarding landmarks encountered upon the route. Similarly directions to landmarks or a proposed touring route can be selected and displayed through the EVS. A sports fan can select a team or sport of interest, and upon traveling past a stadium or arena, access through wireless communication can be used to check game times, ticket cost, and current seat availability for automatic projection upon the HUD. An antique collector can request notification upon traveling within a certain distance of an antique store, an estate sale, or a flea market, and graphical directions to the location can be displayed upon request. An occupant searching for a new home can request notification and directions thereto if a new listing of a home for sale is posted meeting selected criteria in order to get the most recent listings. An automotive enthusiast can request that a vehicle brand or model identified through visual recognition be identified by a graphical image. A number of applications to identify points of interest are envisioned, and the disclosure is not intended to be limited to the particular embodiments described herein.

Embodiments are envisioned for use by emergency personnel. For example, an ambulance equipped with the disclosed EVS system can communicate with vehicles or a remote server to include pertinent information on-route to the scene of the emergency. For example, suggested routes can be updated on-route by a dispatcher, a policeman on the scene can alert the approaching ambulance of a dangerous situation, or a vehicle on-site with an identified serious injury can communicate with the ambulance in order to implement a graphic to identify the vehicle with the injury upon approach. Police vehicles can utilize graphics to communicate between police vehicles, for example, identifying a target vehicle under pursuit in one vehicle and creating a graphic in other police vehicles joining the pursuit. In another example, vehicles can utilize communications with a remote server to receive information regarding vehicles identified in association with a situation, for example, an Amber Alert. For example, license plates identified as wanted can be recognized through software known in the art combined with the vision system. This information, without the knowledge of the non-emergency vehicle and thereby without endangering the occupants of the vehicle, can be communicated to emergency personnel and forwarded to the EVS system manager of the closest police vehicle for graphical display. Police vehicles can additionally utilize thermal imaging to search a scene for hidden or incapacitated persons across a landscape. Fire vehicles can use the EVS system to enhance operation, for example, by assisting in evaluating the situation upon arrival. For example, if the dispatcher received a call from a person trapped in the third floor, northwest corner of a building, the dispatcher could enter the address and the room information, and the particular room of the building could be identified as critical information requiring a graphic image by the EVS system. In another example, thermal imaging could be switched on in a vehicle stopped at the scene of a fire to assist the fire personnel in determining the location and progression of the fire from a safe location. A number of such applications are contemplated, and the disclosure is not intended to be limited to the particular examples described herein.

A number of convenience applications are envisioned. For example, a pixelated field of view limited architecture is disclosed enabling a viewer looking at the HUD from one direction seeing one image, and another viewer looking at the HUD from another direction either not seeing the particular image or seeing a different image than the first viewer. Such a system would allow a passenger to view images unrelated to travel on the windscreen, while the vehicle operator continued to view only images related to operation of the vehicle. For example, a passenger could view infotainment type images such as internet content, video from a data storage device, or utilize an on-board camera to use the display as a vanity mirror without disturbing the view of the driver. Such content could be tied into other systems, with the passenger checking restaurant menus from the internet along the projected route of the vehicle and selecting a restaurant as an interim destination in the projected route without distracting the vehicle operator. Such a system could additionally enable an operator of a vehicle to view images appropriately registered to the windscreen without the passenger seeing the same images, unregistered and potentially annoying to the passenger.

One advantage of HUD applications is placing information in front of an operator in a single field of vision with other critical information such as a view through a windscreen. In known aerospace applications, HUD devices are utilized to allow a pilot to keep eyes upon the exterior view while being presented with critical information such as air speed and altitude. Such a presentation of information in the same field of view with visual information reduces the loss of concentration, the distraction, and the momentary disorientation associated with moving one's eyes from an external view to a panel of instrumentation. Similarly, the EVS can present display information to a vehicle operator in a single field of view with the external view visible through the windscreen. Such information can be presented full time. However, to avoid distraction, the information can be filtered according to critical information status or according to importance. For example, different information is critical or important at low speed as compared to high speed. Critical information to display upon the windshield can be modulated based upon threshold vehicle speeds. Engine speed, when within normal ranges, may not be classified as critical information or only deserve a minimal, low intensity display. However, upon engine speeds increasing to higher levels, the display can be activated or intensified to warn the operator of potential harm to the engine. Fuel level status in the vehicle fuel tanks can similarly be not displayed or minimally displayed based upon a full or nearly full tank. Various levels of increased importance can be implemented, for example, with a display doubling in size as the fuel tank empties below a quarter tank, and with a flashing indicator as some critical low fuel level is passed. Levels of critical information and levels of importance can be customized by the vehicle operator, for example, through selectable menus on a vehicle display. Additionally, displays and levels of critical and important information can be adjusted based upon operator preference through a wireless network or by direct connection of a computer, for example, through a USB connection, with the vehicle. Such customization could include an operator selecting display shapes, line weights, line colors, locations upon the windscreen, or other similar preferences. A display theme or skin can be selectably switched based upon vehicle speed or road type, for example, an operator configuring a highway theme and a side-street theme. Themes could be selected according to GPS location, with a city theme and a countryside theme. Designs for customized displays upon the windscreen could be shared upon user websites or acquired commercially from the vehicle manufacturer or other third parties. Displays can be coordinated with commercially available devices, for example, a digital music player, and integrated into a display theme, for example, with the display of the music player transmitted in a corner of the HUD. A single vehicle, equipped with known methods to determine an operator identity, could automatically load preferences for that operator. Many embodiments of displays that can be projected upon the windscreen are envisioned, and the disclosure is not intended to be limited to the particular embodiments described herein.

Other displays can be projected upon the windscreen to minimize a need for the operator to remove eyes from the windscreen. For example, adjustable cameras in the rear of the vehicle can be used to project a small image of a sleeping infant in a car seat in a rear row of the vehicle, allowing the operator to monitor the child without turning around to look. A more panoramic view could be implemented to monitor multiple children. Such a monitoring function could be in real-time or could include a playback function.

As described above, a passenger can in certain circumstances view infotainment types of information. Clearly and as sometimes required by regulation, distractions to the vehicle operator must be minimized. When a vehicle is in motion, information such as video content or e-mail communications would not be advisable to be visible to the operator. However such applications can be made available, where permitted, for example, upon vehicle information indicating that the vehicle is in a park transmission state or if the vehicle's parking brake is engaged. Other applications may be possible presenting limited information to the operator without introducing undue distraction, for example, including sports scores from the internet, news headlines from the internet, or information on music currently being played in the vehicle, for example, giving a song title and artist name as a minimal graphic upon the HUD.

Figure 30:
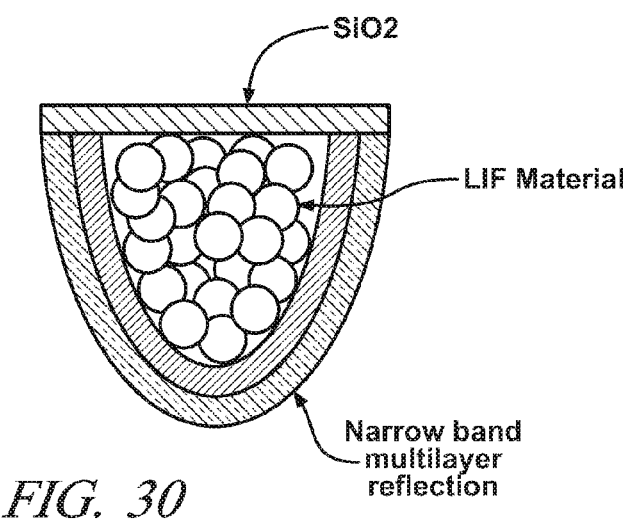
FIGS. 30 and 31 schematically depict an exemplary use of a pixelated field of view limited architecture, in accordance with the present disclosure.
Figure 31:
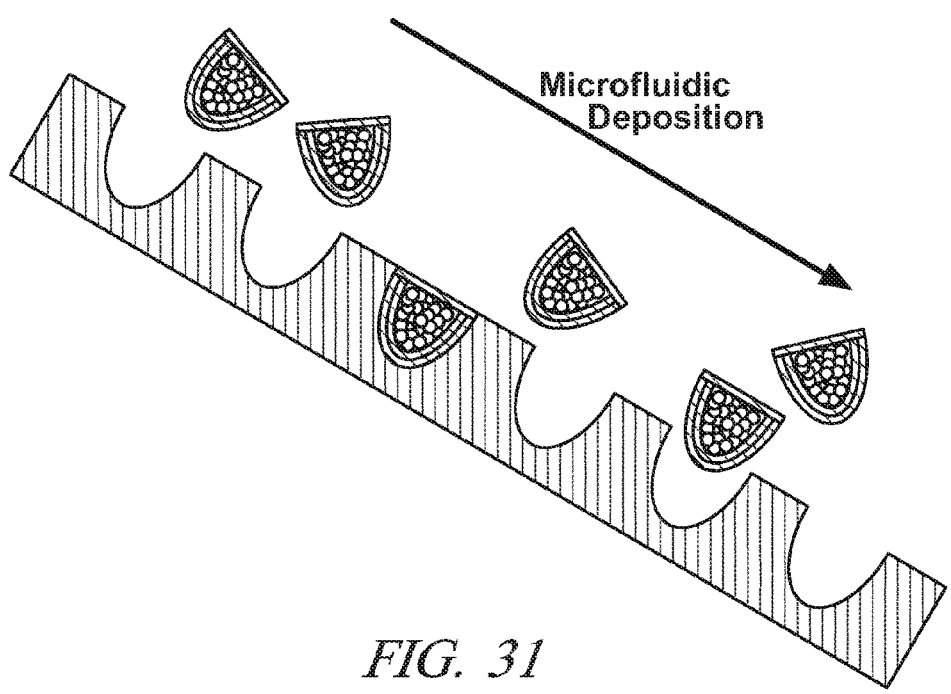

An exemplary embodiment of a pixelated field of view limited architecture enabling image view from a limited direction includes use of micro-structures or an arrangement of particles accepting an excitation light as described above and emitting light in a limited direction. FIGS. 30 and 31 schematically depict an exemplary use of a pixelated field of view limited architecture, in accordance with the present disclosure. FIG. 30 depicts an exemplary emitter, capable of emitting light to a limited field of view. The exemplary emitter includes a UV transparent encapsulant, for example, made from $SiO_2$, filled with an LIF material that fluoresces visible wavelengths when irradiated with ultraviolet radiation, with a parabola shaped narrow band multilayer reflection structure. In this exemplary embodiment, a thin film of these emitters is deposited as onto a polymer. In preparation for the film, impressions in the shape of parabolas similar to the shape formed in the emitters are embossed into the polymer material. The emitters are deposited by chemical vapor deposition onto the polymer substrate, filling the parabola impressions with emitters. FIG. 31 describes an exemplary process to create the necessary structure of emitters aligned to a polymer substrate in order to enable limited field of view viewing. By an exemplary process such as etching, free standing parabolas that are filled with emitting material are created by releasing them from the substrate. The removal from the polymer substrate can be also be accomplished by dissolving the plastic substrate with a suitable solvent. The free standing parabolas are then nested into divots that have been created in the glass substrate by photolithographic methods or embossing. The method of mating the parabola to the divot can be accomplished by a process such as fluidic self assembly, similar to that practiced by Alien Technology, wherein the parabolas are flowed over the substrate and parabola-divot mating occurs in a statistical fashion.

Head and eye sensing devices are known in the art and will not be discussed in great detail here. For the purposes of this disclosure, a camera based device is utilized in combination with image recognition software to estimate a three-dimensional head location within the vehicle, able to be coordinated with a vehicle coordinate system, and a direction of an operator's gaze based upon image recognition programming. Location of an object with relation to a vehicle coordinate system is ascertainable through sensor inputs, for example, according to the tracking methods described above. Based upon operator head location coordinated with the vehicle coordinate system and upon object tracks coordinated with the vehicle coordinate system, an estimated point of intersection between the tracked object and the operator's eyes can be determined upon the windscreen, thereby enabling registration of information to relevant features visible through the windscreen, in accordance with the disclosure. Similar methods are possible with lane marker projection and other methods described herein, allowing accurate registration of information to the HUD. Similarly, head location combined with estimation of the direction of the operator's gaze allows for projection of information according to methods intended to ensure the operator sees critical information as soon as possible. Similar methods could be implemented with the passenger in the front seat or passengers in rear seats of the vehicles, allowing registered projection for vehicle occupants upon various surfaces.

Head and eye sensing devices enable the EVS to discern a direction of the operator's gaze. This gaze location can be compared to identified critical information. A peripheral salient feature enhancement feature is disclosed, wherein display properties are modulated based upon attracting the operator's eyes to critical information when the operator's gaze is elsewhere while not overly distracting the driver when the operator's gaze is close to the displayed critical information. For example, if a vehicle is backing out of a space to the left side of the visible field of view and is determined to be on a potential collision course with the host vehicle, and the operator's gaze is determined to be toward the right side of the visible field of view, a box can be placed around the offending vehicle, and a flashing arrow can be placed at the point of the operator's gaze, prompting the operator's attention to the box.

The included EVS is enabled to project registered images across an entire windscreen, registering images to viewable objects or areas through the transparent windscreen. However, vehicle sensors can process and identify information which pertains to conditions outside of the view of the windscreen. For example, radar devices and/or camera devices viewing areas to the sides or rear of the vehicle can identify traffic light information, vehicle trajectories, presence of emergency vehicles, or other pertinent information. The EVS manager, in evaluating the environmental model generated corresponding to a piece of critical information, determines whether the critical information can be displayed upon the windscreen in a position registered to relevant features visible through the windscreen corresponding to the critical information. In the event that the evaluating determines that the relevant features, based upon occupant head and eye position, are not within the viewable area of the windscreen, a graphic can be registered to the windscreen, for example, at an edge of the windscreen closest to the source of the critical information or at some offset from the occupant's gaze indicating a need to look in the direction of the critical information. For example, if a target vehicle trajectory and speed indicates that the vehicle is likely to run a red light to the left or right of the host vehicle, the EVS can acutely prompt an emergency warning to the operator in order to avoid a broadside collision. Although an exemplary EVS with only projection upon the front windscreen cannot register a graphical representation upon a visible object not within the viewable area of the windscreen, the EVS can prompt the vehicle operator to look toward the identified critical information. In the event critical information is identified behind the vehicle, a prompt can be displayed on the windscreen pointing to or outlining the rearview mirror. In the alternative, a virtual rearview mirror can be displayed upon the windscreen, utilizing a rearward pointing camera. In the alternative, a panoramic view could be projected using multiple camera, for instance, in a broad, vertically thin patch of display along the top of the windscreen, illustrating, for example, a view around the rear 180 degrees of the vehicle, thereby eliminating traditional blindspots caused by known mirror configurations. In another example, a HUD can be utilized in a rear window of a vehicle to provide full screen parking assist by graphical images on the window. Such a rear window display can, for example, through voice recognition software, be selectably displayed in normal or reverse mode, enabling viewing directly or through the rearview mirror. In another example, based upon tracking information, a tactical or simulated overhead display could be synthesized and projected upon the windscreen. For example, in a parking situation, radar and visual information could be used to estimate a relative location of a parking spot, other vehicles, curbsides, and pedestrian traffic, and these estimated locations can be plotted on a graphic display. Similarly, such a tactical display could be generated during lane change maneuvers, for instance, becoming critical information once a blinker signal is turned on, and a display showing sensed objects around the vehicle could be displayed. Returning to a parking situation, such as a parallel parking maneuver, a set of criteria could be programmed, for example, monitoring no parking zones and requiring a range of distances from the curbside and from neighboring vehicles. Prompts or recommendations could be displayed upon the windshield based upon spatial relationships, including highlighting available parking spots along city streets near a programmed destination or recommended wheel and pedal controls to navigate into the parking spot. Exemplary conditions and graphical displays are examples of critical information that can be displayed, prompting operator attention to conditions outside of the view of the windscreen. However, these examples are intended to illustrate only a subset of the examples envisioned, and the disclosure is not intended to be limited thereto.

A number of enhancements to the EVS are envisioned, implementing features especially relevant to automotive applications of such projection techniques. One having skill in the art will appreciate that laser and projector designs utilized to project complex images frequently utilize a tiny or microelectromechanical systems (MEMS) mirror to direct the projected graphics to desired locations. Prior MEMS mirror laser projector designs have either a single stroke vector or a bitmapped architecture, limiting efficiency and amount of information presented. An alternative method is disclosed, continuing to use the stroke implementation, but including multiple MEMS mirrors (MEMS chip) to direct a series of beamlettes. This disclosed method first implements a Galilean telescope to beam expand the UV laser to a point where several of the mirrors on a X direction MEMS multimirror device are irradiated. Each of the x mirrors (or group of x mirrors) is mapped and mated to a respective y mirror (or respective group of y mirrors), thus providing a one-to-one input to output mirror operational correspondence. The y mirrors are then independently aimed at the appropriate region of the emitting material.

Automotive applications include harsh conditions including potential exposure to scratches, abrasion, and chemical contamination adverse to materials described above utilized in the HUD. Another embodiment of system enhancements includes use of a protective coating over the light emitting material on the HUD. However, and introduction of such a layer in the presence of the excitation light from the projection device and in the presence of the emitted light from the windscreen, as well as in the presence of light passing through the windscreen from outside the vehicle, creates the potential for reflection and refraction issues, creating double images or ghosting. An ultraviolet anti-reflective (AR) coating can be applied to the inner surface of the windscreen to minimize ghosting. The AR coating can be either a single layer $MgF_2$ or a multilayer coating. A hard AR overcoat is needed to protect the emissive material used in a full windscreen HUD that has organic ultraviolet-laser induced fluorescence material coating. Ghosting elimination requires a coating to couple the optical field effectively, avoiding a mismatch of the index of refraction of the material with the index of refraction of air. Various materials can be added to improve the AR coating and durability performance of the material. Multilayer coatings of a variety of materials and a variety of absolute and relative thicknesses can be used to achieve the AR function. Convenient materials that can be deposited via magnetron sputtering or other physical and chemical vapor deposition methods include $SiO_2$, $Si_3N_4$, $TiO_2$, and $SiO_xN_y$. The last material, Siliconoxynitride has the advantage of having an index of refraction that is tunable via the O/N ratio (Stoichiometry).

Projecting an image upon a curved and slanted windscreen creates a potential for irregularities in the resulting graphic images. One exemplary issue to avoid includes luminance variance, or unintended differences in graphic brightness caused by geometric differences in the excitation light interacting with various portions of the HUD. Luminance correction is a compensation technique necessary for vector projection displays. One method to achieve luminance correction includes re-parameterization of a parametric curve utilized in graphic rendering so that each segment of the path has the same effective scan length when performing sparse sampling. The efficient scan length can be evaluated from the scanning unit area time rate which is a simulation of the illustration energy on the display screen. The perspective and non-planar surface factors can be considered in the calculation of the effective length.

Luminance variance is one potential irregularity that can make projection upon a windscreen difficult. Another potential irregularity includes distortion in the graphical images created by geometric distortions due to non-flat display surfaces, perspective, and optical aberrations in large projection wide viewing angle system configurations. A two pass distortion correction scheme is disclosed to correct geometric distortion of laser vector projection displays by modeling the scan curves and projection screens with non-uniform-rational b-spline (NURB) parametric curves/patches. In the first pass, the desired NURBs in object space will be transformed to the viewing space defined by a viewpoint. The perspective is then mapped to a virtual display plane due to their affine and perspective invariants. Finally it is mapped to the non-flat display surface with parametric space mapping, if necessary. In the second pass, the path is transformed to a projection space that is defined by the position of the projector, and then the path is mapped to the projector plane. The non-linear distortions are corrected by calibration methods.

Another potential irregularity that can be created in projecting graphical images upon a windscreen includes inefficiencies created in the scan loop utilized to project the graphical images. The scan loop consists of the graphics primitive paths representing graphics primitives and the blanking paths that connect the primitive segments. Bad scan loop design will cause an inefficient display or display failure. The optimization on the paths will result in smooth and efficient scanning when mirror-based scanners are employed. Optimizing among all the scan paths will obtain an efficient and smooth vector scan during a scanning period or frame in a raster projection display. Invisible blanking paths can be optimized during insertion of the scan path list to join the scan paths like a cursive script. Optimization can be performed on the blanking paths so that all the blanking paths have the first/secondary degree of continuity with their adjacent paths. The parametric curve modeling will be employed. This method also utilizes the optimization among all scan paths to obtain an efficient and smooth vector scan during a scanning period or frame in a raster projection display. Whole loop will be re-parameterized so that the loop has the shortest scan length and largest local radius of curvature.

A display will frequently require areas of zero intensity, for example, in projected images including a dotted line. A method is disclosed to improve the image quality of vector projection engines that have light sources that are directed with micromirrors. The method is applied to laser projection devices that are directed at display screens using micromirrors (an x-scan and a y-scan mirror). The output is a light vector whose position is stroked across the display screen, and the intensity of the light can be modulated via laser current. When zero luminance is desired, a laser "off state" is desired. Unfortunately, response time to powering off and on a laser is slow relative to typical scan speeds. Known methods create faint luminance lines where zero luminance is desired. A method is disclosed to create zero luminance by utilizing an object in the path of the source light in order to controllably interrupt the excitation light projected upon the HUD. For example, objects inserted into the light path could include a knife edge, a pin hole, or a mirror. Such mechanical blanking can be accomplished on the order of the time scale of the scanning mirror so there is response time matching.

Figure 32:
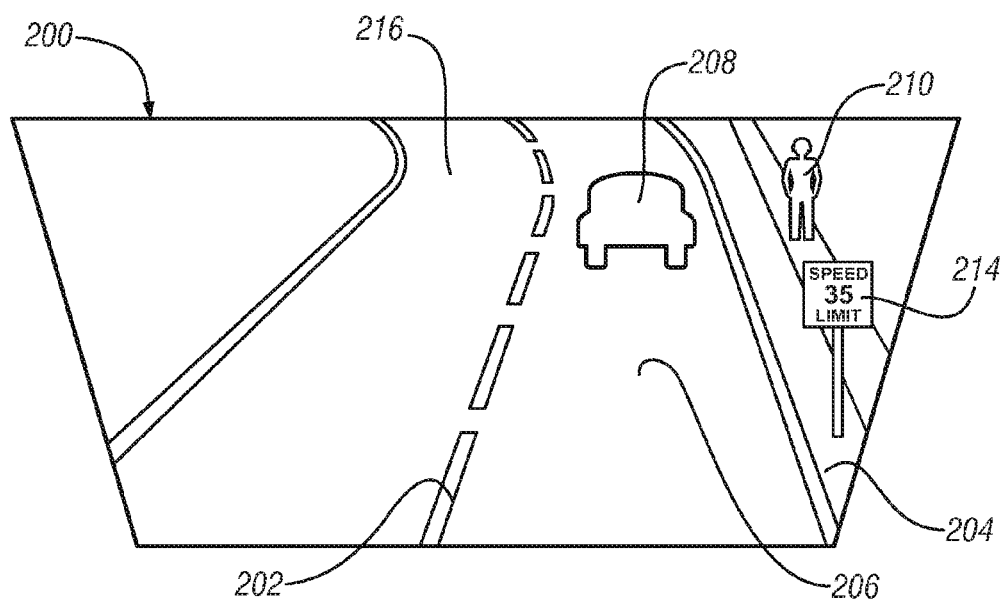
FIGS. 32-37 illustrate select exemplary displays of critical information that might be projected upon a HUD, in accordance with the present disclosure.

A number of different utilities that can be accomplished through selective projection of information upon a HUD by an EVS are disclosed above. FIGS. 32-37 illustrate select exemplary displays of critical information that might be projected upon a HUD, in accordance with the present disclosure. FIG. 32 depicts an exemplary un-enhanced external view including features desirably visibly accessible to the operator of the vehicle. View 200 includes road surface 206, including a first lane marker 202 and a second lane marker 204; a vehicle 208 also on the roadway; a pedestrian 210; a speed limit sign 214; and an upcoming curve in the road 216. All objects and features in view 200 are directly viewable, and no graphical displays through an EVS are depicted.

Figure 33:
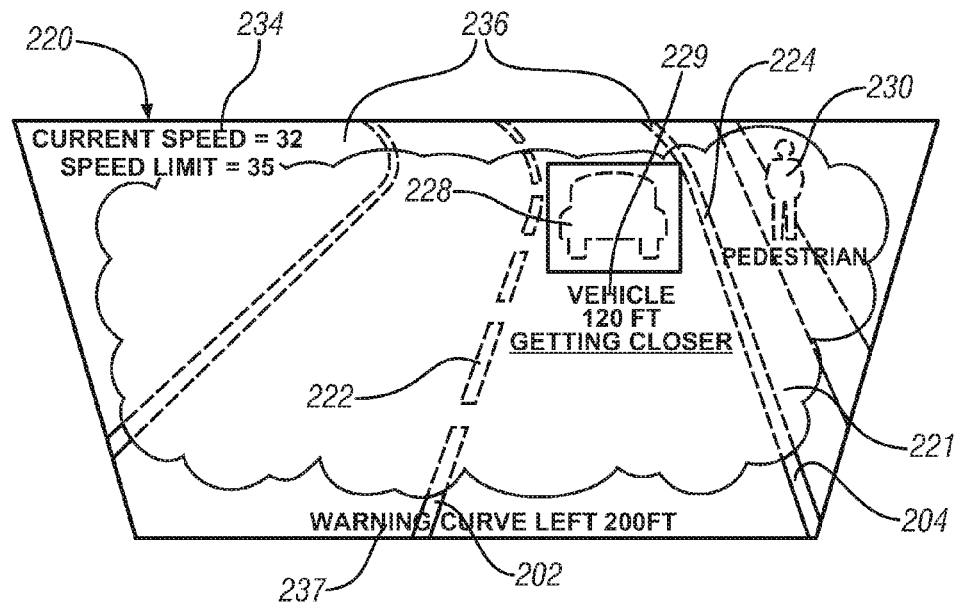

FIG. 33 depicts an exemplary view obstructed by heavy fog and exemplary enhanced vision displays that might be used to compensate for the effect of the fog. View 220 depicts the same view as depicted in FIG. 32, except that the view is obscured by fog. View 220 includes fog 221; a first lane marker 202 and second lane marker 204, both directly viewable for brief distances until obscured by fog 221; projected lane indicators 222 and 224; vehicle indicator 228; pedestrian indicator 230; vehicle speed display 234; and warning indicator 237. Projected lane indicators 222 and 224 are projections of lane indicators not visible and are aids to assist the operator in lane keeping despite the presence of fog 221. Projected lane indicators 222 and 224 include curved sections 236 indicating an upcoming curve in the road corresponding to curve 216 in FIG. 32. It will be noted that lane indicators 222 and 224 are illustrated as distinct lines. Where numerous sensors are available to refine positional data and utilize, for instance, a 3D map or radar returns from distinguishable features such as curbsides or guard rails, distinct lines may be use to convey with some certainty the position of upcoming lane geometry. However, where fewer sources of information are available, vehicle position is not precisely set, or for some other reason lane geometry is uncertain, ranges or bands of lines may be used to help guide the operator while conveying that extra care should be taken to visually determine actual road geometry. Vehicle indicator 228 illustrates to the operator a location and general behavior of vehicle 208. Additionally, textual information including factors such as range and an evaluation of relative movement can be displayed in order to assist the operator in compensating correctly for the presence of the vehicle. Pedestrian indicator 230 gives the operator notice that a pedestrian has been detected and the general position with respect to the roadway. Different graphics or text may be used to describe different behaviors or characteristics of the pedestrian, in accordance with methods described above. Sign 214, depicted in FIG. 32, is not visible in FIG. 33 due to fog 221. However, speed limits for stretches of road are knowable through other means, for example, through GPS devices in accordance with 3D maps. Vehicle speed indicator 234 provides a listing of current vehicle speed and of the speed limit for the road currently being traveled upon. As mentioned above, curve 216 is depicted in FIG. 32, and curved sections in the projected lane indicators 222 and 224 give a location for the upcoming curve. In addition, a textual display can describe the approach of the curve, including a distance to the curve as described in FIG. 33. Additionally, a recommended change in speed or some other indicator of the severity of the curve could be indicated either in text 237 or in combination with the graphics of curved sections 236.

Figure 34:
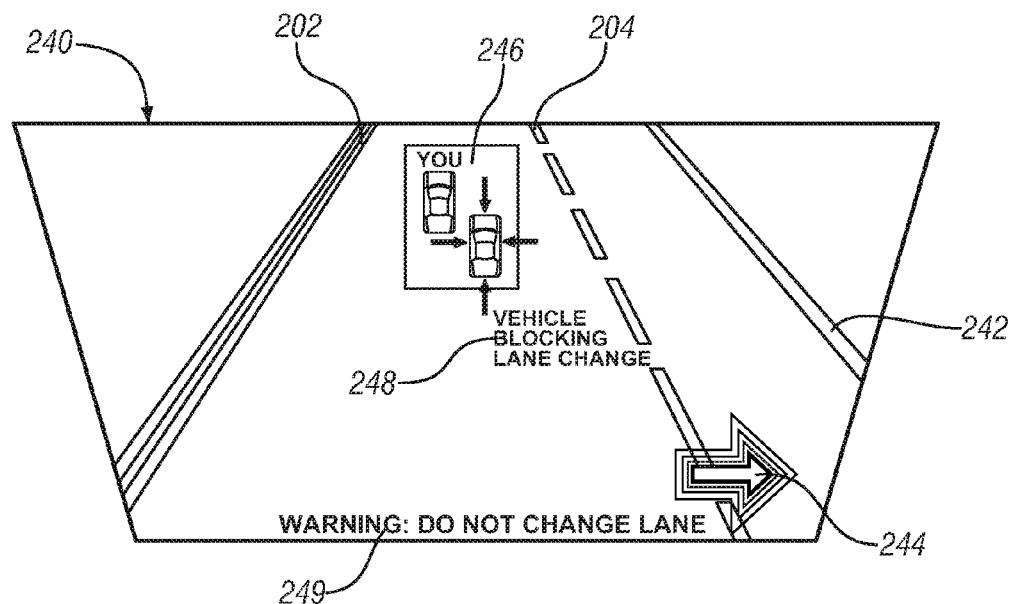

FIG. 34 depicts an exemplary display of graphics improving safety through a lane change. View 240 includes first lane marker 202 and second lane marker 204, directly viewable through the windscreen; neighboring lane marker 242, also directly viewable; turn signal indicator 244; lane change tactical display 246; and textual displays 248 and 249. Turn signal indicator 244 can include a simple arrow, a flashing arrow, a cycling graphic changing size, color, intensity, position, or other graphic depending upon the message being conveyed to the operator. For example, in a lane change wherein no threat is detected in the neighboring lane, a simple arrow may be discreetly displayed upon the HUD to convey that no threat is anticipated to forestall the maneuver. However, in the instance, as depicted in FIG. 34, where a vehicle is positioned in the neighboring lane posing a threat of collision if a lane change is executed, the graphic may be changed to indicate a message to stop the lane change, for example by flashing the indicator, changing the indicator to red, putting a cross-out/prohibited graphic over the indicator, or any other acceptable display method to indicate alarm to the viewer. Tactical display 246 is depicted illustrating a location of the vehicle and a relative track of the vehicle indicated as a threat. Lane marker projections may be indicated upon the tactical display to improve cognition of the relative positions of the vehicles. FIG. 34 indicates arrows pointing to the vehicle posing the threat in order to draw more attention from the operator to the situation. Further, text 248 attached to the tactical display and text 249 independently situated on the HUD are depicted, urging attention of the operator to the situation.

Figure 35:
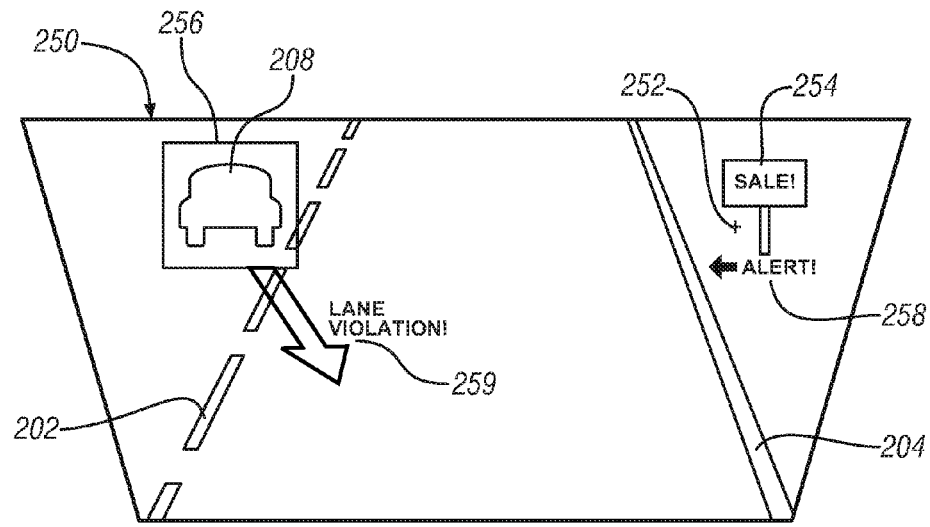

FIG. 35 depicts an exemplary situation wherein a peripheral salient feature enhancement feature is utilized in combination with an estimated operator's gaze location to alert an operator to critical information. View 250 includes first lane marker 202 and second lane marker 204, directly viewable through the windscreen; distraction sign 254 and vehicle 208, both directly viewable through the windscreen; and a number of graphics described below. An operator's gaze location 252 is depicted, describing a point where the operator's eyes are apparently focused, for example, as a result of focusing upon distraction sign 254. Location 252 is depicted for illustration of the example only and would not likely be displayed upon the HUD as a result of the distraction such a moving graphic would cause the operator. A track of vehicle 208 indicates a movement that causes vehicle 208 to be classified as a threat. For example, vehicle 208 is depicted on a trajectory to cross the lane marker 202 into the lane of the operator's vehicle. Indicating the identification of vehicle 208 as a threat, a vehicle indicator box 256 is displayed around vehicle 208 including a directional arrow indicating a relevant piece of information, such as direction of travel of the vehicle. Additionally, text 259 is displayed describing the threat condition. In order to bring the operator's attention from the area of distraction sign 254 to the critical information of vehicle 208, a textual alert and accompanying arrow are displayed proximate to the operator's gaze location. In this way, the operator's attention can be drawn to the critical information as quickly as possible.

Figure 36:
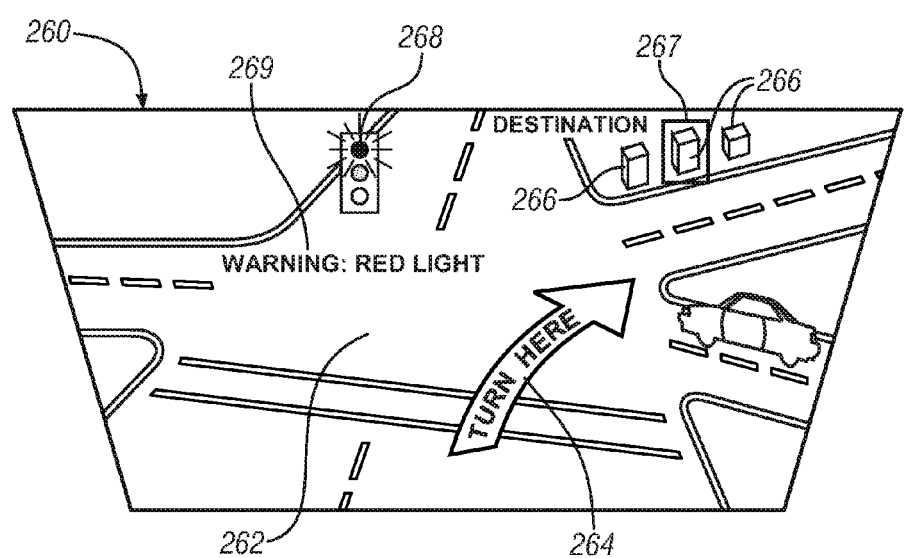

FIG. 36 depicts an exemplary view describing display of navigational directions upon a HUD. The view through the windscreen in FIG. 36 includes a complex intersection 262 with five streets commonly intersecting. View 260 includes intersection 262, directly visible through the windscreen; buildings 266, directly visible through the windscreen; traffic light 268, directly visible through the windscreen; and a number of graphics described below. Navigation arrow 264 is depicted, registered to the specific street to be turned onto in intersection 262. Additionally, navigational data including a 3D map is utilized to identify a particular building 266 as a destination, and a destination indicator 267 including a box and text are depicted. Additionally, based upon vehicle information or the complexity of the intersection being presented to the operator, an indication through warning text 269 is displayed as critical information, conveying a determination of a traffic signal ordering a stop, as a driving aid.

Figure 37:
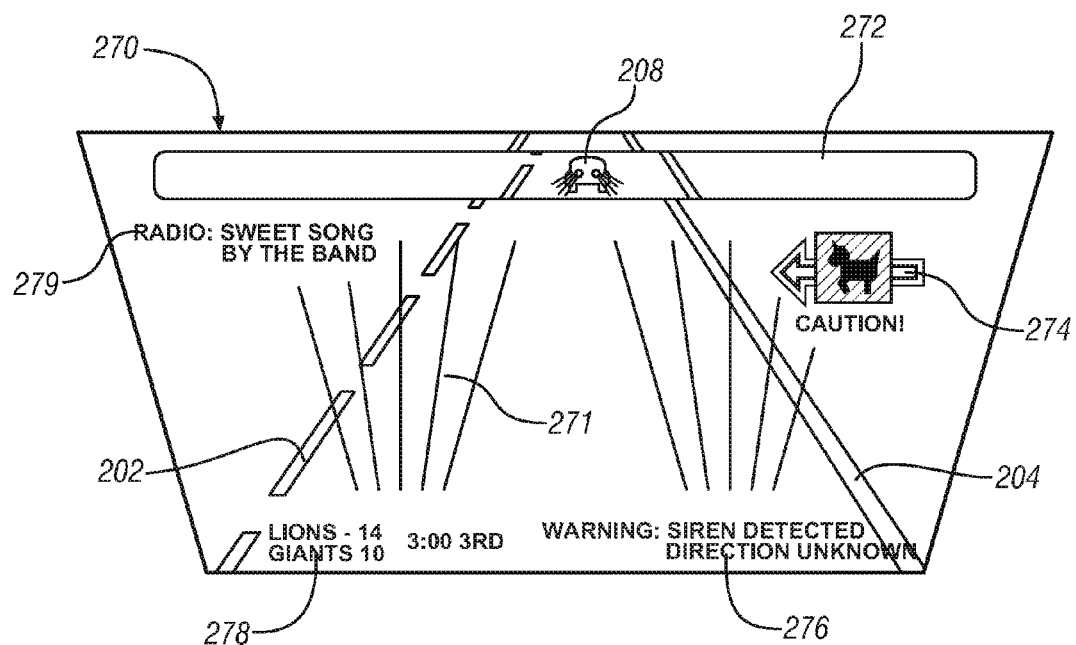

FIG. 37 depicts an additional exemplary view, describing critical information that can be displayed upon a HUD. View 270 describes a view of through a windscreen at night. View 270 includes headlight illumination 271, describing two cones of light visible through the windscreen. Additionally, a virtual rearview mirror 272 is depicted, displaying a panoramic view around the sides and rear of the vehicle, as collected through a camera or group of cameras. Exemplary view includes a vehicle 208. Represented views in the rearview mirror can be retained as simple images or can include information such as range to a target vehicle. Additionally, a wildlife indicator 274 is depicted, including an overlaid section of infrared image, depicted in FIG. 37 as a cross-hatched square, in order to assist the operator to see the wildlife outside of the headlight illumination 271. Additionally, wildlife indicator 274 includes a directional arrow and warning text describing the situation to the operator. Additionally, text warning 276 is depicted, describing detection of an audible siren, not yet correlated with visual information, indicating proximate location of an emergency vehicle. Additionally, sports score 278 is displayed textually describing information of interest to the operator in a format designed to minimize distraction to the driver. Additionally, radio information including the name of a currently played song and the group performing the song is displayed, reducing the tendency of the operator to shift gaze to instrumentation of the vehicle radio.

Embodiments are described above wherein graphics can be registered to an occupant's gaze. It will be appreciated that displaying a graphic immediately in the center of the viewer's gaze can be distracting. Instead, a graphic can be registered initially to some offset from the location of the viewer's gaze and fixed in that location. In this way, the viewer then has the graphic located conveniently close to the current location of the viewer's gaze, but then can adjust to look directly at the graphic as the viewer's priorities allow. The location of the graphic can additionally take into account locations of tracked relevant features. For example, a graphic can be located so as to avoid a distracting conflict with a stop light, a pedestrian, or other important features visible through the windscreen.

Figure 38:
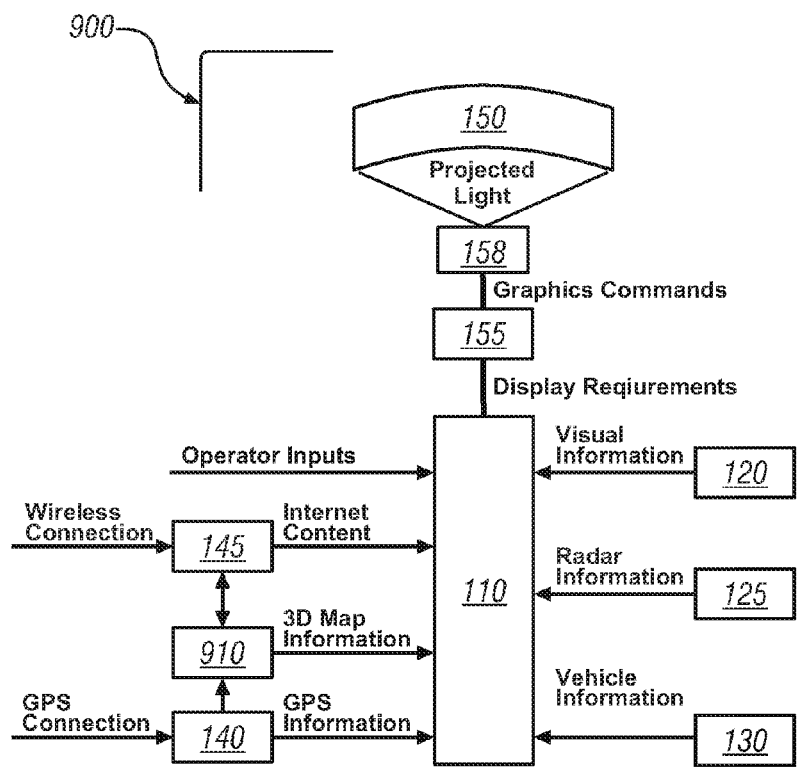
FIG. 38 schematically depicts an exemplary information flow accomplishing methods described above, in accordance with the present disclosure.

Information flows and processes to control the methods described above can take many embodiments. FIG. 38 schematically depicts an exemplary information flow accomplishing methods described above, in accordance with the present disclosure. Process 900 includes an EVS system manager 110 monitoring information from various sources and generating display requirements, EVS graphics system 155 monitoring display requirements from the EVS system manager 110 and generating graphics commands, and a graphics projection system 158 projecting light upon a head-up display 150. A number of exemplary sources of information are described, including operator inputs, visual information through camera system 120, radar information from radar system 125, vehicle information from exemplary vehicle speed sensor 130, GPS information from GPS device 140, 3D map information from 3D map database 910, and internet content from wireless communication system 145. It will be appreciated that these sources of information can take many forms as described throughout this disclosure, and the disclosure is not intended to be limited to the particular embodiments described herein. An occupant eye location sensing system such as is described in FIG. 1 can be utilized; however, in this particular embodiment, other sources of information such as operator inputs are utilized to estimate the location of the operator's head and eyes for the purposes of image registration. It will be appreciated that GPS information, 3D map information, and internet content can be interdependent information. Correlation between these sources of information can occur within EVS system manager 100, or, as depicted in FIG. 38, the devices providing the information to the EVS system manager 110 can include programming to coordinate information before or simultaneous to providing information to the system manager. Through this exemplary process, information can be monitored and utilized to project images upon a HUD.

The above embodiments describe image projection upon a windscreen of a vehicle. However, the methods described herein can be applied to any appropriate surface within the vehicle. For example, a projection system could be used solely upon the rear window of the vehicle. In another example, a projection system could be used upon the side windows of the vehicle in any row, for example, in the second row of the vehicle. Such a system, in cooperation with selectable or addable programming, could be used to entertain children on a trip, playing games such as prompting children to find various landmarks or letters upon objects outside of the vehicle. Information for the passengers could be displayed upon such surfaces, for example, time to destination, a digital map describing progress of a trip, entertainment images, or internet content. Vehicles employing alternative windscreen configurations, for example, a circular, semicircular, dome shaped, or otherwise encapsulating canopy design could similarly utilize the windscreen as a surface upon which graphical images can be displayed.

Information projected upon the HUD is described above to include the full windscreen. However, the methods described herein need not be applied to an entire windscreen. For example, in order to avoid making the operator look too far away from the straight ahead position, images could be limited to some conical area in the operator's view. In the alternative, images could be limited from being projected in front of a passenger so as to avoid annoying the passenger. In the alternative, a zone in the center of the operator's view could be made free of images, thereby ensuring that no images distract the attention of the operator from the most critical view of the path of the vehicle. In the alternative, a zone around the perimeter of the windscreen could be utilized to project images, retaining the entire middle of the screen for exclusive view of the operator. In instances described above wherein the entire view of the operator is not utilized, images can still be registered to the windscreen, for example, with horizontal and vertical tick marks around the display free area indexing the location of the object or condition being pointed to. Display configurations can be selectable by the operator or occupants or may be configured to display different schemes depending upon a number of criteria, for example, time of day, number of occupants in the vehicle, location, or level of importance of the information, according to methods described herein above. Regions to include or exclude projection of display within the vehicle can take a number of different embodiments, and the disclosure is not intended to limited to the particular embodiments described herein.

As described above, substantially transparent head-up displays can be illuminated with excitation light (e.g. ultraviolet light or infrared light) from light sources (e.g. a projector or laser, depicted by device 20 shown in FIG. 2), where a substrate upon the HUD may receive and absorb the excitation light by light emitting material on the substrate. As mentioned above, requiring absorption of multiple photons can make infrared light a less desirable option than ultraviolet light as an excitation light. Furthermore, multiple projectors can be utilized to use separate excitation light wavelength ranges, each projector indicative of a desired color; or a projector or laser may use an excitation light wavelength range that excites all of the different types of light emitting particles and selectively illuminates different layers of light emitting materials that are substantially transparent to light, except light with specific wavelength ranges which are absorbed and are different for each of the different layers of light emitting materials. Additionally, when utilizing different layers of light emitting materials, the layers can have different thicknesses, so that the responsiveness to excitation light of a particular type of material can be controlled.

Figure 39:
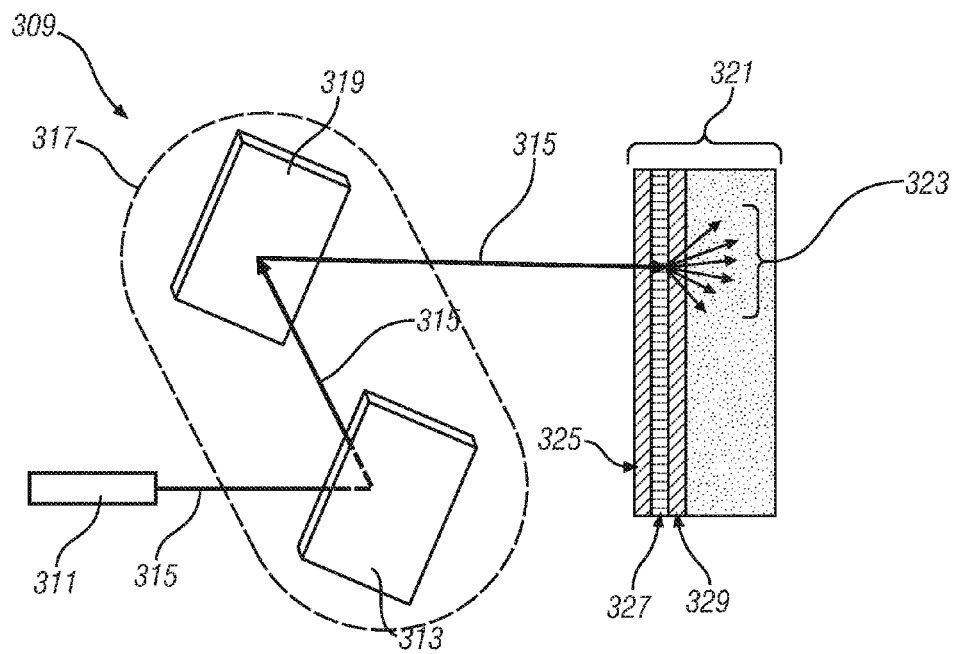
FIG. 39 schematically depicts a known mirror device.

Known apparatuses exist for projecting graphical images upon the substantially transparent windscreen HUD utilizing stroke implementation. Stroke implementation can use a microelectromechanical system (MEMS) mirror device that directs projector laser beams onto a surface including a substrate having light emitting material to absorb the excitation of light from said laser beams and emit visible light. Referring to FIG. 39, a known stroke implementation apparatus 309 is illustrated utilizing a known MEMS mirror device 317. Excitation light in the form of a laser beam 315 is projected from a projector 311 to the known MEMS mirror device 317. The known MEMS mirror device 317 includes an input mirror, referred to herein as x-mirror 313, and an output mirror, referred to herein as y-mirror 319. The laser beam 315 is directed towards the x-mirror 313, thereby irradiating said x-mirror and scanning said laser beam in the x-direction. Subsequently, the laser beam 315 is deflected toward the y-mirror 319, thereby irradiating said y-mirror and scanning said laser beam in the y-direction. The y-mirror 319 is positioned to deflect said laser beam 315 upon a desired area upon substrate surface 321. By modulating x-mirror 313 and y-mirror 319, projection of the laser beam 315 can be controlled within a projection area. The substrate surface 321 includes light emitting materials 325, 327 and 329 layered and configured to absorb and emit visible light 323. A person having ordinary skill in the art understands that the known MEMS mirror device 317 is only capable of directing the single laser beam 315 that is a single stroke vector, and thus, efficiency and the amount of information to be presented upon the surface 321 is limited.

Figure 40:
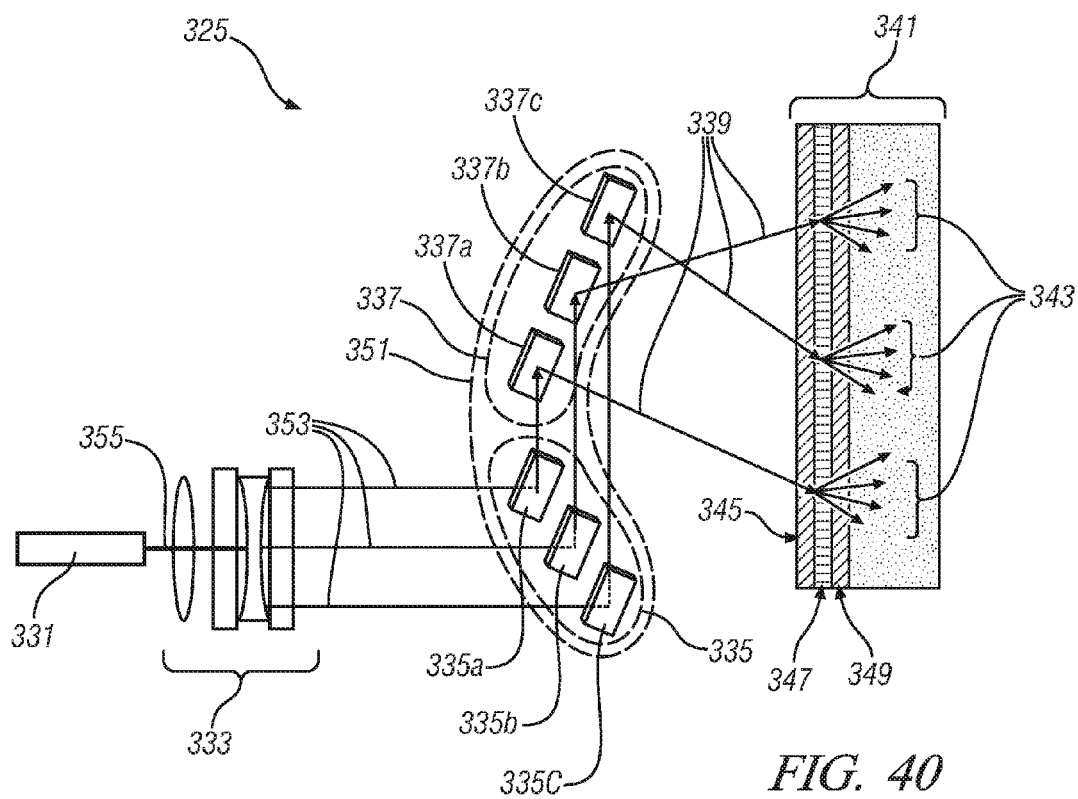
FIG. 40 schematically depicts an exemplary microelectromechanical system multi-mirror device, in accordance with the present disclosure.

In an exemplary embodiment of the preferred disclosure, a stroke implementation apparatus 325 is illustrated in FIG. 40. The apparatus includes a projector 331, a Galilean telescope 333, a MEMS multi-mirror device 351 and a substrate surface 341. It is appreciated that the substrate surface 341 can be the substantially transparent HUD. The projector 331 can include any excitation light source capable of projecting excitation light in the form of a laser beam. For example, excitation light can include ultraviolet or infrared excitation light. The disclosure herein will refer to the excitation light as an ultraviolet (UV) laser beam, however, the disclosure is not limited to UV laser beams. The telescope 333 is utilized to receive a UV laser beam 355 projected by the projector 331 and generate an expanded laser beam 353 to be input to the MEMS multi-mirror device 351.

The MEMS multi-mirror device 351 includes a plurality of input mirrors 335 and a plurality of output mirrors 337. For simplicity, the plurality of input mirrors 335 will be referred to hereinafter as 'a plurality of x-direction mirrors'. Likewise, the plurality of output mirrors 337 will be referred to hereinafter as 'a plurality of y-direction mirrors'. Although three x-direction mirrors 335a-c and three y-direction mirrors 337a-c are illustrated, the MEMS multi-mirror device 351 of the stroke implementation apparatus 325 is not limited to any plurality of mirrors. It should be appreciated that the mirrors are divided into a first axis and a second axis that can include x- and y-coordinates, respectively. However, the stroke implementation apparatus 325 is not limited to Euclidean or Cartesian spatial coordinates, and can alternately include projector coordinates of a different orientation. The x-direction mirrors 335 are input mirrors configured to receive the expanded laser beam 353 from the telescope 333 wherein the plurality of x-direction mirrors 335 are irradiated by said expanded laser beam 353 and configured to scan a plurality of laser beamlettes 339 across the substrate surface 341 in a first direction corresponding to the first axis. For simplicity, and by known terms in the art, the first direction corresponding to the first axis will be expressed as the x-direction hereinafter. Hence, each x-direction mirror 335a, 335b and 335c within the plurality of x-direction mirrors 335 can be irradiated and configured to scan a laser beam across the substrate surface 341 in the x-direction, wherein each scanned laser beam forms the plurality of laser beamlettes 339.

The plurality of y-direction mirrors 337 are output mirrors configured to receive the plurality of laser beamlettes 339 directed by the plurality of x-direction mirrors 335. Specifically, the plurality of y-direction mirrors 337 are mapped and mated with the plurality of x-direction mirrors 335. Depending upon configuration requirements for graphical images to be displayed upon the substantially transparent windscreen HUD, each of said y-direction mirrors 337a-c can be mapped and mated with one of each of said individual x-direction mirrors 335a-c—or groups of the y-direction mirrors 337 can be mapped and mated with respective groups of x-direction mirrors 335. In a non-limiting example, x-direction mirror 335a is mated with y-direction mirror 337a; x-direction mirror 335b is mated with y-direction mirror 337b and x-direction mirror 335c is mated with y-direction mirror 337c.

In the exemplary embodiment wherein each of the y-direction mirrors 337a-c are mapped and mated respectively with one of each of the x-direction mirrors 335a-c, each of said y-direction mirrors 337a-c is irradiated by one of said laser beamlettes 339 directed by one of said respectively mated x-direction mirrors 337a-c. Each of said irradiated y-direction mirrors 337a-c scans one of said laser beamlettes 339 across the substrate surface 341 in a second direction corresponding to the second axis. For simplicity, and by known terms in the art, the second direction corresponding to the second axis will hereinafter be expressed as the y-direction. Each of said y-direction mirrors 337a-c can be independently aimed to direct one of each of said laser beamlettes 339 to a desired region on said substrate surface 341. As will be discussed in greater detail, each of said laser beamlettes 339 can be absorbed by light emitting materials on said substrate surface 341, wherein visible light 343 can be emitted upon the substrate surface 341.

In the exemplary embodiment wherein groups of the y-direction mirrors 337 are mapped and mated respectively with groups of the x-direction mirrors 335, each group of said y-direction mirrors 337 is irradiated by one group of said laser beamlettes 339 directed by one of each group of said respectively mated x-direction mirrors 337. Each group of said irradiated y-direction mirrors 337 scans one group of said laser beamlettes 339 across the substrate surface 341 in the y-direction. Each group of said y-direction mirrors 337 can be independently aimed to direct one of each group of said laser beamlettes 339 to a desired region on said substrate surface 341. As will be discussed in greater detail, each group of said laser beamlettes 339 can be absorbed by light emitting materials on said substrate surface 341, wherein visible light 343 can be emitted upon the substrate surface 341. Utilizing x- and y-direction mirrors 335,337, respectively, to scan and direct groups of laser beamlettes 339 can be advantageous where it is desired to increase illumination intensity and/or contrast of visible light 343 emitted on the substrate surface 341.

A person having ordinary skill in the art appreciates that the exemplary stroke implementation apparatus 325 utilizing the multi-mirror MEMS device 351 is capable of implementing a plurality of laser beamlettes 339 from a single projected laser beam 335, vastly improves the efficiency and the amount of information to be presented upon the substrate surface 341. However, it will additionally be appreciated that a plurality of beamlettes derived from a single beam will have a proportional fraction of the intensity of the single beam. Graphic selection and selection of the projector 331 can be adjusted accordingly to compensate for the reduced intensity of each of the beamlettes 339. Further, it will be appreciated that simultaneously controlling two groups of mirrors, for example, two groups of three mirrors as depicted in FIG. 40, requires a significant increase in computational and control capacity as compared to controlling two mirrors, as depicted in FIG. 39.

In an exemplary embodiment of the present disclosure, the substrate surface 341 includes a plurality of light emitting materials 345, 347 and 349 layered so that each layer is substantially transparent to light, except light with specific wavelength ranges which are absorbed and are different for each of the different light emitting materials 345, 347 and 349. However, the disclosure is not limited to any number of light emitting material layers upon said substrate surface 341, so that the number of light emitting material layers will depend upon the configuration requirements for graphical images to be displayed upon the substantially transparent windscreen HUD. Additionally, the layers may be coated on the substrate surface 341 with different thicknesses. For example, it may be desirable to balance the emission of different primary colors, since different light emitting materials may illuminate the different colors at different intensities from the same amount of absorbed light. Alternatively, the substrate surface 341 can be spatially modulated or wavelength modulated as discussed above in FIG. 5. It should be appreciated that the substrate surface 341 may be part of a vehicle windshield, a building window, a glass substrate, a plastic substrate, a polymer substrate, or other transparent (or substantially transparent) medium that would be appreciated by one of ordinary skill in the art. Other substrates may complement the substrate surface 341 to provide for tinting, substrate protection, light filtering (e.g. filtering external ultraviolet light), and other functions.

The Galilean telescope 333 expands the excitation light such that the various x-direction mirrors 335 and y-direction mirrors 337 are irradiated. It will be appreciated that the various mirrors can be utilized in unison to create a single stroke vector graphic, for example, with each of the pairs of x-direction and y-direction mirrors creating a portion of the total strokes required to make the entire graphic. It will be further appreciated that each pair of mirrors can create vector stroke graphics independently, with each pair of mirrors being responsible for a separate graphic upon the windscreen. Further, it will be appreciated that a pair of mirrors can be similarly be utilized to create a matrix-addressed display. Pairs of mirrors can serve different functions at the same time, for example, with a portion of the pairs of mirrors creating vector stroke graphics and a portion of the pairs of mirrors creating matrix-addressed graphics. A number of methods to utilize a plurality of beamlettes are envisioned, and the disclosure is not intended to be limited to the particular examples described herein.

The above disclosure describes a substantially transparent head-up display capable of full-screen display. It will be appreciated that similar methods can be employed upon windscreens utilizing a substantially full-windscreen display, a partial windscreen display, for example limited to the driver's half of the windscreen, or a display focused or limited to the straight-forward typical center of view of the operator. Many embodiments of displays are envisioned, and the disclosure is not intended to be limited to the particular exemplary embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Apparatus to project graphical images upon a substantially transparent windscreen head-up display of a vehicle, the apparatus comprising:
   an excitation light source projecting a laser beam based upon a graphical image command;
   a telescope for expanding the laser beam;
   a multi-mirror device including a plurality of input mirrors irradiated by the expanded laser beam to simultaneously scan a plurality of laser beamlettes in a first direction corresponding to a first axis and a plurality of output mirrors irradiated by the plurality of scanned laser beamlettes and directing the scanned laser beamlettes in a second direction corresponding to a second axis to desired regions of the windscreen; and the windscreen comprising a surface receiving the plurality of scanned laser beamlettes from the output mirrors, each of the received plurality of scanned laser beamlettes emitting visible light upon the surface.

2. Apparatus to project graphical images upon a substantially transparent windscreen head-up display of a vehicle, the apparatus comprising:
- an excitation light source projecting a laser beam based upon a graphical image command;
- a telescope for expanding the laser beam;
- a multi-mirror device including a plurality of mirrors sequentially irradiated by the expanded laser beam to simultaneously scan a plurality of laser beamlettes; and
- the windscreen comprising a surface receiving the plurality of laser beamlettes, each of the received plurality of laser beamlettes emitting visible light upon the surface;
- wherein the multi-mirror device including the plurality of mirrors comprises:
  - a first group of at least two respective input mirrors, each of the respective input mirrors irradiated by the expanded laser beam and configured to direct a respective one of the plurality of laser beamlettes; and
  - a first group of at least two respective output mirrors, each of the respective output mirrors operatively corresponding to a respective one of the respective input mirrors and receiving the respective one of the plurality of laser beamlettes, wherein each of the respective output mirrors is irradiated and configured to independently direct the respective one of the plurality of laser beamlettes to a respective desired region on the surface.

3. The apparatus of claim 2, wherein the multi-mirror device including the plurality of mirrors further comprises:
- a second group of at least two respective input mirrors, each of the respective input mirrors irradiated by the expanded laser beam and configured to direct a respective one of the plurality of laser beamlettes; and
- a second group of at least two respective output mirrors, each of the respective output mirrors operatively corresponding to a respective one of the respective input mirrors and receiving the respective one of the plurality of laser beamlettes, wherein each of the respective output mirrors is irradiated and configured to independently direct the respective one of the plurality of laser beamlettes to a respective desired region on the surface.

4. The apparatus of claim 1, wherein the excitation light source is an ultraviolet laser projector.

5. The apparatus of claim 1, wherein the excitation light source is one of at least two excitation light sources utilized to use separate excitation light wavelength ranges.

6. The apparatus of claim 2, wherein each of the respective input mirrors directs the respective one of the plurality of laser beamlettes in a first direction corresponding to a first axis.

7. The apparatus of claim 3, wherein each of the respective input mirrors directs the respective one of the plurality of laser beamlettes in a first direction corresponding to a first axis.

8. The apparatus of claim 6, wherein each of the respective output mirrors directs the respective one of the plurality of laser beamlettes in a second direction corresponding to a second axis.

9. The apparatus of claim 7, wherein each of the respective output mirrors directs the respective one of the plurality of laser beamlettes in a second direction corresponding to a second axis.

10. The apparatus of claim 1, wherein the surface is a substrate including a light emitting material configured to absorb the laser beamlettes and emit visible light.

11. The apparatus of claim 1, wherein the surface is a substrate including a plurality of layered light emitting materials, each layer substantially transparent to light except light with specific wavelength ranges which absorb the laser beamlettes and emit visible light.

12. The apparatus of claim 11, wherein the excitation light source is an infrared laser projector.

13. The apparatus of claim 11, wherein the multi-mirror device including the plurality of mirrors comprises a microelectromechanical system.

14. Apparatus to project graphical images upon a substantially transparent windscreen head-up display of a vehicle, the apparatus comprising:
- an excitation light source projecting a laser beam based upon a graphical image command;
- a telescope for expanding the laser beam;
- a multi-mirror device including a plurality of mirrors sequentially irradiated by the expanded laser beam to simultaneously scan a plurality of laser beamlettes, wherein at least one of the plurality of laser beamlettes is utilized to generate a vector stroke graphic; and wherein at least one of the plurality of laser beamlettes is utilized to generate a matrix-addressed graphic; and
- the windscreen comprising a surface receiving the plurality of laser beamlettes, each of the received plurality of laser beamlettes emitting visible light upon the surface.

15. Apparatus to project graphical images upon a substantially transparent windscreen head-up display of a vehicle, the apparatus comprising:
- an ultraviolet laser projector projecting an ultraviolet laser beam based upon a graphical image command;
- a Galilean telescope for expanding the laser beam;
- a microelectromechanical system device comprising:
  - a plurality of input mirrors irradiated by the expanded laser beam and directing a plurality of scanned laser beamlettes in a first direction corresponding to a first axis;
  - a plurality of output mirrors irradiated by the plurality of scanned laser beamlettes and independently directing the scanned laser beamlettes in a second direction corresponding to a second axis to desired regions of a surface; and
- the surface receiving the scanned laser beamlettes from the output mirrors and comprising a plurality of layers of light emitting materials to absorb the laser beamlettes and emit visible light therefrom.

16. The apparatus of claim 15, wherein each of the plurality of layers of light emitting materials include phosphors for emitting one of red, green and blue visible light.

17. The apparatus of claim 15, wherein each of the plurality of output mirrors independently directs a respective one of the plurality of the scanned laser beamlettes to a respective desired region on the surface.

18. The apparatus of claim 15, wherein the plurality of output mirrors comprises groups of the plurality of output mirrors wherein the respective plurality of output mirrors in each group independently directs respective ones of the scanned laser beamlettes to respective desired regions on the surface.

19. A method to project graphical images upon a substantially transparent windscreen head-up display of a vehicle, the method comprising:
- projecting a laser beam based upon a graphical image command;

expanding the laser beam;
irradiating a plurality of input mirrors with a portion of the expanded laser beam to provide a corresponding plurality of laser beamlettes;
irradiating a plurality of output mirrors with respective ones of the plurality of laser beamlettes provided by the plurality of input mirrors to provide the plurality of laser beamlettes to the substantially transparent windscreen head-up display;

directing the plurality of laser beamlettes in a first direction corresponding to a first axis with the plurality of input mirrors; and
directing the plurality of laser beamlettes in a second direction corresponding to a second axis with the plurality of output mirrors.

* * * * *